United States Patent
Tsuchimura et al.

(10) Patent No.: US 7,709,546 B2
(45) Date of Patent: May 4, 2010

(54) INK COMPOSITION, INKJET RECORDING METHOD, PRINTED MATERIAL, PROCESS FOR PRODUCING LITHOGRAPHIC PRINTING PLATE, AND LITHOGRAPHIC PRINTING PLATE

(75) Inventors: Tomotaka Tsuchimura, Haibara-gun (JP); Tetsunori Matsushita, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 314 days.

(21) Appl. No.: 11/783,951

(22) Filed: Apr. 13, 2007

(65) Prior Publication Data
US 2007/0242120 A1 Oct. 18, 2007

(30) Foreign Application Priority Data
Apr. 18, 2006 (JP) .............................. 2006-114459

(51) Int. Cl.
C09D 11/00 (2006.01)
C09D 11/10 (2006.01)

(52) U.S. Cl. ............................. 522/25; 522/28; 522/30; 522/56; 522/68; 522/75; 427/466

(58) Field of Classification Search ................... 522/25, 522/28, 30, 75, 65, 68, 56; 427/466
See application file for complete search history.

(56) References Cited

U.S. PATENT DOCUMENTS

| 5,629,920 | A | 5/1997 | Sakano et al. | |
|---|---|---|---|---|
| 5,889,084 | A | 3/1999 | Roth | |
| 6,267,913 | B1 * | 7/2001 | Marder et al. | 252/582 |
| 6,562,542 | B2 * | 5/2003 | Ohkawa et al. | 430/270.1 |
| 6,951,692 | B1 | 10/2005 | Das et al. | |

FOREIGN PATENT DOCUMENTS

| EP | 1 048 700 A1 | 11/2000 |
|---|---|---|
| EP | 1 338 431 A2 | 8/2003 |
| JP | 10-147608 | 6/1998 |
| JP | 11-199681 | 7/1999 |
| JP | 11-263804 | 9/1999 |

OTHER PUBLICATIONS

European Search Report dated Jun. 11, 2007.
* cited by examiner

Primary Examiner—Susan W Berman
(74) Attorney, Agent, or Firm—Sughrue Mion, PLLC

(57) ABSTRACT

An ink composition is provided that includes a compound represented by Formula (I) or (II).

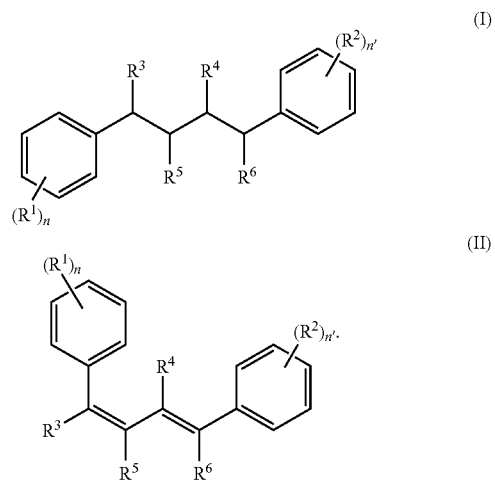

(In Formulae (I) and (II), $R^1$ and $R^2$ independently denote a monovalent substituent, $R^3$ to $R^6$ independently denote a hydrogen atom or a monovalent substituent, n denotes an integer of 0 to 5, and n' denotes an integer of 0 to 5; n and n' are not both 0, when n is 2 or greater a plurality of $R^1$'s may be identical to or different from each other, and when n' is 2 or greater a plurality of $R^2$s may be identical to or different from each other.) There are also provided an inkjet recording method employing the ink composition, and a process for producing a lithographic printing plate, the process including discharging the ink composition onto a hydrophilic support. A printed material and a lithographic printing plate thus obtained are also included in the present invention.

14 Claims, No Drawings

INK COMPOSITION, INKJET RECORDING METHOD, PRINTED MATERIAL, PROCESS FOR PRODUCING LITHOGRAPHIC PRINTING PLATE, AND LITHOGRAPHIC PRINTING PLATE

BACKGROUND OF THE INVENTION

1. Field of the Invention

The present invention relates to an ink composition suitably used for inkjet recording, an inkjet recording method, and a printed material employing same; furthermore, it relates to a lithographic printing plate obtained using the ink composition, and a process for producing a lithographic printing plate. More particularly, it relates to an ink composition suitable for inkjet recording that cures with high sensitivity upon exposure to radiation, can form a high quality image, and has good storage stability, an inkjet recording method, a printed material employing same, a lithographic printing plate obtained using the ink composition, and a process for producing a lithographic printing plate.

2. Description of the Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated. On the other hand, with regard to the inkjet system, the equipment is inexpensive and, since an image is formed directly on a recording medium by discharging an ink only on a required image area, the ink can be used efficiently and the running cost is low. Furthermore, there is little noise and it is excellent as an image recording system.

An ink composition that can be cured by exposure to radiation such as ultraviolet rays and, in particular, an inkjet recording ink (radiation curing type inkjet recording ink) are required to have sufficiently high sensitivity and provide a high image quality. By achieving higher sensitivity, a large number of benefits are provided, such as high curability toward radiation, a reduction in power consumption, longer lifetime due to a decrease in the load on a radiation generator, and prevention of formation of low molecular weight material originating from insufficient curing. Furthermore, higher sensitivity particularly improves the cure strength of an image formed using the ink composition and, in particular, the inkjet recording ink, particularly for the formation of a lithographic printing plate, and high plate life can be obtained.

Conventionally, acids such as onium compounds, or radical polymerization initiators or cationic polymerization initiators, have hardly any adsorption at wavelengths longer than 360 nm and, when light exposure is carried out using a light source having a long wavelength, the curability is considerably reduced. In particular, since photopolymerization initiators such as sulfonium salts or iodonium salts, which are currently used, have hardly any absorption of UV rays on the long wavelength side, in the case of a thick film there is the problem that the curability becomes poor. Furthermore, in a photocuring composition containing a large amount of a white pigment such as titanium oxide having an absorption region in the ultraviolet (UV) region, there are many problems in practical use.

As a method for solving these problems, the use of a sensitizer has been examined; for example, it is reported that various types of dye derivatives are effective as a sensitizer for a diaryliodonium salt, and thioxanthone derivatives are known as particularly inexpensive and common sensitizers (JP-A-11-263804 (JP-A denotes a Japanese unexamined patent application publication)). However, there are the problems that the photocurability of a photocurable composition employing an additive such as a pigment is insufficient if only a thioxanthone derivative is used, and the stability over time is poor when an iodonium salt is used.

Photopolymerizable compositions using as a sensitizer an anthracene compound (JP-A-11-199681) or a 9,10-dialkoxy-anthracene derivative (Japanese registered patent No. 3437069) have been examined. However, anthracene compounds and thioxanthone compounds have the problem that, since they have absorption up to long wavelengths, they develop a yellow coloration.

BRIEF SUMMARY OF THE INVENTION

It is an object of the present invention to provide an ink composition that has high sensitivity and no coloration due to a sensitizer, an inkjet recording method employing the ink composition a printed material obtained using the ink composition, a lithographic printing plate, and a process for producing a lithographic printing plate.

As a result of an intensive investigation by the present inventors in order to solve the above-mentioned problems, it has been found that the above-mentioned object can be achieved by the use of Formula (I) or (II) as a sensitizer, and the present invention has thus been accomplished. That is, the above-mentioned object can be attained by (1), (6), or (8) to (10). They are shown below together with (2) to (5), and (7), which are preferred embodiments.

(1) An ink composition comprising a compound represented by Formula (I) or (II)

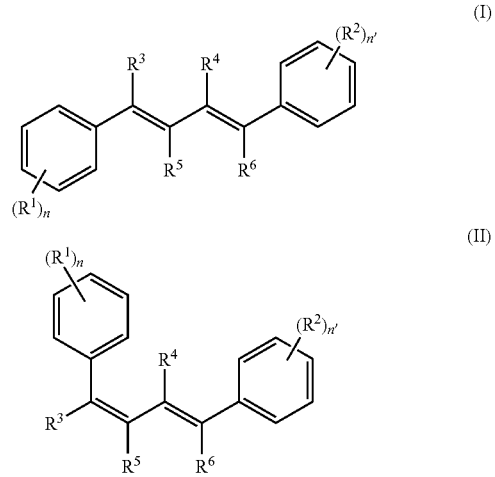

(in Formulae (I) and (II), $R^1$ and $R^2$ independently denote a monovalent substituent. $R^3$ to $R^6$ independently denote a hydrogen atom or a monovalent substituent, n denotes an integer of 0 to 5, and n' denotes an integer of 0 to 5; n and n' are not both 0, when n is 2 or greater a plurality of $R^1$s may be identical to or different from each other, and when n' is 2 or greater a plurality of $R^2$s may be identical to or different from each other).

(2) the ink composition according to (1) above, wherein it comprises an acid generator and/or a radical initiator, (3) the ink composition according to (1) or (2) above, wherein the compound represented by Formula (I) or (II) has a molar extinction coefficient ε at a wavelength of 365 nm of 500 $mol^{-1} \cdot L \cdot cm^{-1}$ or greater and a molar extinction coefficient ε at a wavelength of 380 nm of 3,000 $mol^{-1} \cdot L \cdot cm^{-1}$ or less, (4) the ink composition according to any one of (1) to (3) above, wherein it is for inkjet recording, (5) an inkjet recording method comprising (a') a step of discharging an ink composition onto a recording medium, and (b') a step of curing the ink composition by irradiating the discharged ink composition with actinic radiation, the ink composition being the ink composition according to any one of (1) to (4) above, (6) the inkjet recording method according to (5) above, wherein the actinic radiation is UV radiation having a peak light emission wavelength in the range of 340 to 370 nm and is emitted by a light-emitting diode for emitting UV radiation whose maximum illumination intensity on the surface of a recording medium is 10 to 2,000 $mW/cm^2$, (7) a printed material printed using the ink composition according to any one of (1) to (4) above, (8) a process for producing a lithographic printing plate, the process comprising (a'') a step of discharging the ink composition according to any one of (1) to (4) above onto a hydrophilic support, and (b'') a step of curing the ink composition by irradiating the discharged ink composition with actinic radiation so as to form a hydrophobic image on the hydrophilic support by curing the ink composition, and (9) a lithographic printing plate produced by the process for producing a lithographic printing plate according to (8) above.

DETAILED DESCRIPTION OF THE INVENTION

The present invention is explained in detail below.

The ink composition of the present invention comprises (A) a compound represented by Formula (I) or (II).

Furthermore, the ink composition of the present invention can be cured by exposure to radiation and may comprise as necessary (B) a cationically polymerizable compound, (C) an acid generator, (D) a radically polymerizable compound, (E) a radical polymerization initiator, (F) a colorant, and (G) another component.

Furthermore, since the ink composition of the present invention employs a compound represented by Formula (I) or (II), which is a sensitizer having no coloration, it can be used particularly suitably as a white ink.

The 'radiation' referred to in the present invention is not particularly limited as long as it is actinic radiation that can provide energy that enables an initiating species to be generated in the composition when irradiated, and broadly includes α rays, γ rays, X rays, ultraviolet rays, visible light, and an electron beam; among these, ultraviolet rays and an electron beam are preferable from the viewpoint of curing sensitivity and the availability of equipment, ultraviolet rays are more preferable, ultraviolet rays having a peak wavelength of 340 to 380 nm are yet more preferable, ultraviolet rays having a peak wavelength of 340 to 370 nm are particularly preferable, and ultraviolet rays having a peak wavelength of 365 nm are most preferable.

The present invention provides a sensitizer that functions as a non-coloring sensitizer that is very highly sensitive to exposure to radiation, in particular, light at 365 nm. The sensitizer that can be used in the present invention therefore enables polymerization, cross-linking, decomposition, a color-forming reaction, or a radical reaction that employ as a catalyst a conventionally used acid generated by exposure to radiation to proceed rapidly and reliably; as a result the sensitivity to radiation in various types of application increases or the reaction proceeds sufficiently, and it can be expected that the properties of the ink will be improved.

(1) Components of Ink Composition (A) Compound Represented by Formula (I) or Formula (II)

The ink composition of the present invention comprises a compound represented by Formula (I) or Formula (II) below (hereinafter, also called a 'specific sensitizer'). The compound represented by Formula (I) or Formula (II) can act as a sensitizer in the ink composition of the present invention.

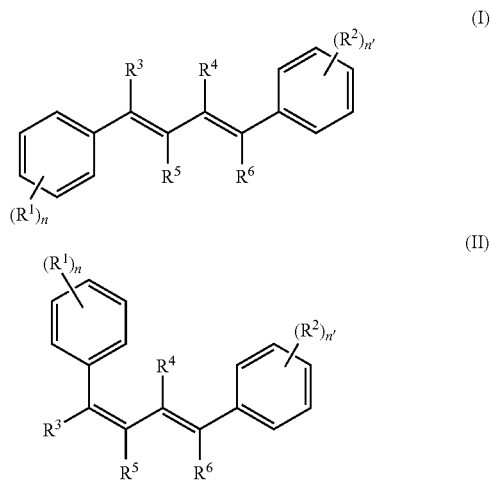

(In Formulae (I) and (II), $R^1$ and $R^2$ independently denote a monovalent substituent, $R^3$ to $R^6$ independently denote a hydrogen atom or a monovalent substituent, n denotes an integer of 0 to 5, and n' denotes an integer of 0 to 5; n and n' are not both 0, when n is 2 or greater, a plurality of $R^1$s may be identical to or different from each other, and when n' is 2 or greater, a plurality of $R^2$s may be identical to or different from each other.)

$R^1$ and $R^2$ in Formulae (I) and (II) independently denote a monovalent substituent; when n is 2 or greater, a plurality of $R^1$s may be identical to or different from each other, and when n' is 2 or greater, a plurality of $R^2$s may be identical to or different from each other. $R^1$ and $R^2$, the $R^1$s when n is 2 or greater, or the $R^2$s when n' is 2 or greater may be bonded to each other to form a ring. Furthermore, $R^1$ and/or $R^2$ may be bonded to at least one of $R^3$ to $R^6$ to form a ring.

n denotes an integer of 0 to 5, and n' denotes an integer of 0 to 5. However, n and n' are not both 0. That is, the specific sensitizer that can be used in the present invention has at least one monovalent substituent on an aromatic ring of a diarylbutadiene structure.

The monovalent substituent as $R^1$ and $R^2$ above is not particularly limited, and examples thereof include a halogen atom (a fluorine atom, a chlorine atom, a bromine atom, and an iodine atom), an alkyl group (including a cycloalkyl group, a bicycloalkyl group, and a tricycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclooxy group, an acyloxy group, a carbamoyloxy group, an alkoxycarbonyloxy group, an aryloxycarbonyloxy group, an amino group (including a dialkylamino group, an alkylamino group, a diarylamino group, an arylamino group, and an anilino group), an ammonio group, an acylamino group, an aminocarbonylamino group, an alkoxycarbonylamino group, an aryloxycarbonylamino group, a sulfamoylamino group, alkyl and aryl sulfonylamino groups, a mercapto group, an alkylthio group, an arylthio group, a heterocyclothio group, a sulfamoyl group, a sulfo group, alkyl and aryl sulfinyl groups, alkyl and aryl sulfonyl groups, an acyl group, an aryloxycarbonyl group, an alkoxycarbonyl group, a carbamoyl group, aryl and heterocyclic azo groups, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphato group (—OPO(OH)$_2$), a sulfate group (—OSO$_3$H), and other known substituents.

With regard to R$^1$ and/or R$^2$, R$^1$ and R$^2$, the R$^1$s when n is 2 or greater, or the R$^2$s when n' is 2 or greater may be bonded to each other to form a ring (aromatic or nonaromatic hydrocarbon ring or heterocyclic ring, which may further be combined to form a polycondensed ring). Specific examples of the ring that may be formed include a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinazoline ring, an isoquinoline ring, a carbazole ring, a phenanthridine ring, an acridine ring, a phenanthroline ring, a thianthrene ring, a chromene ring, a xanthene ring, a phenoxathiine ring, a phenothiazine ring, and a phenazine ring.

R$^1$ and R$^2$ are preferably a halogen atom, an alkyl group (including a cycloalkyl group, a bicycloalkyl group, and a tricycloalkyl group), an alkenyl group (including a cycloalkenyl group and a bicycloalkenyl group), an alkynyl group, an aryl group, a cyano group, a hydroxyl group, a carboxyl group, an alkoxy group, an aryloxy group, an acyloxy group, a carbamoyloxy group, an acylamino group, an aminocarbonylamino group, an alkoxycarbonylamino group, an aryloxycarbonylamino group, a sulfamoylamino group, an alkyl or aryl sulfonylamino group, an alkylthio group, an arylthio group, a sulfamoyl group, an alkyl or aryl sulfonyl group, an aryloxycarbonyl group, an alkoxycarbonyl group, a carbamoyl group, an imide group, a silyl group, or a ureido group.

R$^1$ and R$^2$ are more preferably a halogen atom, an alkyl group (including a cycloalkyl group, a bicycloalkyl group, and a tricycloalkyl group), an alkyloxy group, an aryloxy group, an alkylthio group, an arylthio group, or an amino group (a dialkylamino group, an alkylamino group, a diarylamino group, or an arylamino group).

R$^3$ to R$^6$ independently denote a hydrogen atom or a monovalent substituent, and R$^3$ to R$^6$ may be bonded to each other to form a ring. Furthermore, R$^3$ to R$^6$ may be bonded to R$^1$ and/or R$^2$ to form a ring.

The substituent as R$^3$ to R$^6$ may be any group and is not particularly limited, and examples thereof include a halogen atom, an alkyl group (including a cycloalkyl group, a bicycloalkyl group, and a tricycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclooxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, alkyl and aryl sulfonylamino groups, a mercapto group, an alkylthio group, an arylthio group, a heterocyclothio group, a sulfamoyl group, a sulfo group, alkyl and aryl sulfinyl groups, alkyl and aryl sulfonyl groups, an acyl group, an aryloxycarbonyl group, an alkoxycarbonyl group, a carbamoyl group, aryl and heterocyclic azo groups, an imide group, a phosphino group, a phosphinyl group, a phosphinyloxy group, a phosphinylamino group, a phosphono group, a silyl group, a hydrazino group, a ureido group, a boronic acid group (—B(OH)$_2$), a phosphate group (—OPO(OH)$_2$), a sulfate group (—OSO$_3$H), and other known substituents.

Furthermore, R$^3$ to R$^6$ may be bonded to each other to form a ring (an aromatic or nonaromatic hydrocarbon ring or a heterocyclic ring, which may further be combined to form a polycondensed ring). Moreover, R$^3$ to R$^6$ may be bonded to R$^1$ and/or R$^2$ to form a ring (an aromatic or nonaromatic hydrocarbon ring or a heterocyclic ring, which may further be combined to form a polycondensed ring). Specific examples of the ring that may be formed include a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinazoline ring, an isoquinoline ring, a carbazole ring, a phenanthridine ring, an acridine ring, a phenanthroline ring, a thianthrene ring, a chromene ring, a xanthene ring, a phenoxathiine ring, a phenothiazine ring, and a phenazine ring.

R$^3$ to R$^6$ are preferably a hydrogen atom, a halogen atom, an alkyl group (including a cycloalkyl group, a bicycloalkyl group, and a tricycloalkyl group), an alkenyl group (including a cycloalkenyl group and a bicycloalkenyl group) an alkynyl group, an aryl group, a cyano group, a hydroxyl group, a carboxyl group, an alkoxy group, an aryloxy group, an acyloxy group, a carbamoyloxy group, an acylamino group, an aminocarbonylamino group, an alkoxycarbonylamino group, an aryloxycarbonylamino group, a sulfamoylamino group, an alkyl or aryl sulfonylamino group, an alkylthio group, an arylthio group, a sulfamoyl group, an alkyl or aryl sulfonyl group, an aryloxycarbonyl group, an alkoxycarbonyl group, a carbamoyl group, an imide group, a silyl group, or a ureido group.

R$^3$ to R$^6$ are more preferably a hydrogen atom or an alkyl group (including a cycloalkyl group, a bicycloalkyl group, and a tricycloalkyl group).

Furthermore, the compound represented by Formula (I) is preferably a compound represented by Formula (III) below from the viewpoint of sensitivity and coloration properties.

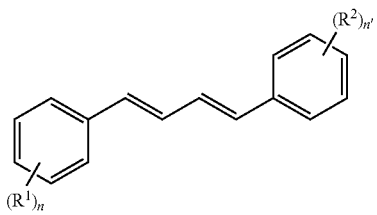

(In Formula (III), $R^1$ and $R^2$ independently denote a monovalent substituent, n denotes an integer of 0 to 5, and n' denotes an integer of 1 to 5; when n is 2 or greater, a plurality of $R^1$s may be identical to or different from each other, and when n' is 2 or greater, a plurality of $R^2$s may be identical to or different from each other.)

$R^1$ and $R^2$ in Formula (III) have the same meanings as those for $R^1$ and $R^2$ in Formula (I) above, and preferred ranges are also the same.

It is preferable for the compound represented by Formula (I) or (II) to have a molar extinction coefficient ε at a wavelength of 365 nm of 500 mol$^{-1}$·L·cm$^{-1}$ or greater and a molar extinction coefficient ε at a wavelength of 380 nm of 3,000 mol$^{-1}$·L·cm$^{-1}$ or less, and it is more preferable for it to have a molar extinction coefficient ε at a wavelength of 365 nm of at least 1,000 mol$^{-1}$·L·cm$^{-1}$ but no greater than 50,000 mol$^{-1}$·L·cm$^{-1}$ and a molar extinction coefficient ε at a wavelength of 380 nm of 1,000 mol$^{-}$·L·cm$^{-1}$ or less. It is preferable for the molar extinction coefficient ε at each wavelength to be in the above-mentioned range from the viewpoint of light absorption efficiency, influence on sensitivity due to optical transparency-dependent internal curability, and coloration properties.

In the ink composition of the present invention, the compound represented by Formula (I) or Formula (II) may be used singly or in a combination of two or more types, and it is also possible to use in combination a compound represented by Formula (I) and a compound represented by Formula (II).

The content of the compound represented by Formula (I) and/or Formula (II) in the ink composition of the present invention is preferably 0.1 wt % to 20 wt % relative to the total weight of the ink composition of the present invention, more preferably 0.3 wt % to 15 wt %, and yet more preferably 0.3 wt % to 10 wt %.

Specific preferred examples of the compound represented by Formula (I) or (II) are listed below, but the present invention should not be construed as being limited thereto. In the present invention, a chemical formula might be expressed by a simplified structural formula; in particular, a solid line, etc. that does not explicitly show an element or a substituent denotes a hydrocarbon group. In the specific examples below, Me denotes a methyl group, Et denotes an ethyl group, Bu denotes a n-butyl group, and Ph denotes a phenyl group.

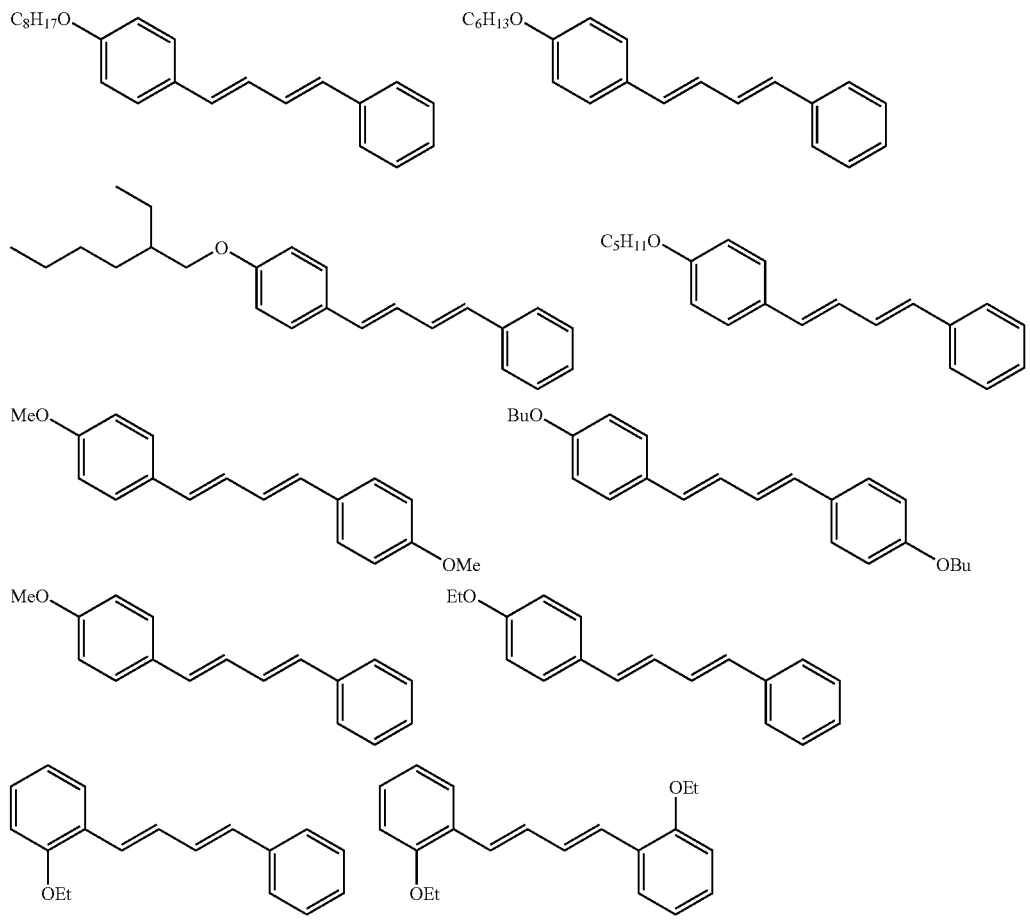

-continued
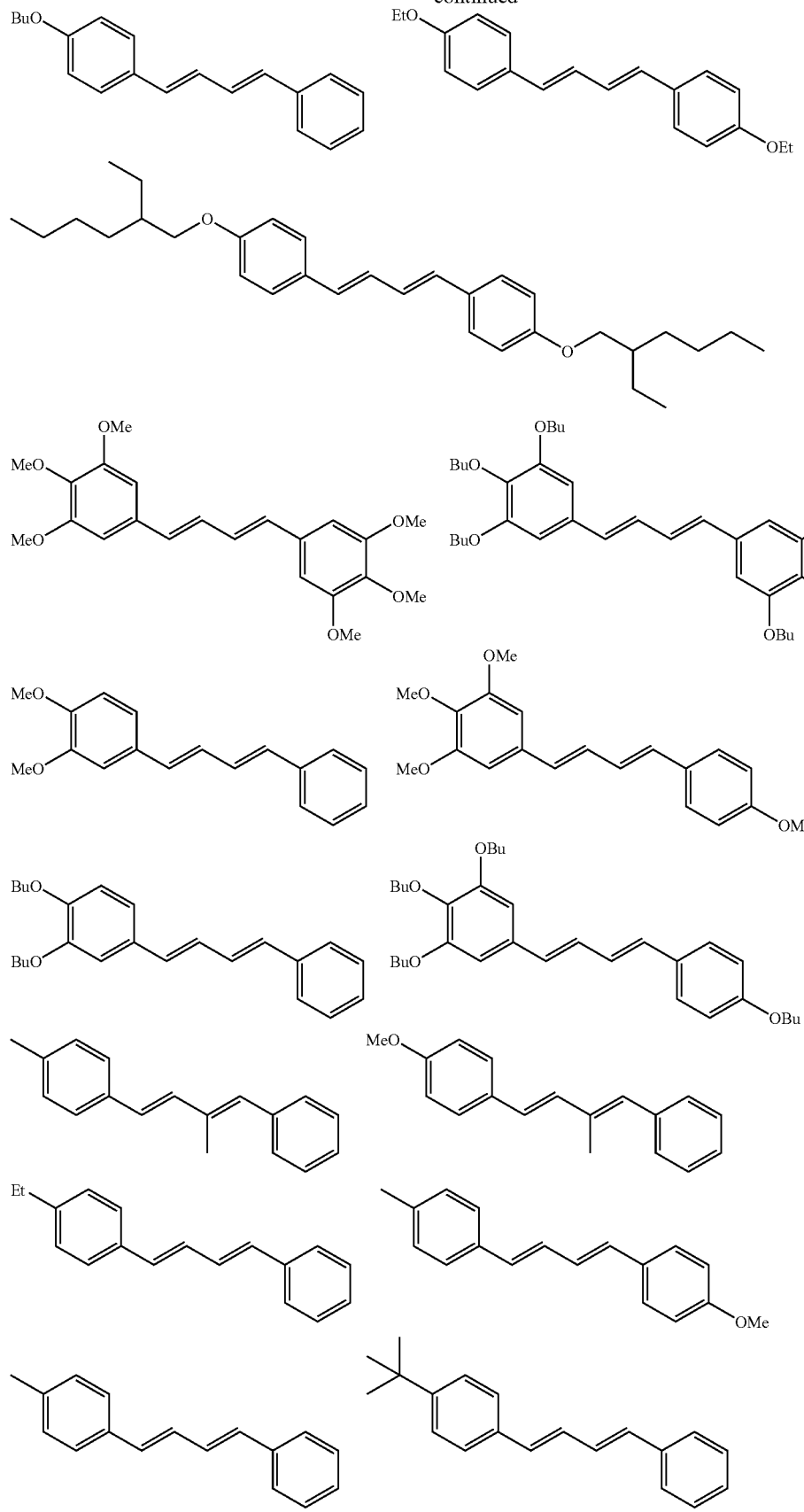

-continued
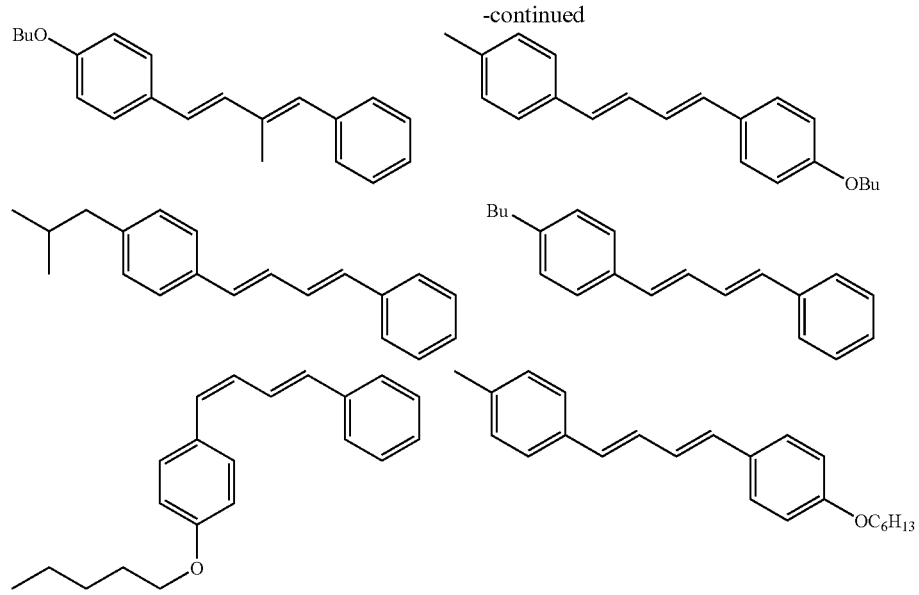
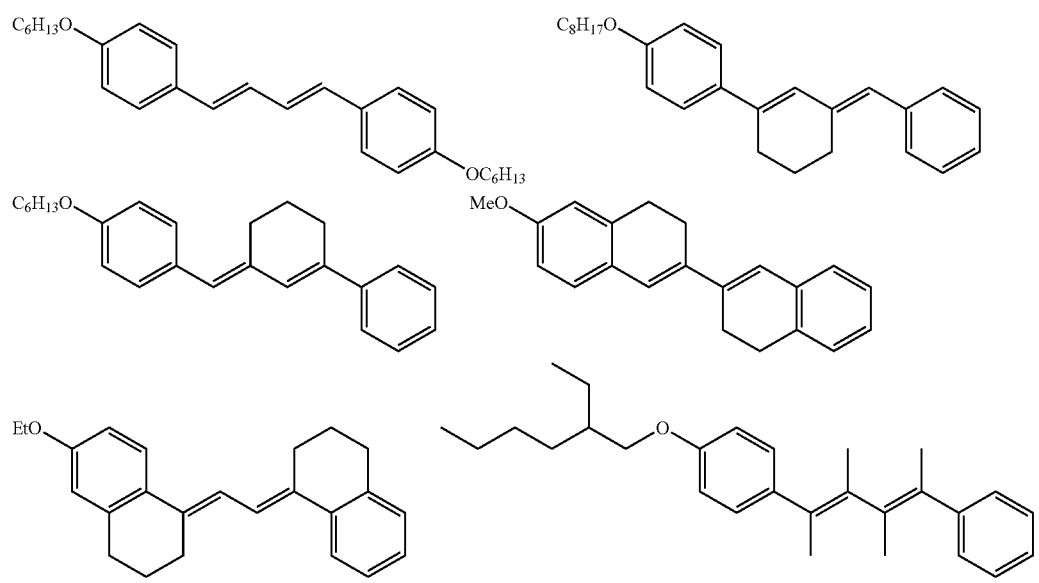
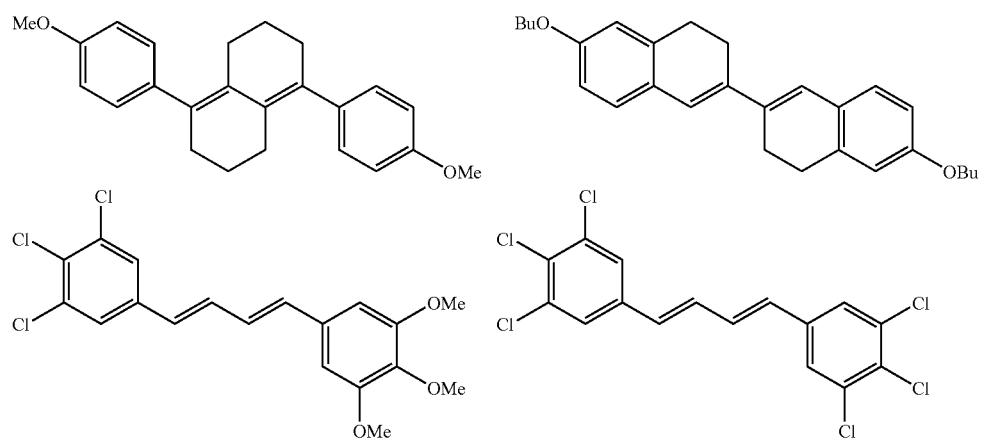

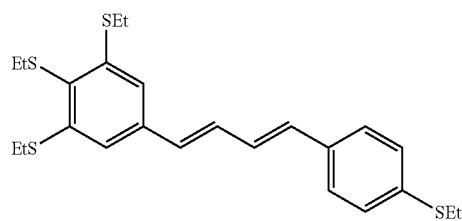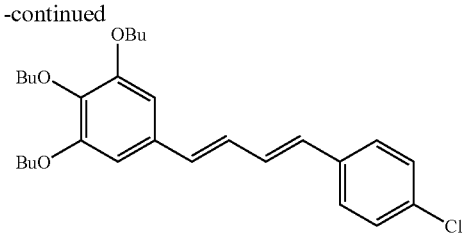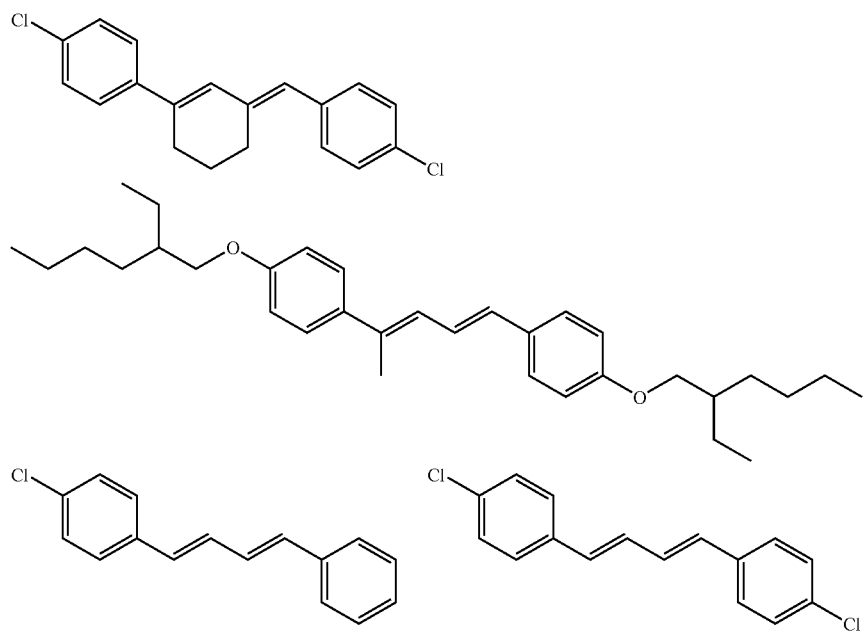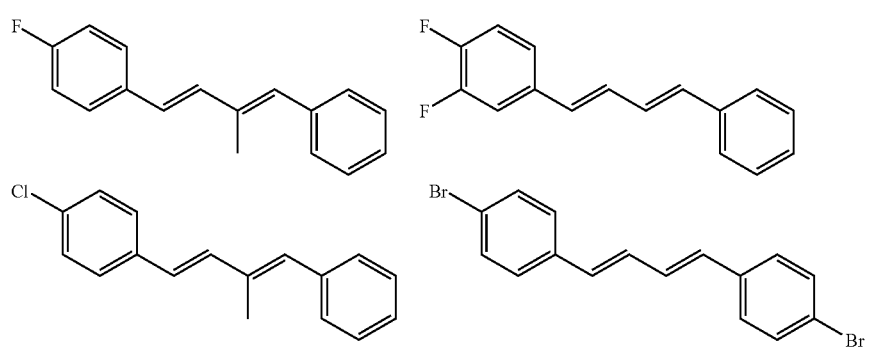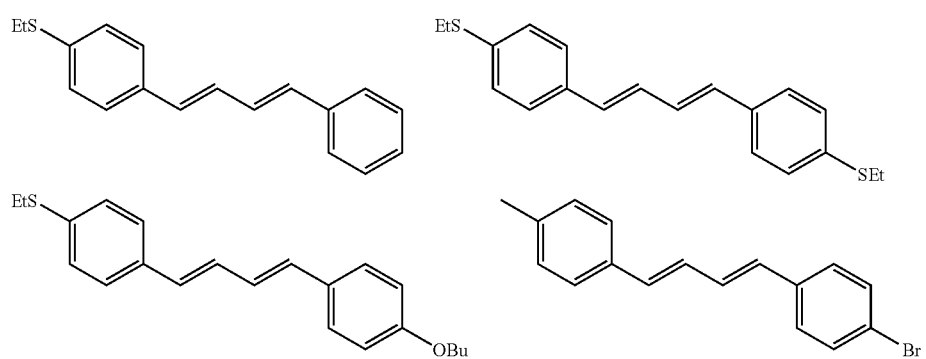

-continued
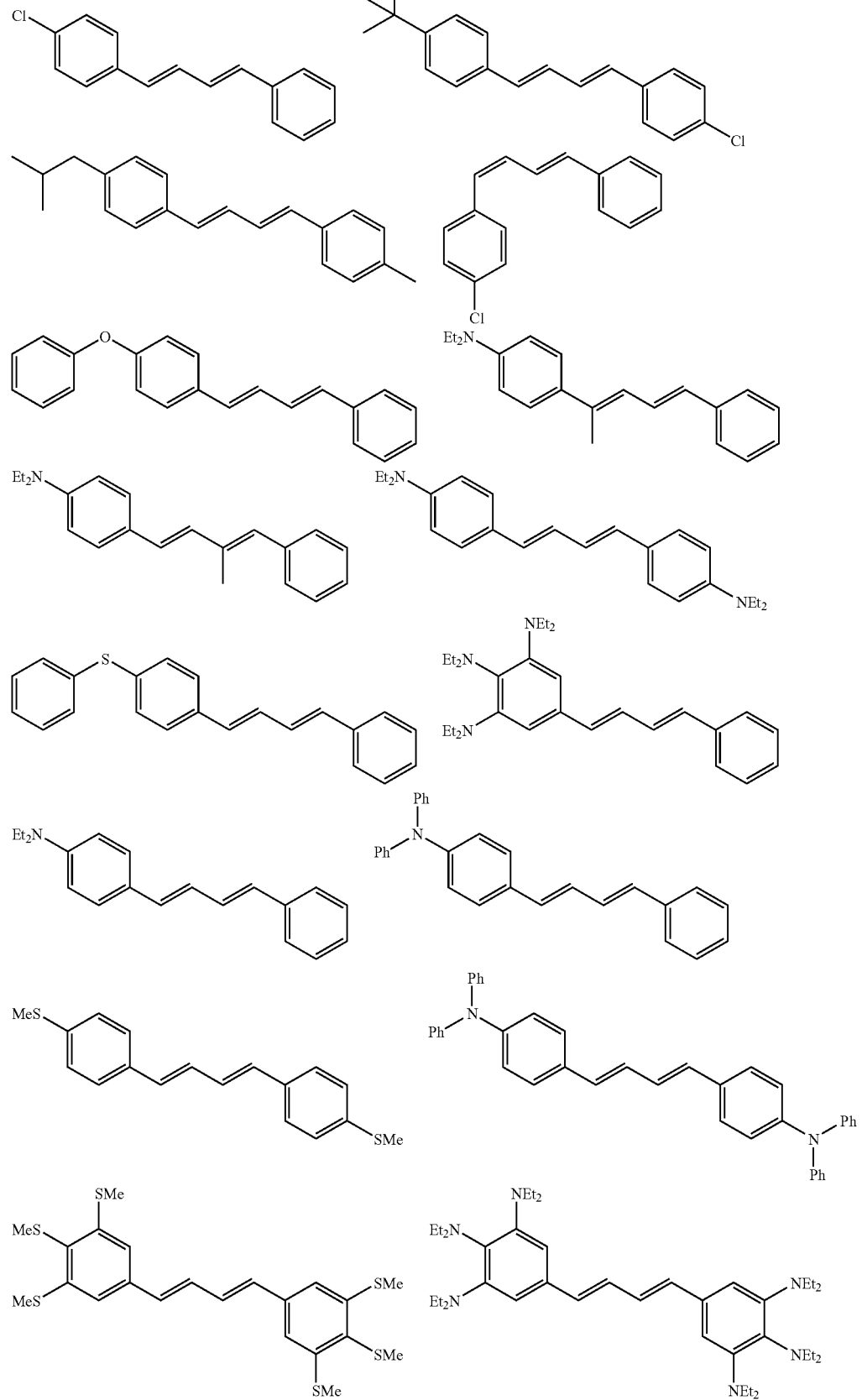

-continued

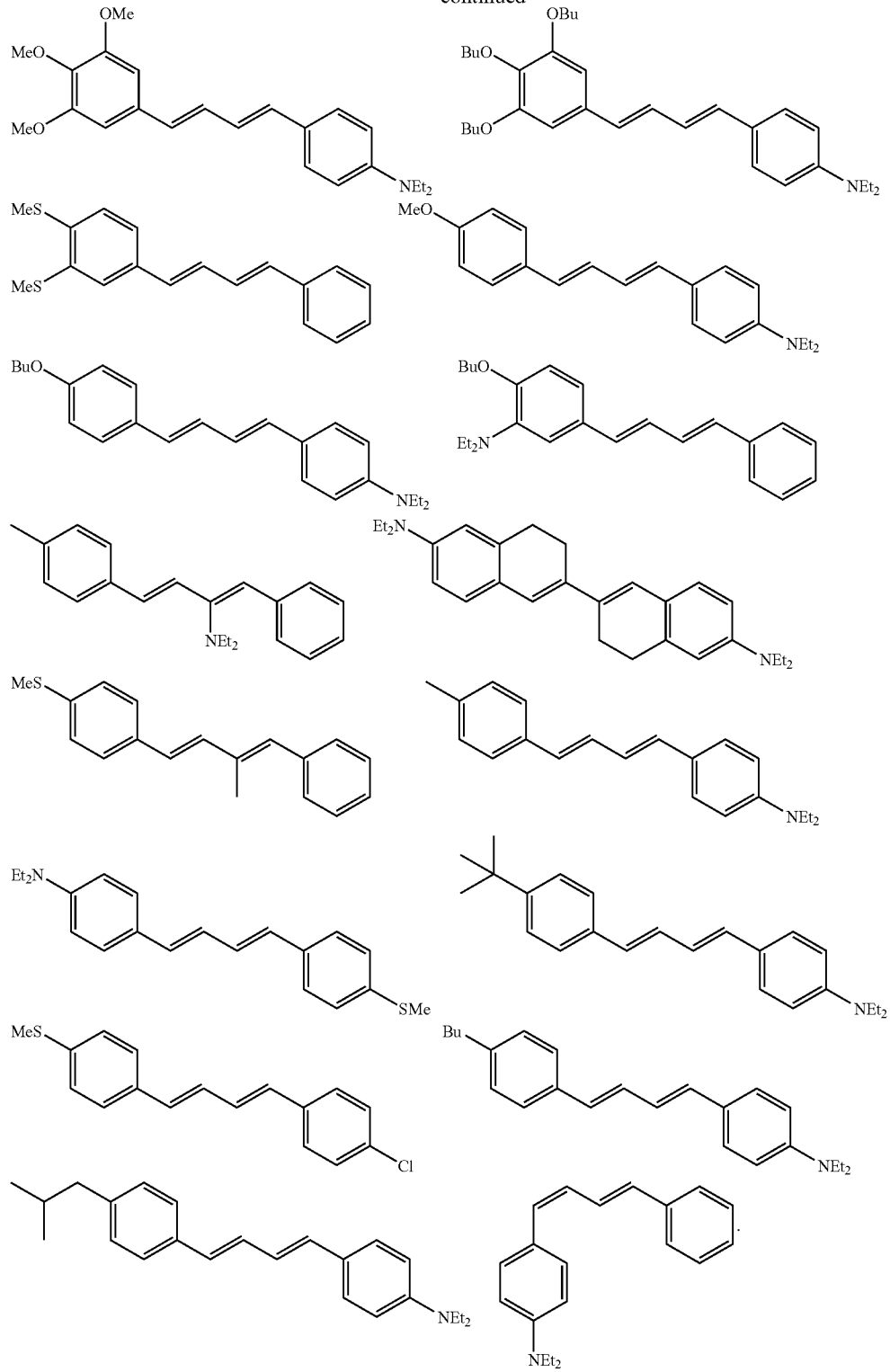

(B) Cationically Polymerizable Compound

The ink composition of the present invention preferably comprises a cationically polymerizable compound.

The cationically polymerizable compound referred to here means a compound that undergoes a polymerization or crosslinking reaction by means of a cationic polymerization initiator that is activated by exposure to actinic radiation.

The cationically polymerizable compound that can be used in the present invention is not particularly limited as long as it is a compound that undergoes a polymerization reaction by virtue of a cationic polymerization initiating species generated by a cationic polymerization initiator, which will be described later, and is cured, and various known types of cationically polymerizable monomers known as cationically photopolymerizable monomers may be used. Examples of the cationically polymerizable monomer include, for example, epoxy compounds, vinyl ether compounds, and oxetane compounds described in JP-A-6-9714, JP-A-2001-31892, JP-A-2001-40068, JP-A-2001-55507, JP-A-2001-310938, JP-A-2001-310937, JP-A-2001-220526, etc. As the cationically polymerizable compound, for example, a cationically polymerizable type photocuring resin is known, and in recent years cationically photopolymerizable type photocuring resins sensitized to a visible light wavelength region of 400 nm or longer have been disclosed in, for example, JP-A-6-43633 and JP-A-8-324137.

Examples of the epoxy compounds include aromatic epoxides, alicyclic epoxides, and aliphatic epoxides, and examples of the aromatic epoxide include di- or polyglycidyl ethers produced by a reaction between epichlorohydrin and a polyhydric phenol having at least one aromatic nucleus or an alkylene oxide adduct thereof; specific examples include di- or polyglycidyl ethers of bisphenol A or an alkylene oxide adduct thereof, di- or polyglycidyl ethers of hydrogenated bisphenol A or an alkylene oxide adduct thereof, and novolac type epoxy resins. Examples of the alkylene oxide above include ethylene oxide and propylene oxide.

Examples of the alicyclic epoxides include cyclohexene oxide- and cyclopentene oxide-containing compounds obtained by epoxidizing a compound having at least one cycloalkane ring such as a cyclohexene ring or a cyclopentene ring with an appropriate oxidizing agent such as hydrogen peroxide or a peracid.

Examples of the aliphatic epoxides include di- or polyglycidyl ethers of an aliphatic polyhydric alcohol or an alkylene oxide adduct thereof, and representative examples thereof include diglycidyl ethers of an alkylene glycol such as the diglycidyl ether of ethylene glycol, the diglycidyl ether of propylene glycol, and the diglycidyl ether of 1,6-hexanediol, polyglycidyl ethers of a polyhydric alcohol such as the di- or triglycidyl ether of glycerol or an alkylene oxide adduct thereof, and diglycidyl ethers of a polyalkylene glycol such as the diglycidyl ether of polyethylene glycol or an alkylene oxide adduct thereof and the diglycidyl ether of polypropylene glycol or an alkylene oxide adduct thereof. Examples of the alkylene oxide above include ethylene oxide and propylene oxide.

Detailed examples of monofunctional and polyfunctional epoxy compounds that can be used in the present invention are now given.

Examples of monofunctional epoxy compounds used in the present invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monooxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Furthermore, examples of polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, bis(3,4-epoxycyclohexylmethyl)adipate, bis(3,4-epoxy-6-methylcyclohexylmethyl) adipate, 3,4-epoxy-6-methylcyclohexyl 3',4'-epoxy-6'-methylcyclohexenecarboxylate, methylenebis(3,4-epoxycyclohexane), dicyclopentadiene diepoxide, the di(3,4-epoxycyclohexylmethyl)ether of ethylene glycol, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5,6-diepoxycyclooctane.

Among these epoxy compounds, the aromatic epoxides and the alicyclic epoxides are preferable from the viewpoint of excellent curing speed, and the alicyclic epoxides are particularly preferable.

Examples of the vinyl ether compounds include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether-O-propylene carbonate, dodecyl vinyl ether, and diethylene glycol monovinyl ether.

Detailed examples of monofunctional vinyl ethers and polyfunctional vinyl ethers are given below.

Specific examples of monofunctional vinyl ethers include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Furthermore, examples of polyfunctional vinyl ethers include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether; and polyfunctional vinyl ethers such as trimethylolethane trivinyl ether, trimethylolpropane trivinyl ether, ditrimethylolpropane tetravinyl ether, glycerol trivinyl ether, pentaerythritol tetravinyl ether, dipentaerythritol pentavinyl ether, dipentaerythritol hexavinyl ether, an ethylene oxide adduct of trimethylolpropane trivinyl ether, a propylene oxide adduct of trimethylolpropane trivinyl ether, an ethylene oxide adduct of ditrimethylolpropane tetravinyl ether, a propylene oxide adduct of ditrimethylolpropane tetravinyl ether, an ethylene oxide adduct of pentaerythritol tetravinyl ether, a propylene oxide adduct of pentaerythritol tetravinyl ether, an ethylene oxide adduct of dipentaerythritol hexavinyl ether, and a propylene oxide adduct of dipentaerythritol hexavinyl ether.

As the vinyl ether compound, the di- or tri-vinyl ether compounds are preferable from the viewpoint of curability, adhesion to a recording medium, surface hardness of the image formed, etc., and the divinyl ether compounds are particularly preferable.

The oxetane compound in the present invention means a compound having at least one oxetane ring, and may be selected freely from known oxetane compounds such as those described in JP-A-2001-220526, JP-A-2001-310937, and JP-A-2003-341217.

As the compound having an oxetane ring that can be used in the present invention, a compound having 1 to 4 oxetane rings in the structure is preferable. In accordance with use of such a compound, it becomes easy to maintain the viscosity of the ink composition in a range that gives good handling properties and, furthermore, using as an ink composition, the cured ink can be given high adhesion to the recording medium, which is preferable.

Examples of compounds having 1 to 2 oxetane rings in the molecule include compounds represented by Formulae (1) to (3) below.

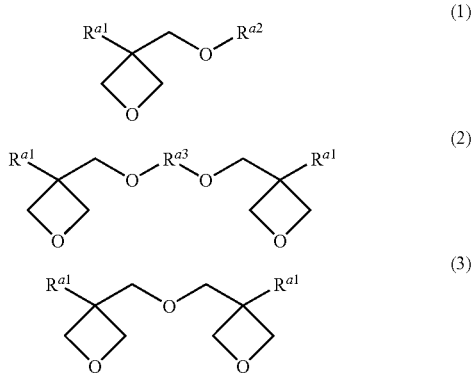

$R^{a1}$ denotes a hydrogen atom, an alkyl group having 1 to 6 carbons, a fluoroalkyl group having 1 to 6 carbons, an allyl group, an aryl group, a furyl group, or a thienyl group. When there are two $R^{a1}$ in the molecule, they may be identical to or different from each other.

Examples of the alkyl group include a methyl group, an ethyl group, a propyl group, and a butyl group, and preferred examples of the fluoroalkyl group include those obtained by substituting any of the hydrogen atoms of the above alkyl groups with a fluorine atom.

$R^{a2}$ denotes a hydrogen atom, an alkyl group having 1 to 6 carbons, an alkenyl group having 2 to 6 carbons, a group having an aromatic ring, an alkylcarbonyl group having 2 to 6 carbons, an alkoxycarbonyl group having 2 to 6 carbons, or an N-alkylcarbamoyl group having 2 to 6 carbons. Examples of the alkyl group include a methyl group, an ethyl group, a propyl group, and a butyl group, examples of the alkenyl group include a 1-propenyl group, a 2-propenyl group, a 2-methyl-1-propenyl group, a 2-methyl-2-propenyl group, a 1-butenyl group, a 2-butenyl group, and a 3-butenyl group, and examples of the group having an aromatic ring include a phenyl group, a benzyl group, a fluorobenzyl group, a methoxybenzyl group, and a phenoxyethyl group. Examples of the alkylcarbonyl group include an ethylcarbonyl group, a propylcarbonyl group, and a butylcarbonyl group, examples of the alkoxycarbonyl group include an ethoxycarbonyl group, a propoxycarbonyl group, and a butoxycarbonyl group, and examples of the N-alkylcarbamoyl group include an ethylcarbamoyl group, a propylcarbamoyl group, a butylcarbamoyl group, and a pentylcarbamoyl group. Furthermore, it is possible for $R^2$ to have a subsituent, and the examples of the substituent include alkyl group, having 1 to 6 carbons and fluorine atom $R^{a3}$ denotes a linear or branched alkylene group, a linear or branched poly(alkyleneoxy) group, a linear or branched unsaturated hydrocarbon group, a carbonyl group, a carbonyl group-containing alkylene group, a carboxyl group-containing alkylene group, a carbamoyl group-containing alkylene group, or a group shown below. Examples of the alkylene group include an ethylene group, a propylene group, and a butylene group, and examples of the poly(alkyleneoxy) group include a poly(ethyleneoxy) group and a poly(propyleneoxy) group. Examples of the unsaturated hydrocarbon group include a propenylene group, a methylpropenylene group, and a butenylene group.

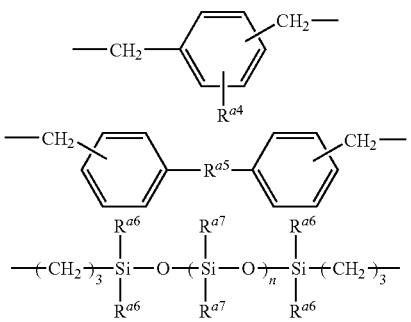

When $R^{a3}$ is the above-mentioned polyvalent group, $R^{a4}$ denotes a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ denotes an oxygen atom, a sulfur atom, a methylene group, NH, SO, $SO_2$, $C(CF_3)_2$, or, $C(CH_3)_2$.

$R^{a6}$ denotes an alkyl group having 1 to 4 carbons or an aryl group, and n is an integer of 0 to 2,000. $R^{a7}$ denotes an alkyl group having 1 to 4 carbons, an aryl group, or a monovalent group having the structure below. In the formula, $R^{a8}$ denotes an alkyl group having 1 to 4 carbons or an aryl group, and m is an integer of 0 to 100.

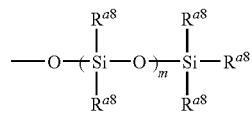

Examples of the compound represented by Formula (1) include 3-ethyl-3-hydroxymethyloxetane (OXT-101: manufactured by Toagosei Co., Ltd.), 3-ethyl-3-(2-ethylhexyloxymethyl)oxetane (OXT-212: manufactured by Toagosei Co., Ltd.), and 3-ethyl-3-phenoxymethyloxetane (OXT-211: manufactured by Toagosei Co., Ltd.). Examples of the compound represented by Formula (2) include 1,4-bis[(3-ethyl-3-oxetanylmethoxy)methyl]benzene (OXT-121: Toagosei Co., Ltd.). Examples of the compound represented by Formula (3) include bis(3-ethyl-3-oxetanylmethyl) ether (OXT-221: Toagosei Co., Ltd.).

Examples of the compound having 3 to 4 oxetane rings in the molecule include compounds represented by Formula (4) below.

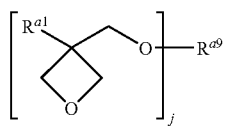

In Formula (4), $R^{a1}$ denotes the same as in Formula (1) above. Furthermore, examples of $R^{a9}$, which is a polyvalent linking group, include a branched alkylene group having 1 to 12 carbons such as a group represented by A to C below, a branched poly(alkyleneoxy) group such as a group represented by D below, and a branched polysiloxane group such as a group represented by E below. j is 3 or 4.

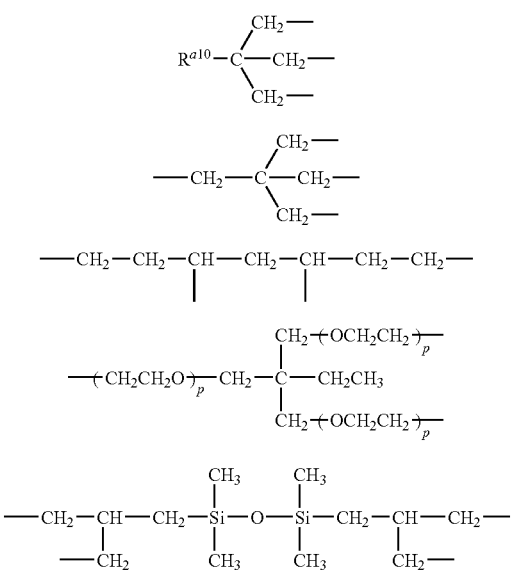

In the above A, $R^{a10}$ denotes a methyl group, an ethyl group, or a propyl group. Furthermore, in the above D, p is an integer of 1 to 10.

Moreover, as another embodiment of the oxetane compound that can be suitably used in the present invention, a compound having an oxetane ring on a side chain, represented by Formula (5) below, can be cited.

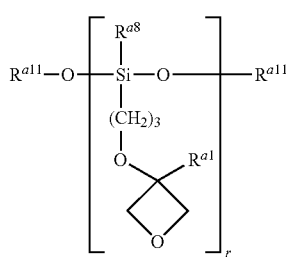

In Formula (5), $R^{a1}$ and $R^{a8}$ denote the same as in the above-mentioned formulae. $R^{a11}$ is an alkyl group having 1 to 4 carbons such as a methyl group, an ethyl group, a propyl group, or a butyl group, or a trialkylsilyl group, and r is 1 to 4.

Such compounds having an oxetane ring are described in detail in paragraph Nos. (0021) to (0084) of JP-A-2003-341217 above, and the compounds described here may be suitably used in the present invention.

The oxetane compounds described in JP-A-2004-91556 can be used in the present invention. The details are described in paragraph Nos. (0022) to (0058).

Among the oxetane compounds used in the present invention, from the viewpoint of viscosity and tackiness of the ink composition, it is preferable to use a compound having one oxetane ring.

The ink composition of the present invention may comprise only one type of cationically polymerizable compound or two or more types thereof in combination, but from the viewpoint of suppressing effectively shrinkage during ink curing, it is preferable to use a combination of a vinyl ether compound and at least one type of compound selected from the oxetane compounds and the epoxy compounds.

The content of (B) the cationically polymerizable compound in the ink composition is suitably in the range of 10 to 95 wt % relative to the total solids content of the composition, preferably 30 to 93 wt %, and more preferably 50 to 85 wt %. In the present invention, the solids content means the composition that obtained by eliminating the volatile compound such as solvent, which will be described later, from the ink composition.

(C) Acid Generator

The ink composition of the present invention preferably comprises an acid generator and/or a radical polymerization initiator, which will be described later.

In the ink composition of the present invention, when the cationically polymerizable compound (B) is used, it is preferable to use an acid generator (C).

The acid generator (C) that can be used in the present invention is a compound that can release an acid upon exposure to actinic radiation, and is particularly preferably an onium salt double salt that releases a Lewis acid upon exposure, or a derivative thereof.

Representative examples of such a compound include a salt of a cation and an anion, represented by the formula $[A]^{m+}[B]^{m-}$.

The cation $A^{m+}$ is preferably an onium, and its structure may be represented by, for example, $[(R^1)_a Z]^{m+}$.

Here, $R^1$ denotes an organic group having 1 to 60 carbons, and may contain any number of atoms other than carbon. a denotes an integer of 1 to 5. a $R^1$s are independent from each other and may be identical to or different from each other. It is preferable that at least one thereof is an organic group having an aromatic ring as described above. Z denotes an atom or an atomic group selected from the group consisting of S, N, Se, Te, P, As, Sb, Bi, O, I, Br, Cl, F, and N=N. Furthermore, it is necessary that, when the valence of Z in the cation $A^{m+}$ is z, the relationship m=a−z holds.

The anion $B^{m-}$ is preferable a halide complex, and its structure may be represented by, for example, $[LX_b]^{m-}$.

Furthermore, L denotes a metal or a semi-metal (metalloid), which is the central atom of the halide complex, and specifically denotes B, P, As, Sb, Fe, Sn, Bi, Al, Ca, In, Ti, Zn, Sc, V, Cr, Mn, Co, etc. X denotes a halogen atom. b denotes an integer of 3 to 7. It is necessary that, when the valence of L in the anion $B^{m-}$ is p, the relationship m=b−p holds.

Specific preferred examples of the anion $[LX_b]^{m-}$ in the formula above include tetrafluoroborate $(BF_4)^-$, hexafluorophosphate $(PF_6)^-$, hexafluoroantimonate $(SbF_6)^-$, hexafluoroarsenate $(AsF_6)^-$, and hexachloroantimonate $(SbCl_6)^-$.

The anion $B^{m-}$ may also preferably have a structure represented by $[LX_{b-1}(OH)]^{m-}$. L, X, and b have the same meanings as above.

Examples of other anions that can be used here include perchlorate ion $(ClO_4)^-$, trifluoromethylsulfonate ion $(CF_3SO_3)^-$, fluorosulfonate ion $(FSO_3)^-$, toluenesulfonate ion, and trinitrobenzenesulfonate ion.

It is also possible to preferably use tetrakis(pentafluorophenyl)borate as the anion $B^{m-}$.

In the present invention, among such onium salts, the use of an aromatic onium salt is particularly effective. In particular, aromatic halonium salts described in JP-A-50-151997 and JP-A-50-158680, group VIA aromatic onium salts described in JP-A-50-151997, JP-A-52-30899, JP-A-56-55420, and JP-A-55-125105, a group VA aromatic onium salt described in JP-A-50-158698, oxosulfoxonium salts described in JP-A-56-8428, JP-A-56-149402, and JP-A-57-192429, an aromatic diazonium salt described in JP-A-49-17040, a thiopyrylium salt described in U.S. Pat. No. 4,139,655, etc. are preferable. Other preferred examples include an iron/arene complex or an aluminum complex/photolytic silicon compound-based initiator.

Among these aromatic onium salts, particularly preferred examples include those comprising as a cation a sulfonium cation represented by the formulae below, (tolylcumyl)iodonium, bis(tert-butylphenyl)iodonium, and triphenylsulfonium.

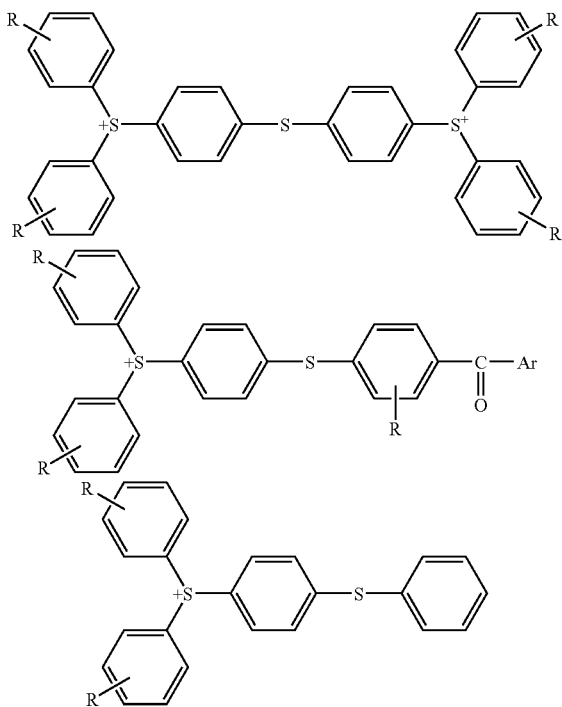

(In the formulae, the Rs may be identical to or different from each other and denote a hydrogen atom, a halogen atom, a hydrocarbon group optionally containing an oxygen atom or a halogen atom, or an optionally substituted alkoxy group, and Ar denotes a phenyl group in which one or more hydrogen atoms may be substituted.)

Examples of the aromatic onium salt include 4,4'-bis(di(β-hydroxyethoxy)phenylsulfonio)phenylsulfide bishexafluorophosphate, 4-(4-benzoylphenylthio)phenyldi(4-fluorophenyl)sulfonium hexafluorophosphate, 4,4'-bis(di(β-hydroxyethoxy)phenylsulfonio)phenylsulfide bishexafluorophosphate, 4,4'-bis(di(β-hydroxyethoxy)phenylsulfonio)phenylsulfide bishexafluoroantimonate, 4,4'-bis(difluorophenylsulfonio)phenylsulfide bishexafluorophosphate, 4,4'-bis(difluorophenylsulfonio)phenylsulfide bishexafluoroantimonate, 4,4'-bis(phenylsulfonio)phenylsulfide bishexafluorophosphate, 4,4'-bis(phenylsulfonio)phenylsulfide bishexafluoroantimonate, 4-(4-benzoylphenylthio)phenyldi(4-(β-hydroxyethoxy)phenyl)sulfonium hexafluorophosphate, 4-(4-benzoylphenylthio)phenyldi(4-(β-hydroxyethoxy)phenyl)sulfonium hexafluoroantimonate, 4-(4-benzoylphenylthio)phenyldi(4-fluorophenyl)sulfonium hexafluorophosphate, 4-(4-benzoylphenylthio)phenyldi(4-fluorophenyl)sulfonium hexafluoroantimonate, 4-(4-benzoylphenylthio)phenyldiphenylsulfonium hexafluorophosphate, 4-(4-benzoylphenylthio)phenyldiphenylsulfonium hexafluoroantimonate, 4-(phenylthio)phenyldi(4-(β-hydroxyethoxy)phenyl)sulfonium hexafluorophosphate, 4-(phenylthio)phenyldi(4-(β-hydroxyethoxy)phenyl)sulfonium hexafluoroantimonate, 4-(phenylthio)phenyldi(4-fluorophenyl)sulfonium hexafluorophosphate, 4-(phenylthio)phenyldi(4-fluorophenyl)sulfonium hexafluoroantimonate, 4-(phenylthio)phenyldiphenylsulfonium hexafluorophosphate, 4-(phenylthio)phenyldiphenylsulfonium hexafluoroantimonate, 4-(2-chloro-4-benzoylphenylthio)phenylbis(4-fluorophenyl)sulfonium hexafluorophosphate, 4-(2-chloro-4-benzoylphenylthio)phenylbis(4-fluorophenyl)sulfonium hexafluoroantimonate, 4-(2-chloro-4-benzoylphenylthio)phenyldiphenylsulfonium hexafluorophosphate, 4-(2-chloro-4-benzoylphenylthio)phenyldiphenylsulfonium hexafluoroantimonate, 4-(2-chloro-4-benzoylphenylthio)phenylbis(4-hydroxyphenyl)sulfonium hexafluorophosphate, 4-(2-chloro-4-benzoylphenylthio)phenylbis(4-hydroxyphenyl)sulfonium hexafluoroantimonate, triphenylsulfonium hexafluorophosphate, triphenylsulfonium hexafluoroantimonate, (tolylcumyl)iodonium hexafluorophosphate, (tolylcumyl)iodonium hexafluoroantimonate, (tolylcumyl)iodonium tetrakis(pentafluorophenyl)borate, bis(tert-butylphenyl)iodonium hexafluorophosphate, bis(tert-butylphenyl)iodonium hexafluoroantimonate, bis(tert-butylphenyl)iodonium tetrakis(pentafluorophenyl)borate, benzyl-4-hydroxyphenylmethylsulfonium hexafluorophosphate, benzyl-4-hydroxyphenylmethylsulfonium hexafluoroantimonate, benzyldimethylsulfonium hexafluorophosphate, benzyldimethylsulfonium hexafluoroantimonate, p-chlorobenzyl-4-hydroxyphenylmethylsulfonium hexafluorophosphate, p-chlorobenzyl-4-hydroxyphenylmethylsulfonium hexafluoroantimonate, 4-acetoxyphenyldimethylsulfonium hexafluorophosphate, 4-acetoxyphenyldimethylsulfonium hexafluoroantimonate, 4-methoxycarbonyloxyphenyldimethylsulfonium hexafluorophosphate, 4-methoxycarbonyloxyphenyldimethylsulfonium hexafluoroantimonate, 4-ethoxycarbonyloxyphenyldimethylsulfonium hexafluorophosphate, 4-ethoxycarbonyloxyphenyldimethylsulfonium hexafluoroantimonate, α-naphthylmethyldimethylsulfonium hexafluorophosphate, α-naphthylmethyldimethylsulfonium hexafluoroantimonate, α-naphthylmethyltetramethylenesulfonium hexafluorophosphate, α-naphthylmethyltetramethylenesulfonium hexafluoroantimonate, cinnamyldimethylsulfonium hexafluorophosphate, cinnamyldimethylsulfonium hexafluoroantimonate, cinnamyltetramethylenesulfonium hexafluorophosphate, cinnamyltetramethylenesulfonium hexafluoroantimonate, N-(α-phenylbenzyl)-2-cyanopyridinium hexafluorophosphate, N-(α-phenylbenzyl)-2-cyanopyridinium hexafluoroantimonate, N-cinnamyl-2-cyanopyridinium hexafluorophosphate, N-cinnamyl-2-cyanopyridinium hexafluoroantimonate, N-(α-naphthylmethyl)-2-cyanopyridinium hexafluorophosphate, N-(α-naphthylmethyl)-2-cyanopyridinium hexafluoroantimonate, N-benzyl-2-cyanopyridinium hexafluorophosphate, and N-benzyl-2-cyanopyridinium hexafluoroantimonate.

In the present invention, it is also preferable to use as the acid generator a sulfonium salt represented by Formulae (3) to (6) below.

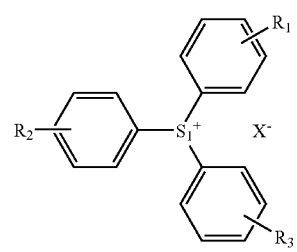

Formula (3)

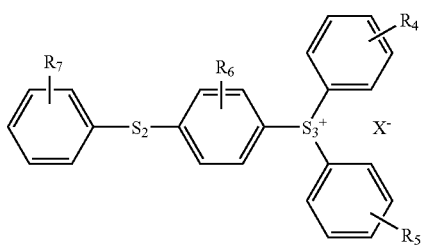

Formula (4)

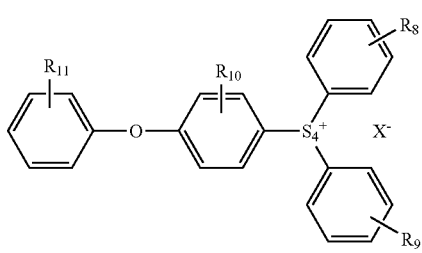

Formula (5)

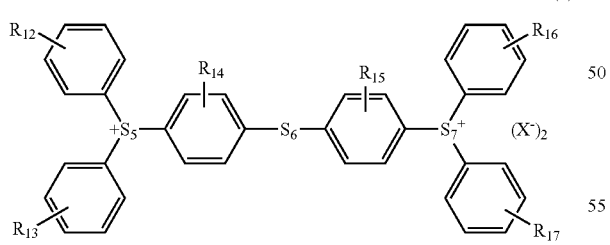

Formula (6)

In Formulae (3) to (6) above, $R_1$ to $R_{17}$ independently denote a hydrogen atom or a substituent, $R_1$ to $R_3$ do not simultaneously denote a hydrogen atom, $R_4$ to $R_7$ do not simultaneously denote a hydrogen atom, $R_8$ to $R_{11}$ do not simultaneously denote a hydrogen atom, and $R_{12}$ to $R_{17}$ do not simultaneously denote a hydrogen atom.

Preferred examples of the substituent denoted by $R_1$ to $R_{17}$ include an alkyl group such as a methyl group, an ethyl group, a propyl group, an isopropyl group, a butyl group, an isobutyl group, a t-butyl group, a pentyl group, or a hexyl group, an alkoxy group such as a methoxy group, an ethoxy group, a propoxy group, a butoxy group, a hexyloxy group, a decyloxy group, or a dodecyloxy group, a carbonyl group such as an acetoxy group, a propionyloxy group, a decylcarbonyloxy group, a dodecylcarbonyloxy group, a methoxycarbonyl group, an ethoxycarbonyl group, or a benzoyloxy group, a phenylthio group, a halogen atom such as a fluorine atom, a chlorine atom, a bromine atom, or an iodine atom, a cyano group, an amide group, a carboxyl group, a nitro group, and a hydroxy group.

Furthermore, as the acid generator, a compound represented by Formula (3) is preferable from the viewpoint of sensitivity and thermal stability. The compound represented by Formula (3) preferably has, as at least one of $R_1$ to $R_3$, an electron-withdrawing group such as a trifluoromethyl group, a halogen atom, a carbonyloxy group, a sulfoxy group, a cyano group, an amide group, a carboxyl group, or a carbonyl group, and is more preferably a triarylsulfonium salt substituted with one or more fluorine atom, trifluoromethyl group, chlorine atom, or bromine atom substituents. The compound represented by Formula (3) is more preferably a triarylsulfonium salt in which each of the aryl skeletons is substituted with at least one halogen atom, and is particularly preferably a compound in which each of the aryl skeletons is substituted with one chloro group.

X denotes a non-nucleophilic anionic residue, and examples thereof include a halogen atom such as F, Cl, Br, or I, $B(C_6F_5)_4$, $R_{18}COO$, $R_{19}SO_3$, $SbF_6$, $AsF_6$, $PF_6$, and $BF_4$. Here, $R_{18}$ and $R_{19}$ independently denote an alkyl group or a phenyl group which may be substituted with an alkyl group such as a methyl group, an ethyl group, a propyl group, or a butyl group, a halogen atom such as a fluorine atom, a chlorine atom, a bromine atom, or an iodine atom, a nitro group, a cyano group, an alkoxy group such as a methoxy group or an ethoxy group, etc. Among them, $B(C_6F_5)_4$ and $PF_6$ are preferable from the viewpoint of safety.

Specific examples of the sulfonium salts represented by Formulae (3) to (6) that can be used in the present invention include the compounds below, but are not limited thereto.

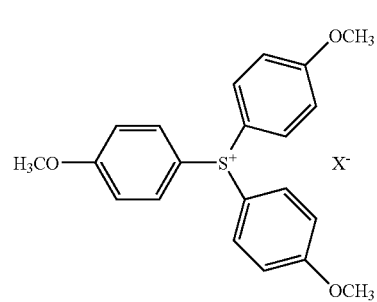

S-1

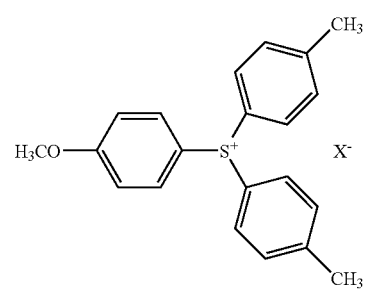

S-2

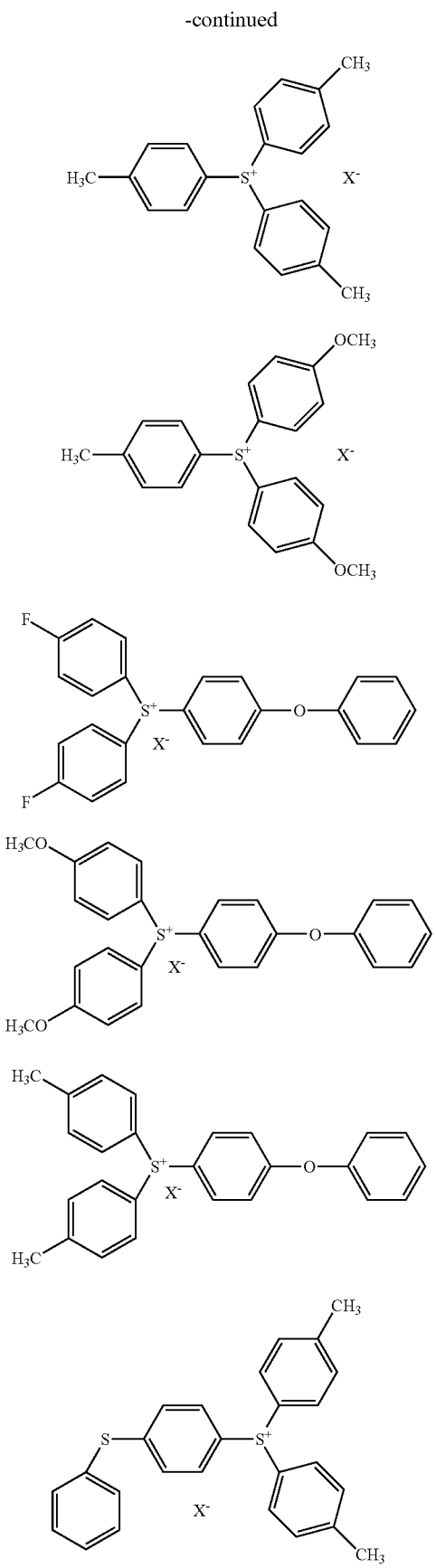
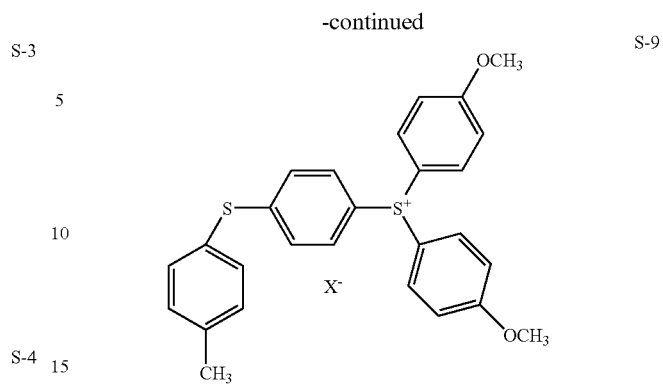

The amount of cationic polymerization initiator used is preferably 0.1 to 20 parts by weight relative to 100 parts by weight of the cationically polymerizable compound, and more preferably 0.1 to 10 parts by weight. It is preferable for the amount to be in the above-mentioned range since the curing speed is sufficient and the strength of a cured material is adequate.

(D) Radically Polymerizable Compound

The ink composition of the present invention may comprise a radically polymerizable compound.

The radically polymerizable compound referred to here means a radically polymerizable organic compound that undergoes a polymerization or crosslinking reaction upon exposure to actinic radiation in the presence of a radical polymerization initiator, and is preferably a compound having at least one ethylenically unsaturated double bond per molecule.

Known examples of the radically polymerizable compound include photocurable materials comprising photopolymerizable compositions described in JP-A-7-159983, JP-B-7-31399, JP-A-8-224982, JP-A-10-863, and JP-A-9-80675 (JP-B denotes a Japanese examined patent application publication).

Preferred examples of such a compound include an acrylate compound, a methacrylate compound, an allylurethane compound, an unsaturated polyester compound, and a styrene-based compound.

Among such radically polymerizable compounds, a compound having a (meth)acrylic group is preferable since it is easy to synthesize or obtain and is easy to handle. Examples thereof include an epoxy (meth)acrylate, a urethane (meth)acrylate, a polyester (meth)acrylate, a polyether (meth)acrylate, and a (meth)acrylate ester of an alcohol.

Here, (meth)acrylic acid means acrylic acid, methacrylic acid, or a mixture thereof, and (meth)acrylate means an acrylate, a methacrylate, or a mixture thereof.

The epoxy (meth)acrylate referred to here is a (meth)acrylate obtained by reacting, for example, a conventionally known aromatic epoxy resin, alicyclic epoxy resin, aliphatic epoxy resin, etc. with (meth)acrylic acid.

Among these epoxy (meth)acrylates, particularly preferable is an aromatic epoxy resin (meth)acrylate, which is a (meth)acrylate obtained by reacting a polyglycidyl ether of a polyhydric phenol having at least one aromatic ring or an alkylene oxide adduct thereof with (meth)acrylic acid. Examples thereof include a (meth)acrylate obtained by reacting (meth)acrylic acid and a glycidyl ether obtained by a reaction between bisphenol A or an alkylene oxide adduct thereof and epichlorohydrin, and a (meth)acrylate obtained by reacting an epoxy novolac resin with (meth)acrylic acid.

The urethane (meth)acrylate is preferably a (meth)acrylate obtained by reacting a hydroxyl group-containing (meth) acrylate ester and an isocyanate with one or more types of hydroxyl group-containing polyester or hydroxyl group-containing polyether, a (meth)acrylate obtained by reacting a hydroxyl group-containing (meth)acrylate ester and an isocyanate, etc.

Preferred hydroxyl group-containing polyesters used here are hydroxyl group-containing polyesters obtained by a reaction between one or more types of polyhydric alcohol and one or more types of polybasic acid; examples of polyhydric aliphatic alcohols include 1,3-butanediol, 1,4-butanediol, 1,6-hexanediol, diethylene glycol, triethylene glycol, neopentyl glycol, polyethylene glycol, polypropylene glycol, polybutylene glycol, trimethylolpropane, glycerol, pentaerythritol, and dipentaerythritol. Examples of the polybasic acid include adipic acid, terephthalic acid, phthalic anhydride, and trimellitic acid.

The hydroxyl group-containing polyether is preferably a hydroxyl group-containing polyether obtained by adding one or more types of alkylene oxide to a polyhydric alcohol; examples of the polyhydric alcohol include the above-mentioned compounds. Examples of the alkylene oxide include ethylene oxide, propylene oxide, and butylene oxide.

The hydroxyl group-containing (meth)acrylate ester is preferably a hydroxyl group-containing (meth)acrylate ester obtained by an esterification reaction between a polyhydric alcohol and (meth)acrylic acid; examples of the polyhydric alcohol include the above-mentioned compounds.

Among such hydroxyl group-containing (meth)acrylate esters, a hydroxyl group-containing (meth)acrylate ester obtained by an esterification reaction between a dihydric alcohol and (meth)acrylic acid is particularly preferable, and examples thereof include 2-hydroxyethyl (meth)acrylate.

The isocyanate is preferably a compound having at least one isocyanate group per molecule, and particularly preferably a divalent isocyanate compound such as tolylene diisocyanate, hexamethylene diisocyanate, or isophorone diisocyanate.

The polyester (meth)acrylate is preferably a polyester (meth)acrylate obtained by a reaction between a hydroxyl group-containing polyester and (meth)acrylic acid.

A preferred hydroxyl group-containing polyester used here is a hydroxyl group-containing polyester obtained by an esterification reaction between one or more types of polyhydric alcohol and one or more types of monobasic acid or polybasic acid, and examples of the polyhydric alcohol include the above-mentioned compounds. Examples of the monobasic acid include formic acid, acetic acid, butyric acid, and benzoic acid. Examples of the polybasic acid include adipic acid, terephthalic acid, phthalic anhydride, and trimellitic acid.

The polyether (meth)acrylate is preferably a polyether (meth)acrylate obtained by a reaction between a hydroxyl group-containing polyether and (meth)acrylic acid. A preferred hydroxyl group-containing polyether used here is a hydroxyl group-containing polyether obtained by adding one or more types of alkylene oxide to a polyhydric alcohol; examples of the polyhydric alcohol include the above-mentioned compounds. Examples of the alkylene oxide include ethylene oxide, propylene oxide, and butylene oxide.

The (meth)acrylate ester of an alcohol is preferably a (meth)acrylate obtained by a reaction between (meth)acrylic acid and an aromatic or aliphatic alcohol having at least one hydroxyl group per molecule or an alkylene oxide adduct thereof, and examples thereof include 2-ethylhexyl(meth) acrylate, 2-hydroxyethyl(meth)acrylate, 2-hydroxypropyl (meth)acrylate, isoamyl(meth)acrylate, lauryl(meth)acrylate, stearyl(meth)acrylate, isooctyl(meth)acrylate, tetrahydrofurfuryl(meth)acrylate, isobornyl(meth)acrylate, benzyl(meth)acrylate, 1,3-butanediol di(meth)acrylate, 1,4-butanediol di(meth)acrylate, 1,6-hexanediol di(meth)acrylate, diethylene glycol di(meth)acrylate, triethylene glycol di(meth)acrylate, neopentyl glycol di(meth)acrylate, polyethylene glycol di(meth)acrylate, polypropylene glycol di(meth)acrylate, trimethylolpropane tri(meth)acrylate, ethylene oxide-modified trimethylolpropane tri(meth)acrylate, propylene oxide-modified trimethylolpropane tri(meth)acrylate, pentaerythritol tetra(meth)acrylate, dipentaerythritol hexa(meth)acrylate, and β-caprolactone-modified dipentaerythritol hexa(meth)acrylate. These radically polymerizable compounds may be used singly or in a combination of two or more types according to a desired performance.

It is preferable for the compound having a (meth)acrylic group in the molecule to be at least 50 parts by weight relative to 100 parts by weight of the radically polymerizable compound.

(E) Radical Polymerization Initiator

The ink composition of the present invention preferably comprises the acid generator and/or a radical polymerization initiator.

In the ink composition of the present invention, when the radically polymerizable compound (D) is used, it is preferable for it to comprise (E) a radical polymerization initiator.

The radical polymerization initiator is a compound that can initiate radical polymerization when irradiated with energy, and examples of the radical polymerization initiator that can be preferably used in the present invention include (a) aromatic ketones, (b) organic peroxides, (c) thio compounds, (d) hexaarylbiimidazole compounds, (e) ketoxime ester compounds, (f) borate compounds, (g) azinium compounds, (h) metallocene compounds, (i) active ester compounds, (j) compounds having a carbon-halogen bond, and (k) alkylamine compounds. These radical polymerization initiators may be used singly or in a combination of the compounds (a) to (k) above.

Such a radical polymerization initiator is added preferably at 0.05 to 20 wt % relative to the radically polymerizable compound, and more preferably 0.1 to 10 wt %. It is preferable for the amount to be in the above-mentioned range since the composition can be cured sufficiently and a cured material having adequate strength can be obtained.

The ink composition of the present invention may comprise as necessary an organic compound having at least two hydroxyl groups per molecule although it is not essential. Adding an organic compound having at least two hydroxyl groups per molecule such as, for example, a polyhydric alcohol, a hydroxyl group-containing polyether, a hydroxyl group-containing polyester, or a polyhydric phenol enables the mechanical strength of a cured film to be increased.

Examples of the polyhydric alcohol include ethylene glycol, propylene glycol, neopentyl glycol, trimethylolpropane, glycerol, pentaerythritol, dipentaerythritol, 1,3-butanediol, 1,4-butanediol, and 1,6-hexanediol.

The hydroxyl group-containing polyether is a compound obtained by adding one or more types of alkylene oxide to one or more types of polyhydric alcohol or polyhydric phenol.

Examples of the polyhydric alcohol used here include ethylene glycol, propylene glycol, neopentyl glycol, trimethylolpropane, glycerol, pentaerythritol, dipentaerythritol, 1,3-butanediol, 1,4-butanediol, and 1,6-hexanediol.

Examples of the polyhydric phenol include bisphenol A, bisphenol F, a phenol novolac resin, and a cresol novolac resin.

Examples of the alkylene oxide include butylene oxide, propylene oxide, and ethylene oxide.

The hydroxyl group-containing polyester referred to here is a hydroxyl group-containing polyester obtained by an esterification reaction between one or more types of polyhydric alcohol or polyhydric phenol and one or more types of monobasic acid or polybasic acid, or a hydroxyl group-containing polyester obtained by an esterification reaction between one or more types of polyhydric alcohol or polyhydric phenol and one or more types of lactone. Examples of the polyhydric alcohol or polyhydric phenol include the above-mentioned compounds. Examples of the monobasic acid include formic acid, acetic acid, butyric acid, and benzoic acid. Examples of the polybasic acid include adipic acid, terephthalic acid, and trimellitic acid. Examples of the lactone include β-propiolactone, γ-butyrolactone, and ε-caprolactone.

The polyhydric phenol referred to here is a compound having at least two hydroxyl groups per molecule directly bonded to the aromatic ring, and examples thereof include the above-mentioned compounds.

In the present invention, various types of resin additives such as a thermoplastic polymer compound, a filler, a colorant, a leveling agent, an anti-foaming agent, a viscosity-increasing agent, a flame retardant, an antioxidant, and a stabilizer may be added as desired in a normally used range as long as they do not interfere with the effects of the present invention.

(C) Colorant

The colorant that can be used in the present invention is not particularly limited, but a pigment and an oil-soluble dye that have excellent weather resistance and rich color reproduction are preferable, and it may be selected from any known colorant such as a soluble dye. It is preferable that the colorant that can be suitably used in the ink composition of the present invention does not function as a polymerization inhibitor in a polymerization reaction, which is a curing reaction. This is because the sensitivity of the curing reaction by actinic radiation should not be degraded.

(C-1) Pigment

The pigment that can be used in the present invention is not particularly limited and, for example, organic and inorganic pigments having the numbers below described in the Color Index may be used.

That is, as a red or magenta pigment, Pigment Red 3, 5,19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

(C-2) Oil-Soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called, water-insoluble pigment or an oil-soluble dye, and among these the oil-soluble dye is preferable.

In the present invention, the oil-soluble dye may be used singly or in a combination of two or more types. Furthermore, another colorant such as a water-soluble dye, a disperse dye, or a pigment may be contained as necessary in a range that does not interfere with the effects of the present invention.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2,11, 25, 35, 38, 67, and 70; CI Solvent Green 3 and 7; and CI Solvent Orange 2. Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, a disperse dye may be used in a range that enables it to be dissolved in a water-immiscible organic solvent. Specific preferred examples thereof include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and Cl Disperse Green 6:1 and 9.

Particularly preferred examples of the oil-soluble dye include azo and azomethine dyes represented by Formulae (1) and (2) below. Dyes represented by Formula (2) below are known, in the photographic material area, as dyes that are generated from a coupler and a developing agent by oxidation.

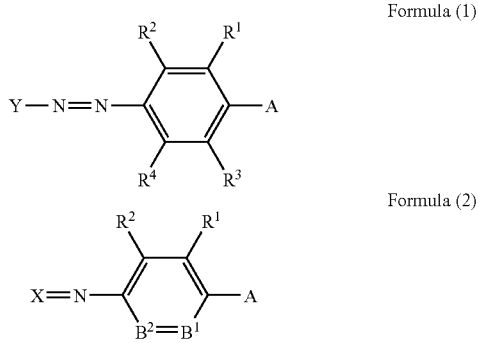

In Formulae (1) and (2) above, $R^1$, $R^2$, $R^3$ and $R^4$ independently denote a hydrogen atom, a halogen atom, an aliphatic group, an aromatic group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, a sulfonyl group, an alkoxycarbonyl group, a heterocyclooxy group, an azo group, an acyloxy group, a carbamoyloxy group, a silyloxy group, an aryloxycarbonyl group, an aryloxycarbonylamino group, an imide group, a heterocyclothio group, a sulfinyl group, a phosphoryl group, an acyl group, a carboxyl group, or a sulfo group.

In Formulae (1) and (2) above, in particular, $R^2$ is preferably, among the above-mentioned substituents, a hydrogen atom, a halogen atom, an aliphatic group, an alkoxy group, an aryloxy group, an amide group, a ureido group, a sulfamoylamino group, an alkoxycarbonylamino, or a sulfonamide group.

In the present specification, the aliphatic group denotes an alkyl group, a substituted alkyl group, an alkenyl group, a substituted alkenyl group, an alkynyl group, a substituted alkynyl group, an aralkyl group, or a substituted aralkyl group. The aliphatic group may have a branch or form a ring. The number of carbon atoms of the aliphatic group is preferably 1 to 20, and more preferably 1 to 18. The aryl moiety of the aralkyl group and the substituted aralkyl group is preferably phenyl or naphthyl, and particularly preferably phenyl. Examples of the substituents of the alkyl moieties of the substituted alkyl group, the substituted alkenyl group, the substituted alkynyl group, and the substituted aralkyl group include the substituents cited for explanation of $R^1$ to $R^4$. Examples of the substituents of the aryl moiety of the substituted aralkyl group are the same as those of the substituent of the substituted aryl group below.

In the present specification, the aromatic group means an aryl group and a substituted aryl group. The aryl group is preferably phenyl or naphthyl, and particularly preferably phenyl. The aryl moiety of the substituted aryl group is the same as that of the above-mentioned aryl group. Examples of the substituent of the substituted aryl group include substituents cited for explanation of $R^1$ to $R^4$.

In Formulae (1) and (2) above, A denotes —$NR^5R^6$ or a hydroxyl group, and $R^5$ and $R^6$ independently denote a hydrogen atom, an aliphatic group, an aromatic group, or a heterocyclic group. A is preferably —$NR^5R^6$. $R^5$ and $R^6$ may be bonded together to form a ring. $R^5$ and $R^6$ preferably each denote a hydrogen atom, an alkyl group, a substituted alkyl group, an aryl group, or a substituted aryl group, and most preferably a hydrogen atom, an alkyl group having 1 to 18 carbon atoms, or a substituted alkyl group having 1 to 18 carbon atoms.

In Formula (2) above, $B^1$ denotes =$C(R^3)$— or =N—, and $B^2$ denotes —$C(R^4)$=or —N=. It is preferable that $B^1$ and $B^2$ are not —N= at the same time, and it is more preferable that $B^1$ is =$C(R^3)$— and $B^2$ is —$C(R^4)$=. In Formula (1) and Formula (2) above, any of $R^1$ and $R^5$, $R^3$ and $R^6$, and $R^1$ and $R^2$ may be bonded together to form an aromatic ring or a hetero ring.

In Formula (1) above, Y denotes an unsaturated heterocyclic group. Y is preferably a five-membered or six-membered unsaturated hetero ring. The hetero ring may be condensed with an aliphatic ring, an aromatic ring, or another hetero ring. Examples of the hetero atom of the hetero ring include N, O, and S.

Preferred examples of the above-mentioned unsaturated hetero ring include a pyrazole ring, an imidazole ring, a thiazole ring, an isothiazole ring, a thiadiazole ring, a thiophene ring, a benzothiazole ring, a benzoxazole ring, a benzoisothiazole ring, a pyrimidine ring, a pyridine ring, and a quinoline ring. It is also possible for the unsaturated heterocyclic group to have a substituent cited above as $R^1$ to $R^4$.

In Formula (2) above, X denotes a color photographic coupler residue. Preferred examples of the color photographic coupler residue are as follows.

Yellow couplers: U.S. Pat. Nos. 3,933,501, 4,022,620, 4,326,024, and 4,401,752, 4,428,961, JP-B-58-10739, GB Pat. Nos. 1,425,020 and 1,476,760, U.S. Pat. Nos. 3,973,968, 4,314,023, and 4,511,649, and EP Pat. No. 249,473A and couplers represented by Formulae (I) and (II) in U.S. Pat. No. 502,424A; couplers represented by Formulae (1) and (2) in EP Pat. No. 513,496A (in particular, Y-28 on page 18); couplers represented by Formula (I) of claim 1 in EP Pat. No. 568,037A; couplers represented by Formula (I) of lines 45 to 55 in Column 1 in U.S. Pat. No. 5,066,576; couplers represented by Formula (I) in Paragraph 0008 in JP-A-4-274425; couplers of claim 1 on page 40 in EP Pat. No. 498,381A1 (in particular, D-35 on page 18); couplers represented by Formula (Y) on page 4 in EP Pat. No. 447,969A1 (in particular, Y-1 (page 17) and Y-54 (page 41)); and couplers represented by Formulae (II) to (IV) on lines 36 to 58 of Column 7 in U.S. Pat. No. 4,476,219 (in particular, II-17 and 19 (Column 17), and II-24 (Column 19)).

Magenta couplers: U.S. Pat. Nos. 4,310,619 and 4,351,897, EP Pat. No. 73,636, U.S. Pat. Nos. 3,061,432 and 3,725,067, Research Disclosure No. 24220 (June, 1984) and No. 24230 (June, 1984), JP-A-60-33552, JP-A-60-43659, JP-A-61-72238, JP-A-60-35730, JP-A-55-118034, JP-A-60-185951, U.S. Pat. Nos. 4,500,630, 4,540,654, and 4,556,630, WO88/04795, JP-A-3-39737 (L-57 (page 11, lower right), L-68 (page 12, lower right), L-77 (page 13, lower right)), EP Pat. No. 456,257 [A-4]-63 (p. 134), [A-4]-73, -75 (p. 139), EP Pat. No. 486,965 M-4, M-6 (p. 26), M-7 (p. 27), EP Pat. No. 571,959A M-45 (p. 19), JP-A-5-204106 M-1 (p. 6), and JP-A-4-362631 paragraph No. 0237, M-22, and U.S. Pat. Nos. 3,061,432 and 3,725,067.

Cyan coupler: U.S. Pat. Nos. 4,052,212, 4,146,396, 4,228,233, and 4,296,200, EP Pat. No. 73,636, JP-A-4-204843, CX-1, 3, 4, 5, 11, 12, 14, 15 (pp. 14 to 16); JP-A-4-43345 C-7, 10 (p. 35), 34, 35 (p. 37), (I-1), (I-17) (pp. 42 to 43); and couplers represented by Formula (Ia) or (Ib) of claim 1 in JP-A-6-67385.

Furthermore, couplers described in JP-A-62-215272 (p. 91), JP-A-2-33144 (p. 3 and 30), EP 355,660A (p. 4, 5, 45 and 47) are also useful.

Among the oil-soluble dyes represented by Formula (1) above, the magenta dyes particularly preferably used are dyes represented by Formula (3) below.

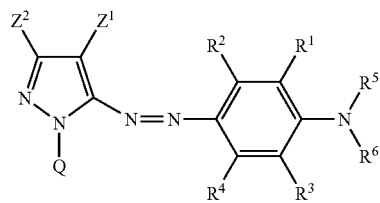

Formula (3)

In Formula (3) above, $Z^1$ denotes an electron-attracting group having a Hammett substituent constant up value of equal to or greater than 0.20. $Z^1$ is preferably an electron-attracting group having a up value of at least 0.30 but no greater than 1.0. Preferred specific examples of the substituent include electron-attracting substituents that are described later, and among them an acyl group having 2 to 12 carbons, an alkyloxy carbonyl group having 2 to 12 carbons, a nitro group, a cyano group, an alkylsulfonyl group having 1 to 12 carbons, an arylsulfonyl group having 6 to 18 carbons, a carbamoyl group having 1 to 12 carbons, and a haloalkyl group having 1 to 12 carbons are preferable. A cyano group, an alkylsulfonyl group having 1 to 12 carbons, and an arylsulfonyl group having 6 to 18 carbons are particularly preferable, and a cyano group is most preferable.

In Formula (3) above, $Z^2$ denotes a hydrogen atom, an aliphatic group, or an aromatic group.

In Formula (3) above, $R^1$ to $R^6$ are the same as the corresponding ones of Formula (1) above.

In Formula (3) above, Q denotes a hydrogen atom, an aliphatic group, an aromatic group, or a heterocyclic group. Among them, Q is preferably a group formed from a group of non-metal atoms necessary to form a 5- to 8-membered ring. Among them an aromatic group and a heterocyclic group are particularly preferable. The 5- to 8-membered ring may be substituted, may be a saturated ring, or may have an unsaturated bond. Preferred examples of the non-metal atom include a nitrogen atom, an oxygen atom, a sulfur atom, and a carbon atom. Specific examples of such ring structures include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzoimidazole ring, an oxazole ring, a benzoxazole ring, an oxane ring, a sulfolane ring, and a thiane ring, and in a case where these rings have a further substituent, examples of the substituent include groups cited as examples of substituents $R^1$ to $R^4$ in Formula (1) above.

Preferred structures of the compounds represented by Formula (3) above are described in JP-A-2001-335714.

Among the dyes represented by Formula (2) above, the magenta dye particularly preferably employs a dye represented by Formula (4) below.

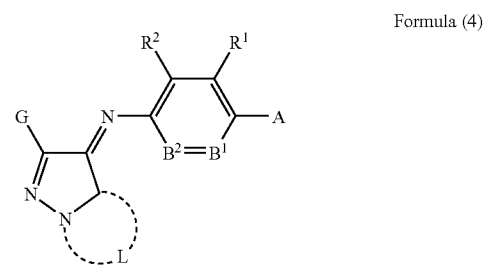

Formula (4)

In Formula (4) above, G denotes a hydrogen atom, an aliphatic group, an aromatic group, a heterocyclic group, a cyano group, an alkoxy group, an aryloxy group, an alkylthio group, an arylthio group, an ester group, an amino group, a carbamoyl group, a sulfonyl group, a sulfamoyl group, a ureido group, a urethane group, an acyl group, an amide group, or a sulfonamide group.

In Formula (4) above, $R^1$, $R^2$, A, $B^1$, and $B^2$ are the same as the corresponding ones of Formula (2) above, and preferred ranges are also the same.

In Formula (4) above, L denotes an atomic group forming a five-membered or six-membered nitrogen-containing hetero ring, which may be substituted with at least one of an aliphatic group, an aromatic group, a heterocyclic group, a cyano group, an alkoxy group, an aryloxy group, an alkylthio group, an arylthio group, an ester group, an amino group, a carbamoyl group, a sulfonyl group, a sulfamoyl group, a ureido group, a urethane group, an acyl group, an amide group, and a sulfonamide group, and this hetero ring may further form a condensed ring with another ring.

With regard to compounds represented by Formula (4) above, A is preferably —$NR^5R^6$, and L preferably forms a five-membered nitrogen-containing hetero ring; examples of the five-membered nitrogen-containing hetero ring include an imidazole ring, a triazole ring, and a tetrazole ring.

Among the dyes represented by Formula (1) and Formula (2) above, compound examples (M0, M-1 to 6, a-21 to 25) for a magenta dye are shown below, but these are only for explaining the present invention in detail, and the present invention should not be construed as being limited thereto.

In the present invention, M-0, M-4, M-6, or a-21 may be preferably used, and M-4, M-6, or a-21 may be particularly preferably used.

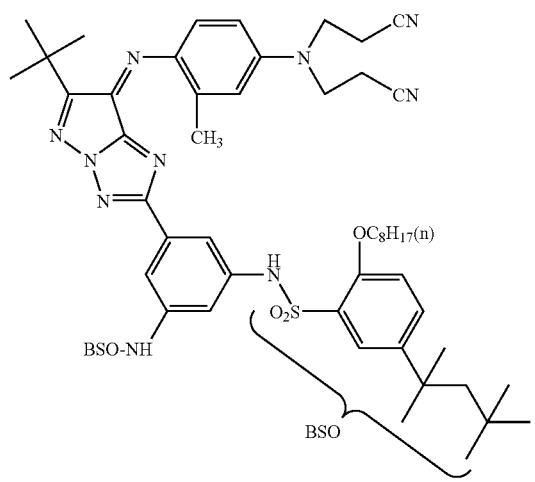
M-0
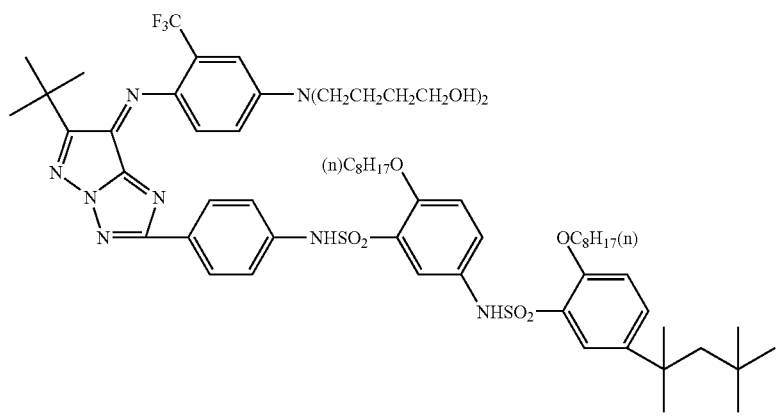
M-1
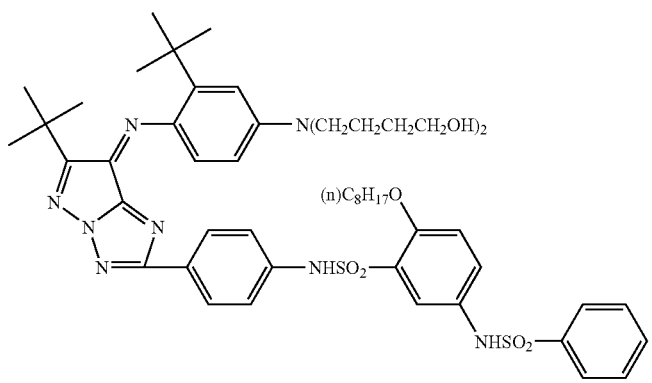
M-2
M-3

-continued
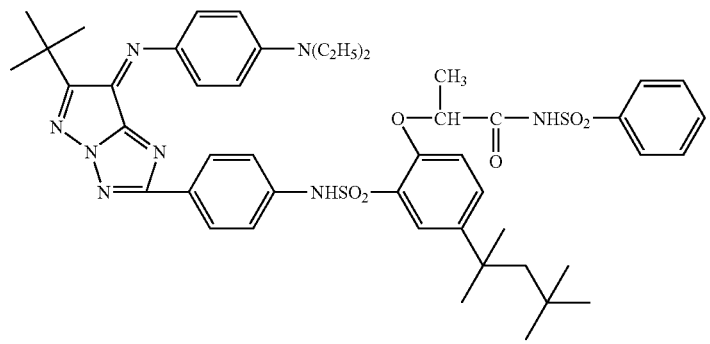
M-4
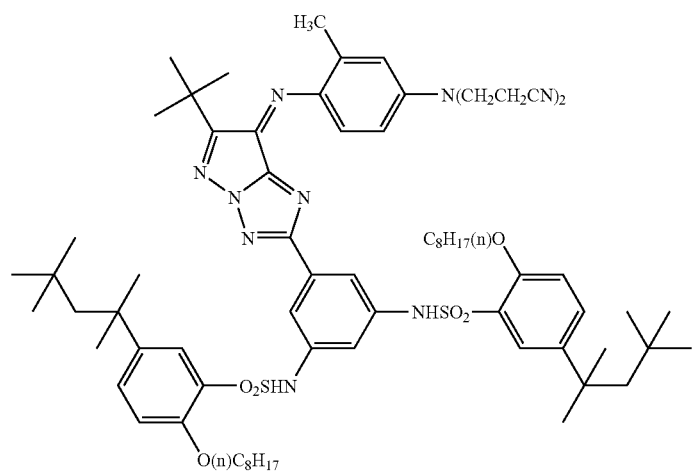
M-5
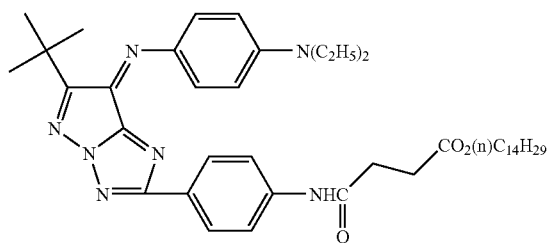
M-6
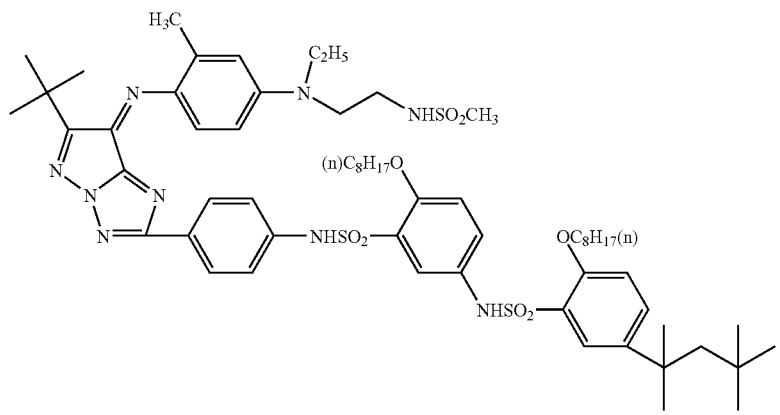

-continued
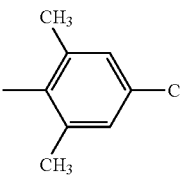
| Dye | R₁ | R₂ | R₃ | R₄ |
|---|---|---|---|---|
| a-21 | A | A | 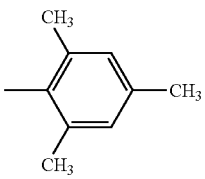 | 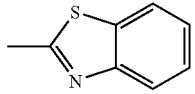 |
| a-22 | 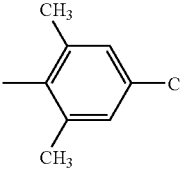 | A | 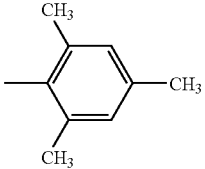 | 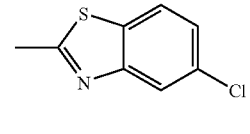 |
| a-23 | 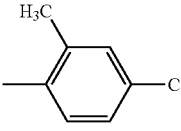 | B | 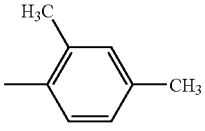 | 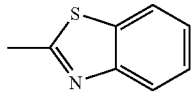 |
| a-24 | 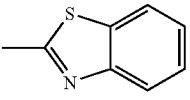 | 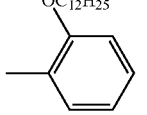 | 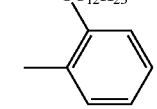 | 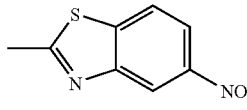 |
| a-25 | 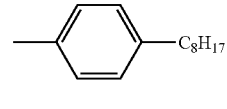 | C | 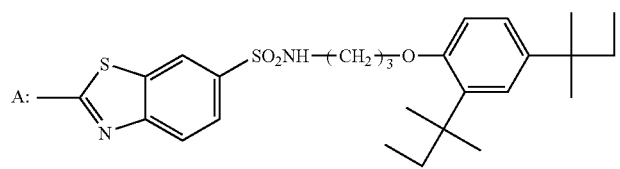 | $C_8H_{17}(t)$ |
A: 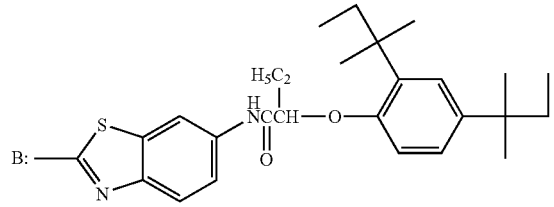
B:

-continued

C: 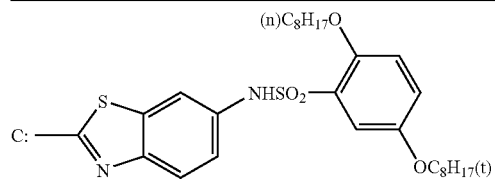

Other compound examples of the colorant that can be used in the present invention include those described in JP-A-2001-240763, 2001-181549, and JP-A-2001-335714, but the present invention should not be construed as being limited thereto.

The compound represented by Formula (3) above may be synthesized by reference to a method described in, for example, JP-A-2001-335714 or JP-A-55-161856. The compound represented by Formula (4) above may be synthesized by reference to a method described in, for example, JP-A-4-126772, JP-B-7-94180, or JP-A-2001-240763.

Among the dyes represented by Formula (2) above, as a cyan dye a pyrrolotriazole azomethine dye represented by Formula (5) below is particularly preferably used.

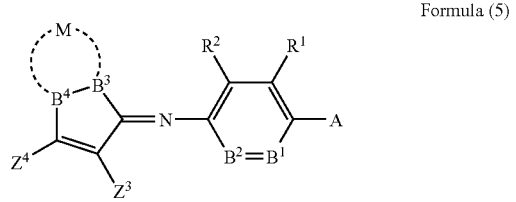

Formula (5)

In Formula (5) above, A, $R^1$, $R^2$, $B^1$, and $B^2$ are the same as the corresponding ones of Formula (2) above, and preferred ranges thereof are also the same.

In Formula (5) above, $Z^3$ and $Z^4$ are independently the same as G in Formula (4) above. $Z^3$ and $Z^4$ may be bonded together to form a ring structure. One in which $Z^3$ is an electron-attracting group having a Hammett substituent constant σp value of equal to or greater than 0.30 exhibits a sharp absorption and is more preferable. Moreover, one in which $Z^3$ is an electron-attracting group having a Hammett substituent constant σp value of equal to or greater than 0.45 is more preferable, and an electron-attracting group having a Hammett substituent constant σp value of equal to or greater than 0.60 is most preferable. Furthermore, one in which the sum of the Hammett substituent constant σp values of $Z^3$ and $Z^4$ is equal to or greater than 0.70 exhibits excellent hue of a cyan-color, and is more preferable.

In Formula (5) above, M is an atomic group forming a 1,2,4-triazole ring that is condensed with the 5-membered ring of Formula (5) above; either one of the two atoms $B^3$ and $B^4$ at the sites of condensation with the 5-membered ring is a nitrogen atom, and the other is a carbon atom.

The compound represented by Formula (5) above is preferably used as a cyan dye, but it may be used as a magenta dye by changing a substituent.

The Hammett substituent constant σp value used in the present specification is now explained. The Hammett rule is an empirical rule proposed by L. P. Hammett in 1935 in order to quantitatively deal with the influence of a substituent on a reaction or equilibrium of a benzene derivative, and the validity thereof is currently widely recognized. A ρτ value and a σm value are required for the substituent constant in the Hammett rule, and details of these values can be referred to in many general books, for example, 'Lange's Handbook of Chemistry', Ed. by J. A. Dean, 12th edition, 1979 (Mc Graw-Hill) or 'Kagakuno Ryouiki' (Journal of Japanese Chemistry), special issue, 122, pp. 96 to 103, 1979 (Nankodo Co., Ltd.). In the present invention, the substituents are limited or explained using the Hammett substituent constant σp, but this does not mean that they are limited to substituents whose values are described in published references, and a substituent whose value is not published in the references but is included in the range if it is measured in accordance with the Hammett rule is of course included. Among Formulae (1) to (5) above, those that are not benzene derivatives are also included, but the σp value is used as a scale showing the electronic effect of the substituent, irrespective of the position of substitution. The σp value in the present invention is used with the above-mentioned meaning.

Examples of electron-attracting groups having a Hammett substituent constant σp value of equal to or greater than 0.60 include a cyano group, a nitro group, an alkylsulfonyl group (e.g. a methanesulfonyl group), and an arylsulfonyl group (e.g. a benzenesulfonyl group). Examples of electron-attracting groups having a Hammett σp value of equal to or greater than 0.45 include, in addition to the above, an acyl group (e.g. an acetyl group), an alkoxycarbonyl group (e.g. a dodecyloxycarbonyl group), an aryloxycarbonyl group (e.g. m-chlorophenoxycarbonyl), an alkylsulfinyl group (e.g. n-propylsulfinyl), an arylsulfinyl group (e.g. phenylsulfinyl), a sulfamoyl group (e.g. N-ethylsulfamoyl, N,N-dimethylsulfamoyl), and a haloalkyl group (e.g. trifluoromethyl).

Examples of electron-attracting groups having a Hammett substituent constant σp value of equal to or greater than 0.30 include, in addition to the above, an acyloxy group (e.g. acetoxy), a carbamoyl group (e.g. N-ethylcarbamoyl, N,N-dibutylcarbamoyl), a haloalkoxy group (e.g. trifluoromethyloxy), a haloaryloxy group (e.g. pentafluorophenyloxy), a sulfonyloxy group (e.g. a methylsulfonyloxy group), a haloalkylthio group (e.g. difluoromethylthio), an aryl group substituted with two or more electron-attracting groups having a σp value of equal to or greater than 0.15 (e.g. 2,4-dinitrophenyl, pentachlorophenyl), and a hetero ring (e.g. 2-benzooxazolyl, 2-benzothiazolyl, 1-phenyl-2-benzimidazolyl). Specific examples of electron-attracting groups having a σp value of equal to or greater than 0.20 include, in addition to the above, a halogen atom.

Furthermore, in the present invention, an oil-soluble dye represented by Formula (A-I) below can be used preferably.

Formula (A-I)

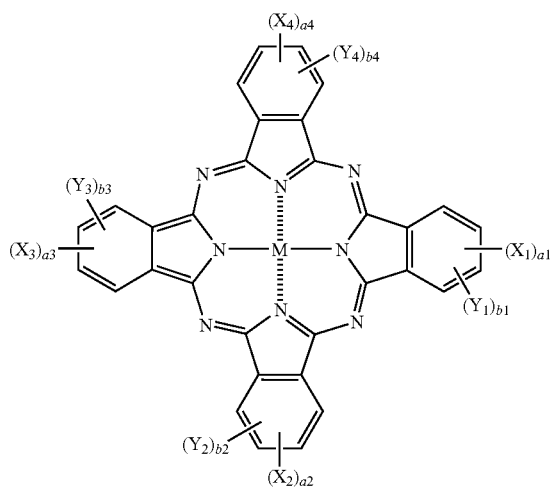

In Formula (A-I): $X_1$, $X_2$, $X_3$, and $X_4$ independently denote a group selected from —SO-Z, —SO$_2$-Z, —SO$_2$NR$_1$R$_2$, —CONR$_1$R$_2$, —CO$_2$R$_1$, and a sulfo group. Here, Z denotes a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. $R_1$ and $R_2$ independently denote a hydrogen atom, a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that $R_1$ and $R_2$ are not both hydrogen atoms. M denotes a hydrogen atom, a metal element, a metal oxide, a metal hydroxide, or a metal halide. $Y_1$, $Y_2$, $Y_3$, and $Y_4$ independently denote a hydrogen atom or a monovalent substituent. $a_1$ to $a_4$ and $b_1$ to $b_4$ denote the numbers of $X_1$ to $X_4$ and $Y_1$ to $Y_4$, and independently denote an integer of 0 to 4, provided that the sum total of $a_1$ to $a_4$ is equal to or greater than 2.

Among the oil-soluble dyes represented by Formula (A-I) above, an oil-soluble dye represented by Formula (A-II) below may particularly preferably be used.

Formula (A-II)

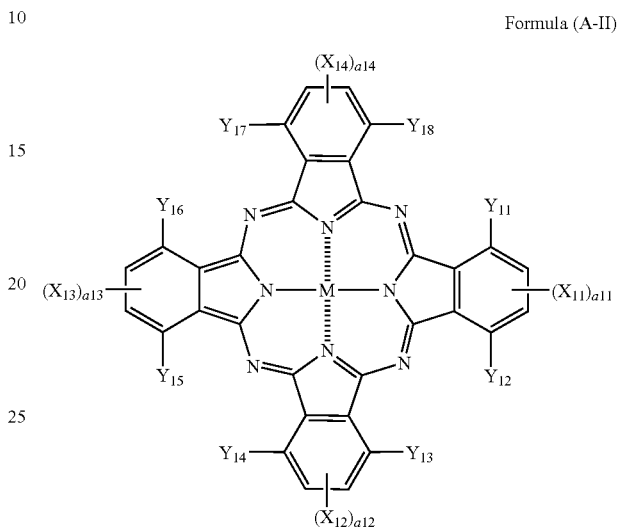

In Formula (A-II): $X_{11}$ to $X_{14}$, $Y_{11}$ to $Y_{18}$, and M are the same as $X_1$ to $X_4$, $Y_1$ to $Y_4$, and M in Formula (A-I) respectively. $a_{11}$ to $a_{14}$ independently denote an integer of 1 or 2.

As a specific example of Formula (A-II) above, a compound example (AII-17) is cited, but this is for explaining the present invention in detail, and the present invention should not be construed as being limited thereto.

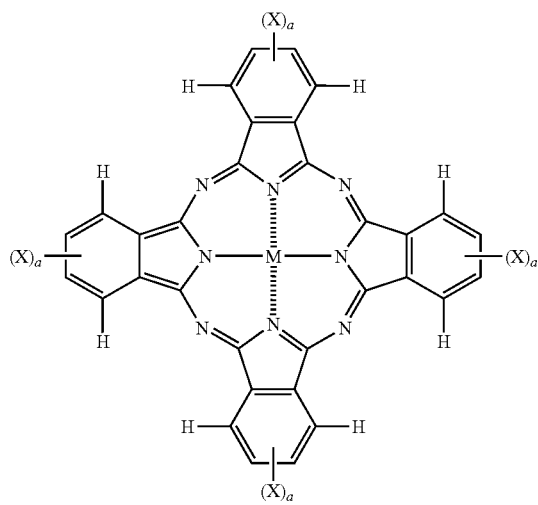

| Compound No. | M | X | a |
|---|---|---|---|
| AII-17 | Cu | —SO$_2$—(CH$_2$)$_3$—SO$_2$NH—(CH$_2$)$_3$—O—CH(CH$_3$)$_2$ | 1 |

-continued

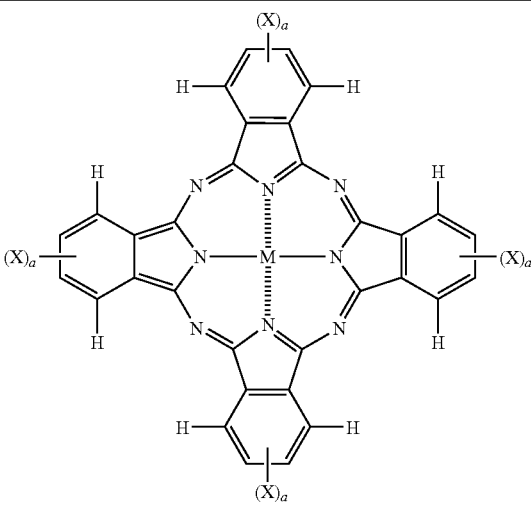

| Compound No. | M | X | a |
|---|---|---|---|
| AII-18 | Cu | —SO$_2$—(CH$_2$)$_3$—CO—O—CH(CH$_3$)—CH$_2$—CH$_3$ | 1 |
| AII-19 | Cu | —SO$_2$—(CH$_2$)$_3$—CO—O—CH(CH$_3$)—CH$_2$OCH$_3$ | 1 |
| AII-20 | Cu | —SO$_2$—CH$_2$CO—CH$_2$CH(C$_2$H$_5$)—C$_4$H$_9$ | 1 |
| AII-21 | Cu | —SO$_2$NH—(CH$_2$)$_3$—N(—C$_3$H$_7$OC(O)—C$_6$H$_4$—SO$_3^-$ $^+$NH(C$_6$H$_{13}$)$_3$)$_3$ | 1 |
| AII-22 | Cu | —SO$_2$—CH$_2$CH$_2$NHC(O)NH—C$_6$H$_{11}$ | 1 |
| AII-23 | Cu | —SO$_2$—(CH$_2$)$_3$—OC(O)NH—C$_6$H$_5$ | 1 |

In the present invention, it is preferable to use an oil-soluble dye having an oxidation potential that is more noble than 1.0 V (SCE). The more noble the oxidation potential, the more preferable it is; it is more preferable to use one having an oxidation potential more noble than 1.1 V (SCE), and it is most preferable to use one having an oxidation potential more noble than 1.2 V (SCE).

The oxidation potential value (Eox) can be easily measured by one skilled in the art and a method therefor is described in, for example, P. Delahay, 'New Instrumental Methods in Electrochemistry', Interscience Publishers (1954), A. J. Bard et al., 'Electrochemical Methods', John Wiley & Sons (1980), and Akira Fujishima et al., 'Denkikagaku Sokuteihou' (Electrochemical Measurement Methods), Gihodo Shuppan Sha (1984).

More specifically, a test sample is dissolved to give a concentration of $1 \times 10^{-4}$ to $1 \times 10^{-6}$ mol/L in a solvent such as dimethylformamide or acetonitrile containing a supporting electrolyte such as sodium perchlorate or tetrapropylammonium perchlorate, an oxidation wave when sweeping toward the oxidation side (noble side) using carbon (GC) as a working electrode and a rotating platinum electrode as the counter electrode using cyclic voltammetry or direct current polarographic equipment is approximated to a straight line, and the oxidation potential of the midpoint of a line segment formed between an intersection point of the straight line and a residual current/potential straight line and an intersection point of the straight line and a saturated current straight line (or an intersection point with a straight line parallel to the ordinate passing through the potential peak value) is measured as a value relative to the SCE (saturated calomel electrode). This value sometimes deviates by on the order of tens of millivolts due to the effect of a liquid junction potential, the liquid resistance of the sample solution, or the like, but the reproducibility of the potential can be guaranteed by adding a standard sample (for example, hydroquinone). The support electrolyte and solvent used may be selected appropriately according to the oxidation potential and the solubility of the test sample. The support electrolyte and solvent that can be used here may be referred to in Akira Fujishima et al., 'Denkikagaku Sokuteihou' (Electrochemical Measurement Methods), Gihodo Shuppan Sha (1984), pp. 101 to 118.

In the concentration range of the above-mentioned measurement solvent and a phthalocyanine compound sample, the oxidation potential of a disassociated state is measured.

The value of Eox represents the ease of electron transfer from a sample to an electrode; the larger the value (the more noble the oxidation potential), the more difficult it is for electrons to transfer from the sample to the electrode, in other words, the more difficult it is to oxidize.

If a dye having a low oxidation potential is used, polymerization is greatly inhibited by the dye, and the curability is degraded. When a dye having a noble oxidation potential is used, there is hardly any inhibition of polymerization.

The colorant that can be used in the present invention is preferably added to the ink composition or the inkjet recording ink composition of the present invention and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

When carrying out dispersion of the colorant, a dispersant may be added. The type of dispersant is not particularly limited, but it is preferable to use a polymeric dispersant, and examples of the polymeric dispersant include the Solsperse series manufactured by Avecia. Furthermore, as a dispersion adjuvant, it is also possible to use a synergist, according to the various types of pigment. In the present invention, the dispersant and dispersion adjuvant are preferably added at 1 to 50 parts by weight relative to 100 parts by weight of the pigment.

The colorant may be added directly to the ink composition of the present invention, but in order to improve dispersibility it may be added in advance to a solvent or a dispersing medium such as a polymerizable compound used in the present invention. In the present invention, in order to avoid the problem of the solvent resistance being degraded when the solvent remains in the cured image and the VOC (Volatile Organic Compound) problem of the residual solvent, it is preferable to add the colorant to a polymerizable compound. As a polymerizable compound used, it is preferable in terms of dispersion suitability to select a monomer having the lowest viscosity.

In the present invention, it is preferable for the average particle size of the colorant particles to be in the range of 0.005 to 0.5 μm, more preferably 0.01 to 0.45 μm, and yet more preferably, 0.015 to 0.3 μm. Furthermore, the maximum particle size of the colorant is preferably 0.3 to 10 μm, and more preferably 0.3 to 3 μm. In order to make the maximum particle size of the colorant be in the above-mentioned range, the colorant the dispersant, and the dispersing medium are selected, and dispersion conditions and filtration conditions ace set. By such control of particle size, clogging of a head nozzle can be suppressed, and the ink storage stability the ink transparency, and the curing sensitivity can be maintained.

(G) Other Components

The ink composition of the present invention may comprise other components as necessary. Examples of the other components include a polymerization inhibitor a basic compound, a fluorine- and/or silicon-based surfactant, and a solvent.

Polymerization Inhibitor

It is preferable to add a polymerization inhibitor from the viewpoint of enhancing the storage stability. The polymerization inhibitor is preferably added at 200 to 20,000 ppm relative lo the total amount of the ink composition of the present invention. Examples of the polymerization inhibitor include hydroquinone, benzoquinone, p-methoxyphenol, TEMPO, TEMPOL, and cupferron A', When the ink composition of the present invention is used as an ink composition for inkjet recording, it is preferable to hear it in the range of 40° C. to 80° C. so as to reduce the viscosity and discharge it, and it is preferable to add a polymerization inhibitor in order to prevent a head from clogging due to thermal polymerization.

Basic Compound

The ink composition of the present invention preferably comprises a basic compound in order to reduce a change in performance with time from exposure to heating.

The basic compound is preferably added from the viewpoint of improving the storage stability of the ink composition. A basic compound that can be used in the present invention is a known basic compound, and preferred examples thereof include a basic inorganic compound such as an inorganic salt or a basic organic compound such as an amine.

As a preferred structure, structures represented by Formulae (A') to (E') below can be cited.

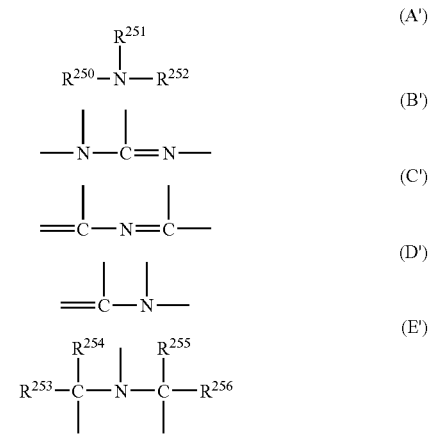

Here, $R^{250}$, $R^{251}$, and $R^{252}$ independently denote a hydrogen atom, an alkyl group having 1 to 20 carbons, a cycloalkyl group having 3 to 20 carbons, or an aryl group having 6 to 20 carbons, and $R^{250}$ and $R^{251}$ may be bonded to each other to form a ring. They may have a substituent, and as alkyl and cycloalkyl groups having a substituent, an aminoalkyl group having 1 to 20 carbons, an aminocycloalkyl group having 3 to 20 carbons, a hydroxyalkyl group having 1 to 20 carbons, and a hydroxycycloalkyl group having 3 to 20 carbons are preferable.

They may contain an oxygen atom, a sulfur atom, or a nitrogen atom in the alkyl chain.

In the formula, $R^{253}$, $R^{254}$ $R^{255}$ and $R^{256}$ independently denote an alkyl group having 1 to 6 carbons or a cycloalkyl group having 3 to 6 carbons.

Examples of preferred compounds include guanidine, aminopyrrolidine, pyrazole, pyrazoline, piperazine, aminomorpholine, an aminoalkylmorpholine, and piperidine, which may have a substituent. Examples of more preferred compounds include compounds having an imidazole structure, a diazabicyclo structure, an onium hydroxide structure, an onium carboxylate structure, a trialkylamine structure, an aniline structure, or a pyridine structure, an alkylamine derivative having a hydroxyl group and/or an ether bond, and an aniline derivative having a hydroxyl group and/or an ether bond.

Examples of the compound having an imidazole structure include imidazole, 2,4,5-triphenylimidazole, and benzimidazole. Examples of the compound having a diazabicyclo structure include 1,4-diazabicyclo[2.2.2]octane, 1,5-diazabicyclo[4.3.0]non-5-ene, and 1,8-diazabicyclo[5.4.0]undec-7-ene. Examples of the compound having an onium hydroxide structure include triarylsulfonium hydroxide, phenacylsulfonium hydroxide, and a sulfonium hydroxide having a 2-oxoalkyl group, and specific examples include triphenylsulfonium hydroxide, tris(t-butylphenyl)sulfonium hydroxide, bis(t-butylphenyl)iodonium hydroxide, phenacylthiophenium hydroxide, and 2-oxopropylthiophenium hydroxide. The compound having an onium carboxylate structure is a compound having an onium hydroxide structure in which the anion moiety is a carboxylate, and examples thereof include acetate, adamantane-1-carboxylate, and a perfluoroalkyl carboxylate. Examples of the compound having a trialkylamine structure include tri(n-butyl)amine and tri(n-octyl)amine. Examples of the aniline compound include 2,6-diisopropylaniline and N,N-dimethylaniline. Examples of the alkylamine derivative having a hydroxyl group and/or an ether bond include ethanolamine, diethanolamine, triethanolamine, and tris(methoxyethoxyethyl)amine. Examples of the aniline derivative having a hydroxyl group and/or an ether bond include N,N-bis(hydroxyethyl)aniline.

These basic compounds may be used singly or in a combination of two or more types. The amount of basic compound used is preferably 0.001 to 10 wt % relative to the solids content of the ink composition, and more preferably 0.01 to 5 wt %. In order to obtain a sufficient effect from the addition it is preferably at least 0.001 wt %, and from the viewpoint of sensitivity and stability it is preferably no greater than 10 wt %.

Fluorine- and/or Silicon-Based Surfactant

The ink composition of the present invention preferably further comprises any of a fluorine- and/or a silicon-based surfactant (a fluorine-based surfactant, a silicon-based surfactant, a surfactant containing both a fluorine atom and a silicon atom) or two or more types.

Adding the fluorine- and/or silicon-based surfactant to the ink composition of the present invention improves adhesion while achieving good sensitivity and resolution.

Examples of these fluorine- and/or silicon-based surfactants include surfactants described in JP-A-62-36663, JP-A-61-226746, JP-A-61-226745, JP-A-62-170950, JP-A-63-34540, JP-A-7-230165, JP-A-8-62834, JP-A-9-54432, JP-A-9-5988, JP-A-2002-277862, U.S. Pat. Nos. 5,405,720, 5,360,692, 5,529,881, 5,296,330, 5,436,098, 5,576,143, 5,294,511, and 5,824,451, and the commercial surfactants below may also be used as they are.

Examples of the commercial surfactants that may be used include fluorine-based surfactants and silicon-based surfactants such as Eftop EF301, EF303, (manufactured by Shinakita Chemical Co., Ltd.), Fluorad FC430, 431 (manufactured by Sumitomo 3M Ltd.), Megafac F171, F173, F176, F189, R08 (manufactured by Dainippon Ink and Chemicals, Inc.), Surflon S-382, SC101, 102, 103, 104, 105, 106 (manufactured by Asahi Glass Co., Ltd.), and Troysol S-366 (manufactured by Troy Chemical Co., Ltd.). It is also possible to use the polysiloxane polymer KP-341 (manufactured by Shin-Etsu Chemical Co., Ltd.) as a silicon-based surfactant.

In addition to the known surfactants listed above, it is also possible to use a surfactant employing a polymer having a fluoroaliphatic group derived from a fluoroaliphatic compound produced by a telomerization method (also called a telomer method) or an oligomerization method (also called an oligomer method). The fluoroaliphatic compound may be synthesized by a method described in JP-A-2002-90991.

The polymer having a fluoroaliphatic group is preferably a copolymer of a monomer having a fluoroaliphatic group and a (poly(oxyalkylene)) acrylate and/or a (poly(oxyalkylene)) methacrylate, which may be distributed irregularly or form a block copolymer. Examples of the poly(oxyalkylene) group include a poly(oxyethylene) group, a poly(oxypropylene) group, and a poly(oxybutylene) group, and a unit having different alkylene chain lengths in one chain such as a poly(oxyethylene/oxypropylene/oxyethylene block link) or poly(oxyethylene/oxypropylene block link). The copolymer of a monomer having a fluoroaliphatic group and (poly(oxyalkylene)) acrylate (or methacrylate) is not limited to a two-component copolymer, and may be a three- or higher-component copolymer formed by simultaneously copolymerizing two or more different types of monomers having a fluoroaliphatic group or two or more different types of (poly(oxyalkylene)) acrylate (or methacrylate), etc.

Examples of commercial surfactants include Megafac F178, F-470, F-473, F-475, F-476, and F-472 (manufactured by Dainippon Ink and Chemicals, Incorporated). Examples thereof further include a copolymer of an acrylate (or a methacrylate) having a $C_6F_{13}$ group and a (poly(oxyalkylene)) acrylate (or methacrylate), a copolymer of an acrylate (or a methacrylate) having a $C_6F_{13}$ group, (poly(oxyethylene)) acrylate (or methacrylate), and (poly(oxypropylene)) acrylate (or methacrylate), a copolymer of an acrylate (or methacrylate) having a $C_8F_{17}$ group and a (poly(oxyalkylene)) acrylate (or methacrylate), and a copolymer of an acrylate (or methacrylate) having a $C_8F_{17}$ group, (poly(oxyethylene)) acrylate (or methacrylate), and (poly(oxypropylene)) acrylate (or methacrylate).

The amount of fluorine- and/or silicon-based surfactant used is preferably 0.0001 to 5 wt % relative to the total amount of the ink composition (excluding solvent), and more preferably 0.001 to 3 wt %.

Solvent

In the present invention, as a solvent, an organic solvent or water may be used. In particular, the organic solvent may be added in order to improve the adhesion to a recording medium (a support such as paper).

As means for preventing the sensitivity from being degraded by a light blocking effect of the colorant, which may be added to the ink composition, a combination of a cationically polymerizable compound and a cationic polymerization initiator, a combination of a radically polymerizable compound and a radical polymerization initiator, or a radicalcationic hybrid curing ink composition combining a polymerizable compound and a polymerization initiator may be employed.

In addition to the above, the ink composition of the present invention may contain a known compound as necessary. Examples thereof include a leveling additive, a matting agent and, for adjusting film physical properties, a polyester resin, polyurethane resin, vinyl resin, acrylic resin, rubber resin, or wax, which may be appropriately selected and added. Furthermore, in order to improve the adhesion to a recording medium such as a polyolefin or PET, a tackifier that does not inhibit polymerization is preferably added. Specific examples of the tackifier include high molecular weight tacky polymers described on pp. 5 and 6 of JP-A-2001-49200 (e.g. a copolymer formed from an ester of (meth)acrylic acid and an alcohol having an alkyl group with 1 to 20 carbons, an ester of (meth) acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

(2) Properties of Ink Composition

The ink composition of the present invention comprises as described above (A) a specific sensitizer, and as necessary (B) a cationically polymerizable compound, (C) an acid generator, (D) a radically polymerizable compound, (E) a radical polymerization initiator, and/or (F) a colorant, etc. With regard to the content of these components relative to the total weight of the ink composition, the specific sensitizer (A) is preferably 0.1 to 20 parts by weight, and more preferably 0.3 to 15 parts by weight, the cationically polymerizable compound (B) and/or the radically polymerizable compound (D) is preferably 10 to 95 wt %, more preferably 30 to 93 wt %, and yet more preferably 50 to 90 wt %, and when (F) a colorant is used, the colorant (F) is preferably 1 to 15 wt %, and more preferably 2 to 10 wt %, and each component is contained so that the total of the components, expressed as wt %, desirably becomes 100 wt %.

When the ink composition thus obtained is used for inkjet recording, while taking into consideration dischargability, the viscosity of the ink composition at the discharge temperature (e.g. 25° C. to 80° C., and preferably 25° C. to 30° C.) is preferably 7 to 30 mPa·s, and more preferably 7 to 20 mPa·s. For example, the ink composition of the present invention has a viscosity at room temperature (25° C. to 30° C.) of preferably 35 to 500 mPa·s, and more preferably 35 to 200 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, uncured monomer can be reduced, and the odor can be reduced. Furthermore, ink spreading when ink droplets have landed can be suppressed, and as a result there is the advantage that the image quality is improved. When the viscosity at room temperature is set to be low, since it is unnecessary to heat the ink when discharging or it is possible to set the heating temperature at a relatively low temperature, there are the advantages that the load on inkjet equipment becomes small and the choice of inkjet heads that can be used is widened.

The surface tension of the ink composition of the present invention is preferably 20 to 30 mN/m, and yet more preferably 23 to 28 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 30 mN/m.

(3) Inkjet Recording Method and Equipment

The ink composition of the present invention is preferably used for inkjet recording.

An inkjet recording method that can be suitably employed in the present invention is explained below.

(3-1) Inkjet Recording Method

The present invention provides a method for forming an image by discharging the above-mentioned ink composition onto a recording medium (support, recording material, etc.) and curing the ink composition by irradiating the ink composition so discharged onto the recording medium with actinic radiation. That is, the present invention relates to an inkjet recording method comprising:

(a') a step of discharging an ink composition onto a recording medium; and
(b') a step of curing the ink composition by irradiating the ink composition so discharged with actinic radiation, wherein the ink composition is the ink composition of the present invention.

The cured ink composition forms an image on the recording medium.

The peak wavelength of the actinic radiation is preferably 200 to 600 nm, more preferably 300 to 450 nm, and yet more preferably 350 to 420 nm. The output of the actinic radiation is preferably no greater than 2,000 mJ/cm$^2$, and is more preferably 10 to 2,000 mJ/cm$^2$, yet more preferably 20 to 1,000 mJ/cm$^2$, and particularly preferably 50 to 800 mJ/cm$^2$.

The inkjet recording method of the present invention is explained by taking as an example a process for producing a lithographic printing plate, the process comprising discharging an ink composition onto the lithographic printing plate so as to form an image.

A process for producing a lithographic printing plate of the present invention comprises:

(a") a step of discharging the ink composition of the present invention onto a hydrophilic support, and
(b") a step of irradiating the discharged ink composition with radiation so as to cure the ink composition, thus forming a hydrophobic image on the hydrophilic support by curing the ink composition.

(3-1-1) Hydrophilic Support Used for Lithographic Printing Plate

The lithographic printing plate comprises a support and an image formed on the support.

Conventionally, as the lithographic printing plate, a so-called PS plate in which an oleophilic photosensitive resin layer is provided on a hydrophilic support has been widely used. In a process for producing this PS plate, normally, after a mask exposure (surface exposure) is carried out via a lith film, non-exposed areas are dissolved and removed to give a desired printing plate. However, in recent years, a technique of digitizing image information using a computer by electronically processing, storing, and outputting the information has become widespread, and a new image output system that can be used for the above technique has been desired. In particular, a computer to plate (CTP) technique in which a printing plate is directly produced by scanning according to digitized image information with highly coherent light such as laser light without using a lith film has been developed.

As a system for obtaining a lithographic printing plate that makes possible the above scanning exposure, a process for directly producing a lithographic printing plate using an ink composition or an inkjet recording ink composition can be cited. This process involves obtaining a printing plate having a desired image (preferably a hydrophobic image) by discharging an ink onto a support, and preferably a hydrophilic support, using an inkjet system, etc., and exposing this to actinic radiation so as to expose an area with the ink composition or the inkjet recording ink to light. The ink composition or the inkjet recording ink suitable for such a system is the ink composition or the inkjet recording ink of the present invention.

The support (recording medium) onto which the ink composition or the inkjet recording ink composition of the present invention is discharged is riot particularly limited, and a dimensionally stable sheet-form support may be used. The support is preferably a hydrophilic support. The support used in the lithographic printing plate of the present invention is not particularly limited, and a dimensionally stable sheet-form support may be used. It is preferable that a material forming the support has a hydrophilic surface. Examples of materials forming the support include paper, paper laminated with a plastic (e.g. polyethylene, polypropylene, polystyrene, etc.), a metal sheet (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, etc.), and paper or plastic film on which the above-mentioned metal is laminated or vapor-deposited. Preferred examples of the support include a polyester film and aluminum sheet. Among these, aluminum sheet is particularly preferable since the dimensional stability is good and it is relatively inexpensive.

The aluminum sheet is a pure aluminum sheet, an alloy sheet containing aluminum as a main component and a small amount of a different element, or a thin film of aluminum or an aluminum alloy laminated with a plastic. Examples of the different element contained in the aluminum alloy include silicon, iron, manganese, copper, magnesium, chromium, zinc, bismuth, nickel, and titanium. The content of the different element in the alloy is preferably equal to or less than 10 wt %. In the present invention, a pure aluminum sheet is preferable, but since it is difficult to produce completely pure aluminum because of the refining technique, a trace amount of a different element may be contained. The composition of the aluminum sheet is not specified, and a known generally used material may be utilized as appropriate.

The support preferably has a thickness of 0.1 to 0.6 mm, and more preferably 0.15 to 0.4 mm.

Prior to the aluminum sheet being used, it is preferably subjected to a surface treatment such as a surface roughening treatment or an anodizing treatment. Surface treatment makes it easy to improve the hydrophilicity and ensure that there is good adhesion between an image recording layer and the support. Prior to the aluminum sheet being subjected to the surface roughening treatment, it may be subjected as desired to a degreasing treatment using a surfactant, an organic solvent, an aqueous alkaline solution, etc. in order to remove rolling oil on the surface.

The surface roughening treatment for the aluminum sheet surface may be carried out by various types of methods, and examples thereof include a mechanical surface roughening treatment, an electrochemical surface roughening treatment (a surface roughening treatment involving dissolving the surface electrochemically), and a chemical surface roughening treatment (a surface roughening treatment involving selectively dissolving the surface chemically).

As a method for the mechanical surface roughening treatment, a known method such as a ball grinding method, a brush grinding method, a blast grinding method, or a buff grinding method may be used. It is also possible to use a transfer method in which an irregular shape is transferred using a roller provided with irregularities in an aluminum rolling stage.

As a method for the electrochemical surface roughening treatment, for example, a method in which alternating current or direct current is applied in an electrolyte solution containing an acid such as hydrochloric acid or nitric acid can be cited. It is also possible to employ a method as described in JP-A-54-63902 in which a mixed acid is used.

The aluminum sheet subjected to a surface roughening treatment is subjected as necessary to an alkali etching treatment using an aqueous solution of potassium hydroxide, sodium hydroxide, etc.; furthermore, after neutralization, it may be subjected to an anodizing treatment as desired in order to improve the abrasion resistance.

As an electrolyte that may be used for the anodizing treatment of the aluminum sheet, various types of electrolytes that form a porous oxide film may be used. In general, sulfuric acid, hydrochloric acid, oxalic acid, chromic acid, or a mixed acid thereof may be used. The concentration of the electrolyte may be determined as appropriate according to the type of electrolyte.

Conditions for the anodizing treatment depend on the type of electrolyte used and cannot be specified, but in general the electrolyte solution concentration is 1 to 80 wt %, the solution temperature is 5° C. to 70° C., the current density is 5 to 60 A/dm$^2$, the voltage is 1 to 100V, and the electrolysis time is 10 sec. to 5 min. The amount of anodized film formed is preferably 1.0 to 5.0 g/m$^2$, and more preferably 1.5 to 4.0 g/m$^2$. It is preferable for it to be in this range since good plate life and good scratch resistance of a non-image area of a lithographic printing plate can be obtained.

As the support that can be used in the present invention, a substrate that has been subjected to the above-mentioned surface treatment and has an anodized film may be used as it is, but in order to further improve the adhesion to an upper layer, and the hydrophilicity, the contamination resistance, the thermal insulation, etc., the substrate may appropriately be subjected as necessary to a treatment for enlarging micropores of the anodized film, a sealing treatment, or a surface hydrophilization treatment involving immersion in an aqueous solution containing a hydrophilic compound, which are described in JP-A-2001-253181 or JP-A-2001-322365. These enlarging and sealing treatments are not limited to those described therein, and any conventionally known methods may be employed.

Sealing Treatment

The sealing treatment may be vapor sealing, a treatment with an aqueous solution containing an inorganic fluorine compound such as a single treatment with fluorozirconic acid or a treatment with sodium fluoride, vapor sealing with added lithium chloride, or a sealing treatment with hot water.

Among these, the sealing treatment with an aqueous solution containing an inorganic fluorine compound, the sealing treatment with vapor, and the sealing treatment with hot water are preferable. Each thereof is explained below.

Sealing Treatment with Aqueous Solution Containing Inorganic Fluorine Compound

In the sealing treatment with an aqueous solution containing an inorganic fluorine compound, a metal fluoride can suitably be used as the inorganic fluorine compound.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid, and ammonium fluorophosphate. Among them, sodium fluorozirconate, sodium fluorotitanate, fluorozirconic acid, and fluorotitanic acid are preferable.

The concentration of the inorganic fluorine compound in the aqueous solution is preferably at least 0.01 wt % from the viewpoint of sealing of micropores on an anodized coating being carried out sufficiently, and more preferably at least 0.05 wt %, and it is preferably no greater than 1 wt % from the viewpoint of contamination resistance, and more preferably no greater than 0.5 wt %.

The aqueous solution containing an inorganic fluorine compound preferably further contains a phosphate compound. It is preferable for a phosphate compound to be contained since the hydrophilicity of the surface of the anodized coating improves and the machine developability and the contamination resistance can be improved.

Preferred examples of the phosphate compound include phosphates of a metal such as an alkali metal or an alkaline earth metal.

Specific examples thereof include zinc phosphate, aluminum phosphate, ammonium phosphate, ammonium phosphate dibasic, ammonium dihydrogen phosphate, potassium dihydrogen phosphate, potassium phosphate dibasic, calcium phosphate, ammonium sodium hydrogen phosphate, magnesium hydrogen phosphate, magnesium phosphate, ferrous phosphate, ferric phosphate, sodium dihydrogen phosphate, sodium phosphate, sodium phosphate dibasic, lead phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate, and sodium pyrophosphate. Among these, sodium dihydrogen phosphate, sodium phosphate dibasic, potassium dihydrogen phosphate, and potassium phosphate dibasic are preferable.

The combination of the inorganic fluorine compound and the phosphate compound is not particularly limited, but the aqueous solution preferably comprises at least sodium fluorozirconate as the inorganic fluorine compound and at least sodium dihydrogen phosphate as the phosphate compound.

The concentration of the phosphate compound in the aqueous solution is preferably at least 0.01 wt % from the viewpoint of improving machine developability and contamination resistance, and more preferably at least 0.1 wt %, and it is preferably no greater than 20 wt % from the viewpoint of solubility, and more preferably no greater than 5 wt %.

The proportion of each compound in the aqueous solution is not particularly limited, but the ratio by weight of the inorganic fluorine compound and the phosphate compound is preferably 1/200 to 10/1, and more preferably 1/30 to 2/1.

Furthermore, the temperature of the aqueous solution is preferably at least 20° C., and more preferably at least 40° C., and it is preferably no higher than 100° C., and more preferably no higher than 80° C.

Moreover, the pH of the aqueous solution is preferably at least 1, and more preferably at least 2, and it is preferably no greater than 11, and more preferably no greater than 5.

A method for the sealing treatment with the aqueous solution containing an inorganic fluorine compound is not particularly limited and, for example, an immersion method and a spray method may be used. They may be employed once or a plurality of times, or in a combination of two or more types.

Among these, the immersion method is preferable. When the treatment is carried out by the immersion method, the treatment time is preferably at least 1 sec., and more preferably at least 3 sec., and it is preferably no greater than 100 sec., and more preferably no greater than 20 sec.

Sealing Treatment with Steam

With regard to the sealing treatment with steam, for example, a method in which an anodized coating is contacted with steam at high pressure or normal pressure continuously or discontinuously can be cited.

The temperature of the steam is preferably at least 80° C., and more preferably at least 95° C., and it is preferably no greater than 105° C.

The pressure of the steam is preferably in the range of (atmospheric pressure−50 mmAq) to (atmospheric pressure+ 300 mmAq) ($1.008\times10^5$ to $1.043\times10^5$ Pa).

Furthermore, the time for which the coating is contacted with steam is preferably at least 1 sec., and more preferably at least 3 sec., and it is preferably no greater than 100 sec., and more preferably no greater than 20 sec.

Sealing Treatment with Hot Water

With regard to the sealing treatment with hot water, for example, a method in which an aluminum plate having an anodized coating formed thereon is immersed in hot water can be cited.

The hot water may contain an inorganic salt (e.g. a phosphate) or an organic salt.

The temperature of the hot water is preferably at least 80° C., and more preferably at least 95° C., and it is preferably no greater than 100° C.

Furthermore, the time for which immersion in hot water is carried out is preferably at least 1 sec., and more preferably at least 3 sec., and it is preferably no greater than 100 sec., and more preferably no greater than 20 sec.

With regard to a hydrophilization treatment that is used in the present invention, there is an alkali metal silicate method, as disclosed in U.S. Pat. Nos. 2,714,066, 3,181,461, 3,280, 734, and 3,902,734. In this method, a support is immersed in an aqueous solution of sodium silicate, etc., or subjected to electrolysis. In addition, there is a method in which a support is treated with potassium fluorozirconate, as described in JP-B-36-22063, and a method in which a support is treated with polyvinylphosphonic acid, as described in U.S. Pat. Nos. 3,276,868, 4,153,461, and 4,689,272.

In the present invention, it is preferable for the support to have a center line average roughness of 0.10 to 1.2 μm. It is preferable for it to be in this range since good adhesion to an image recording layer, good plate life, and good contamination resistance can be obtained.

(3-1-21 Step of Discharging Ink Composition Onto Hydrophilic Support

When the ink composition or the inkjet recording ink composition of the present invention is discharged onto the surface of the above-mentioned hydrophilic support, the ink composition or the inkjet recording ink composition is preferably discharged after being heated to preferably 25° C. to 80° C., and more preferably 25° C. to 30° C., so as to, reduce the viscosity of the ink composition to preferably 7 to 30 mPa·s, and more preferably 7 to 20 mPa·s. In particular, it is preferable to use the ink composition having an ink viscosity at 25° C. of 35 to 500 mPa·s since a large effect can be obtained. By employing this method, high discharge stability can be realized. The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is desirably ±5° C. of a set temperature, preferably ±2° C. of the set temperature, and more preferably ±1° C. of the set temperature.

(3-1-3) Step of Curing Ink Composition by Irradiating Discharged Ink Composition with Actinic Radiation so as to Form Hydrophobic Image on Hydrophilic Support by Curing Ink Composition The ink composition discharged onto the surface of the hydrophilic support is cured by irradiating with actinic radiation. This results from a sensitizer in a polymerization initiation system contained in the above-mentioned ink composition of the present invention absorbing actinic radiation, attaining an excited state, and coming into contact with a polymerization initiator in the polymerization initiation system to thus decompose the polymerization initiator, and a polymerizable compound undergoing radical polymerization and being cured.

The actinic radiation used in this process may include α rays, γ rays, an electron beam, X rays, UV rays, visible light, and IR rays. Although it depends on the absorption characteristics of the sensitizer, the peak wavelength of the actinic radiation is, for example, preferably 200 to 600 nm, more preferably 300 to 450 nm, and yet more preferably 350 to 450 nm. Furthermore, in the present invention, the polymerization initiation system has sufficient sensitivity for low output actinic radiation. The output of the actinic radiation as irradiation energy is preferably 2,000 mJ/cm$^2$ or less, more preferably 10 to 2,000 mJ/cm$^2$ yet more preferably 20 to 1,000 mJ/cm$^2$, and particularly preferably 50 to 800 mJ/cm$^2$. Moreover, the actinic radiation is applied so that the illumination intensity on the exposed surface is, for example, preferably 10 to 2,000 mW/cm$^2$, and more preferably 20 to 1,000 mW/cm$^2$.

The ink composition of the present invention is desirably exposed to such actinic radiation for, for example, preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted, and as a result the odor can be reduced.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink even for various types of recording media having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the above-mentioned ink composition of the present invention is cured by irradiation with actinic radiation to thus form a hydrophobic image on the surface of the hydrophilic support.

(3-2) Inkjet Recording Device

The inkjet recording device used in the present invention is not particularly restricted, and a commercial inkjet recording device may be used. That is, in the present invention, recording on a recording medium may be carried out using a commercial inkjet recording device.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can therefore be expected.

Furthermore, light-emitting diodes (LED) and laser diodes (LD) may be used as a source of actinic radiation. In particular, when a UV ray source is needed, a UV-LED or a UV-LD may be used. For example, Nichia Corporation has marketed a violet LED having a main emission spectrum wavelength of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

In accordance with the present invention, it is possible to provide an ink composition that has high sensitivity and no coloration due to a sensitizer, an inkjet recording method employing the ink composition, a printed material obtained using the ink composition, a lithographic printing plate, and a process for producing a lithographic printing plate.

EXAMPLES

Synthesis of Specific Sensitizer

Synthetic Example 1

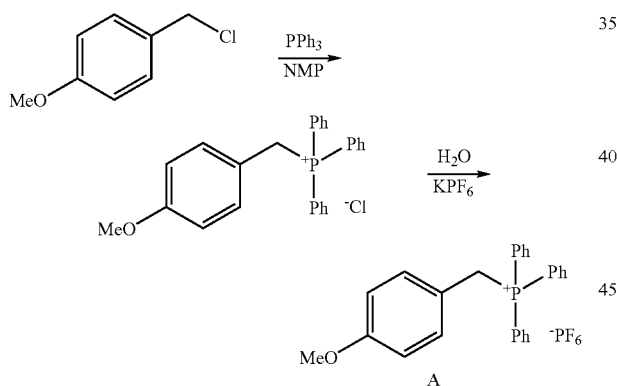

A 300 mL three-necked flask was charged with 4-methoxybenzyl chloride (0.19 mol, 1 eq), triphenylphosphine (PPh$_3$) (0.19 mol, 1 eq), and N-methylpyrrolidone (NMP) (100 mL), and stirring was carried out for 4 hours while heating at 140° C. Following this, the mixture was poured into water, KPF$_6$ (0.23 mol, 1.2 eq) was added thereto, stirring was carried out at room temperature for 1 hour, and a solid thus precipitated was filtered, washed with water, and dried to give Phosphonium salt A (yield 94%).

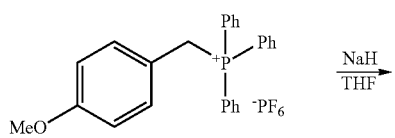

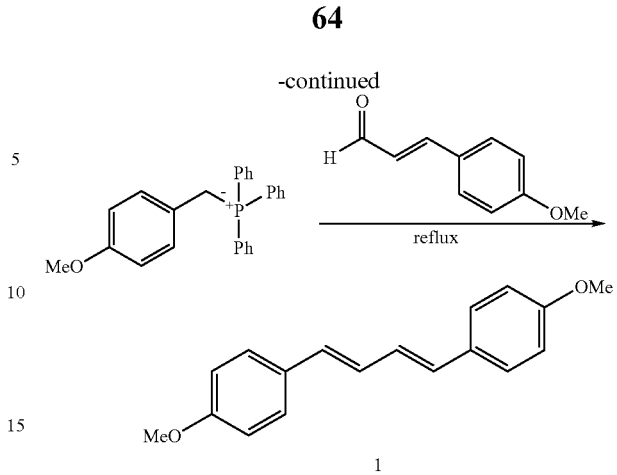

A 500 mL three-necked flask was charged with Phosphonium salt A (30.8 mmol, 1 eq) and tetrahydrofuran (THF) (100 mL), and stirring was carried out in an ice bath. Sodium hydride (NaH) (46.2 mmol, 1.5 eq)/THF (20 mL) was slowly added thereto, after the addition was complete stirring was carried out in an ice bath for 15 minutes, and following this the temperature was returned to room temperature. 4-Methoxycinnamaldehyde (30.8 mmol, 1 eq) was added thereto, and the mixture was heated to reflux for 4 hours. Subsequently, the mixture was poured into ice water, and a solid thus precipitated was filtered and washed with methanol to give Compound 1 (yield 40%).

Synthetic Example 2

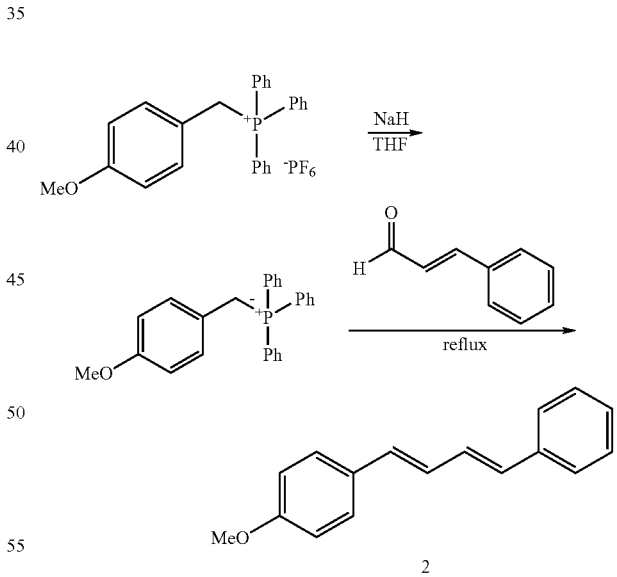

A 500 mL three-necked flask was charged with Phosphonium salt A (37.8 mmol, 1 eq) and THF (100 mL), and stirring was carried out in an ice bath. NaH (56.7 mmol, 1.5 eq)/THF (20 mL) was slowly added thereto, after the addition was complete stirring was carried out in an ice bath for 15 minutes, and following this the temperature was returned to room temperature. trans-Cinnamaldehyde (37.8 mmol, 1 eq) was added thereto, and the mixture was heated to reflux for 4 hours. The mixture was subsequently poured into ice water, and a solid thus precipitated was filtered and washed with methanol to give Compound 2 (yield 45%).

Synthetic Example 3

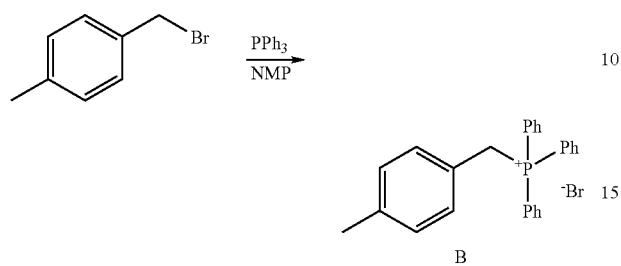

A 300 mL three-necked flask was charged with α-bromo-p-xylene (0.14 mol, 1 eq), triphenylphosphine (0.14 mol, 1 eq), and NMP (100 mL), and stirring was carried out for 2 hours while heating at 140° C. (a target product precipitated in the reaction mixture). Following this, the mixture was poured into water, stirring was carried out in an ice bath for 1 hour, and the mixture was filtered, washed with water, and dried to give Phosphonium salt B (yield 87%).

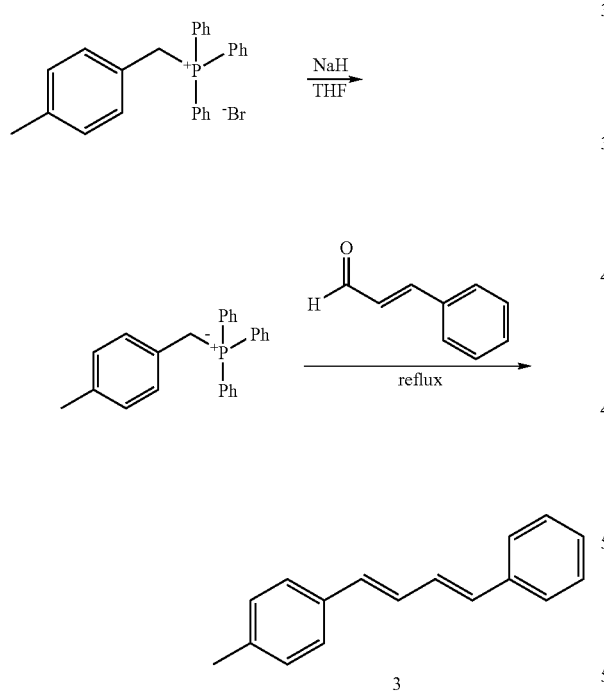

A 500 mL three-necked flask was charged with Phosphonium salt B (37.8 mmol, 1 eq) and THF (100 mL), and stirring was carried out in an ice bath. NaH (56.7 mmol, 1.5 eq)/THF (20 mL) was slowly added thereto, after the addition was complete stirring was carried out in an ice bath for 15 minutes, and following this the temperature was returned to room temperature trans-Cinnamaldehyde (37.8 mmol, 1 eq) was added thereto, and the mixture was heated to reflux for 3 hours. Subsequently, the mixture was poured into ice water, and a solid thus precipitated was filtered and reslurried in methanol to give Compound 3 (yield 60%).

Synthetic Example 4

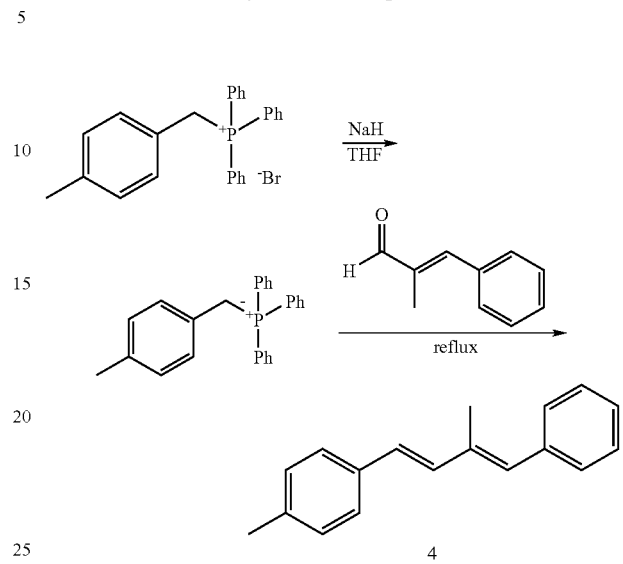

A 500 mL three-necked flask was charged with Phosphonium salt B (34.2 mmol, 1 eq) and THF (100 mL), and stirring was carried out in an ice bath. NaH (51.3 mmol, 1.5 eq)/THF (40 mL) was slowly added thereto, after the addition was complete stirring was carried out in an ice bath for 15 minutes, and following this the temperature was returned to room temperature. α-Methylcinnamaldehyde (34.2 mmol, 1 eq) was added thereto, and the mixture was heated to reflux for 3 hours. Subsequently, the mixture was poured into ice water, and a solid thus precipitated was filtered and reslurried in methanol to give Compound 4 (yield 40%).

Synthetic Example 5

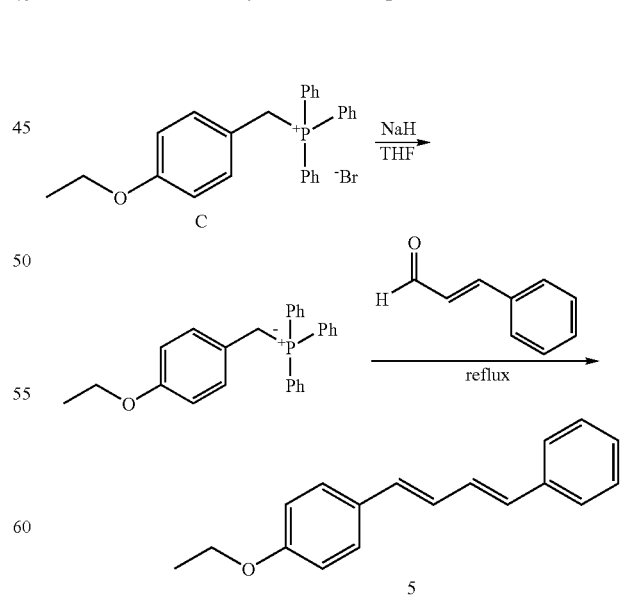

A 500 mL three-necked flask was charged with Phosphonium salt C (52.4 mmol, 1 eq) and THF (100 mL), and stirring was carried out in an ice bath. NaH (78.6 mmol, 1.5 eq)/THF (40 mL) was slowly added thereto, after the addition was complete stirring was carried out in an ice bath for 15 minutes, and following this the temperature was returned to room temperature. trans-Cinnamaldehyde (52.4 mmol, 1 eq) was added thereto, and the mixture was heated to reflux for 3 hours. The mixture was subsequently poured into ice water, and a solid thus precipitated was filtered and reslurried in methanol to give Compound 5 (yield 40%).

Synthetic Example 6

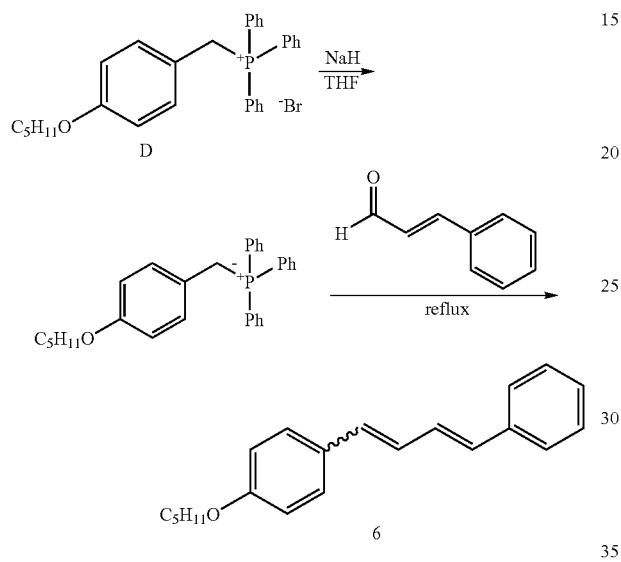

A 500 mL three-necked flask was charged with Phosphonium salt D (52.4 mmol, 1 eq), and THF (100 mL), and stirring was carried out in an ice bath. NaH (52.4 mmol, 1 eq) was slowly added thereto, after the addition was complete stirring was carried out in an ice bath for 15 minutes, and following this the temperature was returned to room temperature. trans-Cinnamaldehyde (52.4 mmol, 1 eq) was added thereto, and the mixture was heated to reflux for 3 hours. The mixture was subsequently poured into ice water, a solid thus precipitated was filtered, and the filtrate was concentrated and purified by silica gel column chromatography (hexane:ethyl acetate=10:1) to give (Z,E) isomers of Compound 6 (yield 5%).

Synthetic Example 7

Compound 7 below was obtained by the same method as that in the synthetic method for Compound 5 except that Phosphonium salt E below was used instead of Phosphonium salt C.

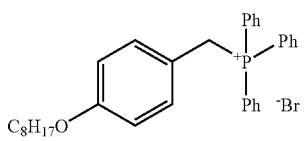

-continued

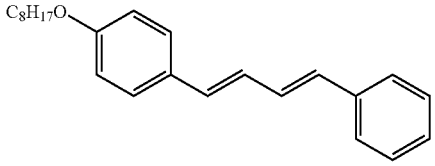

Synthetic Example 8

Compound 8 below was obtained by the same method as that in the synthetic method for Compound 5 except that Phosphonium salt F below was used instead of Phosphonium salt C.

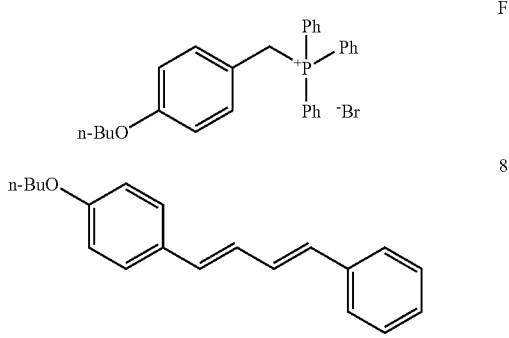

Synthetic Example 9

Compound 9 below was obtained by the same method as that in the synthetic method for Compound 5 except that Phosphonium salt G below was used instead of Phosphonium salt C.

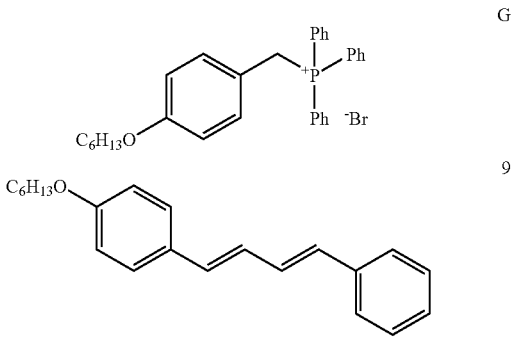

Synthetic Example 10

Compound 10 below was obtained by the same method as that in the synthetic method for Compound 5 except that Phosphonium salt H below was used instead of Phosphonium salt C.

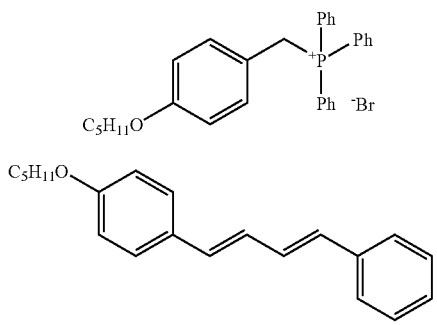

Synthetic Example 11

Compound 11 below was obtained by the same method as that in the synthetic method for Compound 5 except that Phosphonium salt I below was used instead of Phosphonium salt C.

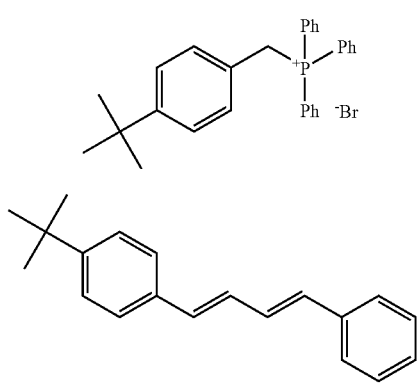

Synthetic Example 12

Compound 12 below was obtained by the same method as that in the synthetic method for Compound 5 except that Phosphonium salt J below was used instead of Phosphonium salt C.

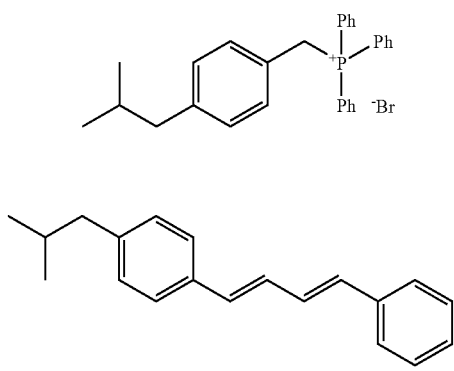

Synthetic Example 13

Compound 13 below was obtained by the same method as that in the synthetic method for Compound 5 except that Phosphonium salt K below was used instead of Phosphonium salt C.

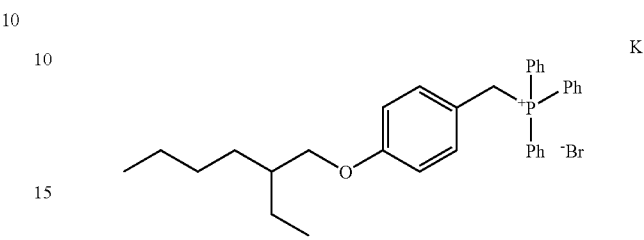

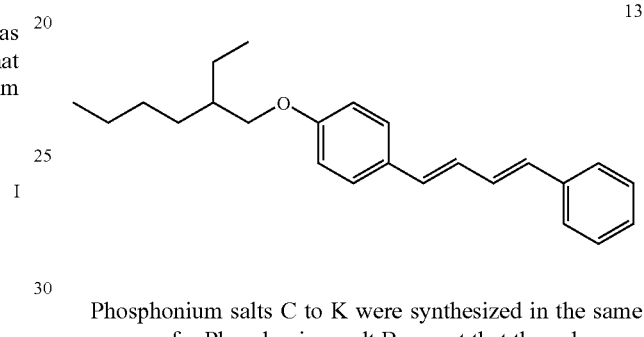

Phosphonium salts C to K were synthesized in the same manner as for Phosphonium salt B except that the α-bromo-p-xylene in the synthesis of Phosphonium salt B was replaced by the respective appropriate Compound.

Comparative Compounds 1 to 4

As Comparative Compounds 1 to 4, those below were used.

Comparative Compound 1: 1,4-diphenylbutadiene manufactured by Aldrich

Comparative Compound 2: 9,10-dibutoxyanthracene manufactured by Kawasaki Kasei Chemicals Ltd.

Comparative Compound 3: Darocur ITX manufactured by Ciba Specialty Chemicals

Comparative Compound 4: N-ethylcarbazole manufactured by Tokyo Chemical Industry Co., Ltd.

Measurement of Molar Extinction Coefficient 0.01 g/L 1-methoxy-2-propanol solutions of Compounds 1 to 13 above and Comparative Compounds 1 to 4 above were prepared, the absorbance was measured using a Cary-5 UV-Vis-NIR spectrophotometer manufactured by Varian, and molar extinction coefficients ε ($mol^{-1} \cdot L \cdot cm^{-1}$) at 365 nm and 380 nm were calculated. Measurement results are given in Table 1 and Table 2.

Evaluation of Coloration

Evaluation was carried out visually using the criteria below.

Poor: turned yellow
Fair: turned pale yellow
Good: colorless

TABLE 1

| Compound No. | Structure | ε at 365 nm | ε at 380 nm | Coloration |
|---|---|---|---|---|
| Compound 1 | MeO-C6H4-CH=CH-CH=CH-C6H4-OMe | 43,760 | 2,029 | Good |
| Compound 2 | MeO-C6H4-CH=CH-CH=CH-C6H5 | 20,058 | 645 | Good |
| Compound 3 | Me-C6H4-CH=CH-CH=CH-C6H5 | 2,063 | 93 | Good |
| Compound 4 | Me-C6H4-CH=CH-C(Me)=CH-C6H5 | 532 | 97 | Good |
| Compound 5 | EtO-C6H4-CH=CH-CH=CH-C6H5 | 22,206 | 747 | Good |
| Compound 6 | C5H11O-C6H4-CH=CH-CH=CH-C6H5 (cis isomer) | 8,266 | 1,179 | Good |
| Compound 7 | C8H17O-C6H4-CH=CH-CH=CH-C6H5 | 25,279 | 984 | Good |
| Compound 8 | BuO-C6H4-CH=CH-CH=CH-C6H5 | 26,772 | 933 | Good |

TABLE 1-continued

| Compound No. | Structure | ε at 365 nm | ε at 380 nm | Coloration |
| --- | --- | --- | --- | --- |
| Compound 9 | C₆H₁₃O—C₆H₄—CH=CH—CH=CH—C₆H₅ | 26,809 | 1,019 | Good |

TABLE 2

| Compound No. | Structure | ε at 365 nm | ε at 380 nm | Coloration |
| --- | --- | --- | --- | --- |
| Compound 10 | C₅H₁₁O—C₆H₄—CH=CH—CH=CH—C₆H₅ | 26,637 | 934 | Good |
| Compound 11 | tBu—C₆H₄—CH=CH—CH=CH—C₆H₅ | 3,059 | 301 | Good |
| Compound 12 | iBu—C₆H₄—CH=CH—CH=CH—C₆H₅ | 3,491 | 230 | Good |
| Compound 13 | 2-ethylhexyl-O—C₆H₄—CH=CH—CH=CH—C₆H₅ | 27,731 | 1,225 | Good |
| Comparative Compound 1 | C₆H₅—CH=CH—CH=CH—C₆H₅ | 397 | 0 | Good |
| Comparative Compound 2 | 9,10-bis(OC₄H₉)anthracene | 5,491 | 7,480 | Poor |

TABLE 2-continued

| Compound No. | Structure | ε at 365 nm | ε at 380 nm | Coloration |
|---|---|---|---|---|
| Comparative Compound 3 | 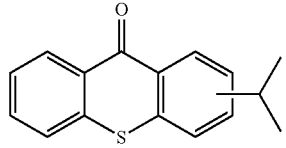 | 4,558 | 6,787 | Poor |
| Comparative Compound 4 | 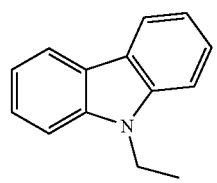 | 92 | 81 | Good |

Compounds 1 to 13 had a high ε at 365 nm but a low ε at 380 nm, and were colorless. On the other hand, Comparative Compounds 2 and 3 had high ε both at 365 nm and at 380 nm, and were yellowish. Comparative Compounds 1 and 4 had a low ε at 380 nm and a low ε at 365 nm.

Example of Cationic Polymerization Type Ink
Composition Preparation of Pigment Dispersion Pigment dispersions 1 of each of yellow, magenta, cyan, black, and white were prepared according to the methods below. Dispersion conditions were appropriately adjusted so that the average particle size of the pigment particles in each case was in the range of 0.2 to 0.3 μm using a known dispersing device, and they were subsequently filtered using a filter while heating.

Yellow Pigment dispersion 1

| | |
|---|---|
| C.I. Pigment Yellow 13 | 20 parts by weight |
| Polymeric dispersant (Solsperse series manufactured by Zeneca) | 20 parts by weight |
| OXT-221 (manufactured by Toagosei Co., Ltd.) | 60 parts by weight |

Magenta pigment dispersion 1

| | |
|---|---|
| C.I. Pigment Red 57:1 | 20 parts by weight |
| Polymeric dispersant (Solsperse series manufactured by Zeneca) | 20 parts by weight |
| OXT-221 (manufactured by Toagosei Co., Ltd.) | 60 parts by weight |

Cyan pigment dispersion 1

| | |
|---|---|
| C.I. Pigment Blue 15:3 | 20 parts by weight |
| Polymeric dispersant (Solsperse series manufactured by Zeneca) | 20 parts by weight |
| OXT-221 (manufactured by Toagosei Co., Ltd.) | 60 parts by weight |

Black pigment dispersion 1

| | |
|---|---|
| C.I. Pigment Black 7 | 20 parts by weight |
| Polymeric dispersant (Solsperse series manufactured by Zeneca) | 20 parts by weight |
| OXT-221 (manufactured by Toagosei Co., Ltd.) | 60 parts by weight |

White pigment dispersion 1

| | |
|---|---|
| Titanium oxide (average particle size 0.15 μm, refractive index 2.52) | 25 parts by weight |
| Neutral polymeric dispersant PB822 (manufactured by Ajinomoto-Fine-Techno Co., Inc.) | 14 parts by weight |
| OXT-221 (manufactured by Toagosei Co., Ltd.) | 60 parts by weight |

Ink preparation
Example 1
Yellow ink 1

| | |
|---|---|
| Yellow pigment dispersion 1 | 5 parts by weight |
| UVI-6992 (manufactured by The Dow Chemical Company) | 6 parts by weight |
| Sensitizing dye: Compound 2 | 3 parts by weight |

-continued

Polymerizable compounds

| | |
|---|---|
| Monomer: 3,4-epoxycyclohexylmethyl-3',4'-epoxycyclohexanecarboxylate (Celloxide 2021A: manufactured by Daicel-UCB Co., Ltd.) | 40 parts by weight |
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 part by weight |

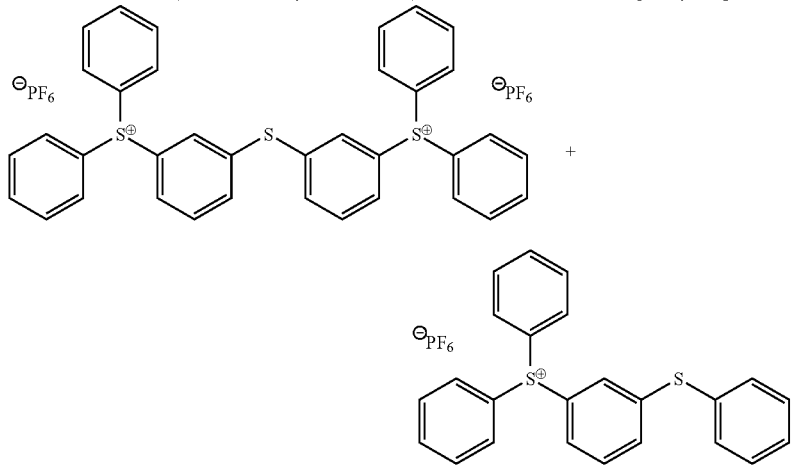

Mixture of two triarylsulfonium hexafluorophosphates above
UVI-6992

Magenta ink 1

| | |
|---|---|
| Magenta pigment dispersion 1 | 5 parts by weight |
| UVI-6992 (manufactured by The Dow Chemical Company) | 6 parts by weight |
| Sensitizing dye: Compound 2 | 3 parts by weight |

Polymerizable compounds

| | |
|---|---|
| Monomer: 3,4-epoxycyclohexylmethyl-3',4'-epoxycyclohexanecarboxylate (Celloxide 2021A: manufactured by Daicel-UCB Co., Ltd.) | 40 parts by weight |
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 parts by weight |

Cyan ink 1

| | |
|---|---|
| Cyan pigment dispersion 1 | 5 parts by weight |
| UVI-6992 (manufactured by The Dow Chemical Company) | 6 parts by weight |
| Sensitizing dye: Compound 2 | 3 parts by weight |

Polymerizable compounds

| | |
|---|---|
| Monomer: 3,4-epoxycyclohexylmethyl-3',4'-epoxycyclohexanecarboxylate (Celloxide 2021A: manufactured by Daicel-UCB Co., Ltd.) | 40 parts by weight |
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 part by weight |

Black ink 1

| | |
|---|---|
| Black pigment dispersion 1 | 5 parts by weight |
| UVI-6992 (manufactured by The Dow Chemical Company) | 6 parts by weight |
| Sensitizing dye: Compound 2 | 3 parts by weight |

Polymerizable compounds

| | |
|---|---|
| Monomer: 3,4-epoxycyclohexylmethyl-3',4'-epoxycyclohexanecarboxylate (Celloxide 2021A: manufactured by Daicel-UCB Co., Ltd.) | 40 parts by weight |
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 part by weight |

White ink 1

| | |
|---|---|
| White pigment dispersion 1 | 5 parts by weight |
| UVI-6992 (manufactured by The Dow Chemical Company) | 6 parts by weight |
| Sensitizing dye: Compound 2 | 3 parts by weight |

Polymerizable compounds

| | |
|---|---|
| Monomer: 3,4-epoxycyclohexylmethyl-3',4'-epoxycyclohexanecarboxylate (Celloxide 2021A: manufactured by Daicel-UCB Co., Ltd.) | 40 parts by weight |

| -continued | |
|---|---|
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 part by weight |

Inks 1 of each color prepared above were filtered using a filter having an absolute filtration accuracy of 2 μm to give Inks 1 of each color.

Inkjet Image Recording

Subsequently, recording was carried out on a recording medium using a commercial inkjet recording device having a piezo system inkjet nozzle. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 70° C.±2° C. The piezo system inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 100 mW/cm$^2$, and irradiation started 0.1 sec. after the ink landed on the recording medium. Furthermore, the exposure time was made variable, and exposure energy was applied. Here, dpi referred to in the present invention denotes the number of dots per 2.54 cm.

The Inks of each color prepared above were discharged at an environmental temperature of 25° C. in the order black→cyan→magenta→yellow→white, and irradiation with ultraviolet rays was carried out using a VZero 085 metal halide lamp (manufactured by Integration Technology) after each color was discharged. As an energy level that could completely cure the inks so that tackiness disappeared when touched by hand, the total exposure energy per color was 50 mJ/cm$^2$ for all the colors. As recording media, a grained aluminum support, a transparent biaxially stretched polypropylene film whose surface had been treated so as to impart printability, a soft vinyl chloride sheet, a cast coat paper, and a commercial recycled paper were used, each color image was recorded, and an image having high resolution without dot spreading was obtained in all cases. Furthermore, for high quality paper, the ink did not penetrate to the reverse side, the ink was sufficiently cured, and there was hardly any odor due to unreacted monomer. Moreover, the ink recorded on the film had sufficient flexibility, the ink did not crack when bent, and there was no problem in an adhesion test involving peeling with Sellotape (registered trademark).

Examples 2 to 14 and Comparative Examples 1 to 5

Preparation of Ink

White inks 2 to 11 were prepared in accordance with the methods described below.

Example 2

White Ink 2

White ink 2 was prepared in the same manner as for White ink 1 except that Compound 3 was used instead of Compound 2.

Example 3

White Ink 3

White ink 3 was prepared in the same manner as for White ink 1 except that Compound 1 was used instead of Compound 2.

Example 4

White Ink 4

White ink 4 was prepared in the same manner as for White ink 1 except that Compound 4 was used instead of Compound 2.

Example 5

White Ink 5

White ink 5 was prepared in the same manner as for White ink 1 except that Compound 6 was used instead of Compound 2.

Example 6

White Ink 6

White ink 6 was prepared in the same manner as for White ink 1 except that Compound 8 was used instead of Compound 2.

Example 7

White Ink 7

White ink 7 was prepared in the same manner as for White ink 1 except that tri-p-tolylsulfonium hexafluorophosphate (manufactured by Tokyo Chemical Industry Co., Ltd.) was used instead of UVI-6992 (manufactured by The Dow Chemical Company).

Example 8

White Ink 8

White ink 8 was prepared in the same manner as for White ink 1 except that 3 parts by weight of octylamine was added to White ink 1 as a basic compound.

Example 9

White Ink 9

White ink 9 was prepared in the same manner as for White ink 1 except that Irgacure 250 (manufactured by Ciba Specialty Chemicals) was used instead of UVI-6992 (manufactured by The Dow Chemical Company).

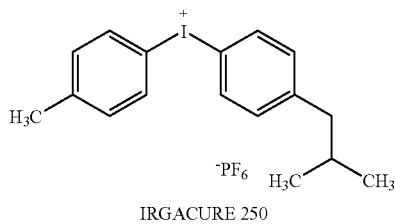

IRGACURE 250

Example 10

White Ink 10

White ink 10 was prepared in the same manner as for White ink 1 except that Compound X below was used instead of UVI-6992 (manufactured by The Dow Chemical Company).

Compound X

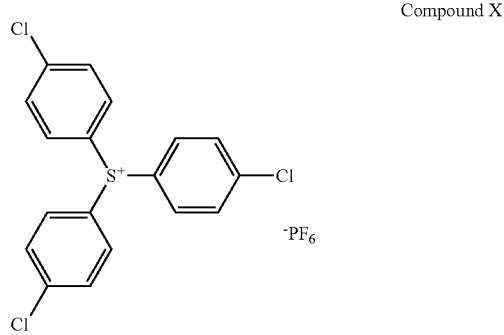

Example 11

White Ink 11

White ink 11 was prepared in the same manner as for White ink 1 except that Esacure 1187 (manufactured by Lamberti) was used instead of UVI-6992 (manufactured by The Dow Chemical Company).

Example 12

White Ink 12

White ink 12 was prepared in the same manner as for White ink 1 except that SP-150 (manufactured by Adeka Corporation) was used instead of UVI-6992 (manufactured by The Dow Chemical Company).

Example 13

White Ink 13

| | |
|---|---|
| White pigment dispersion 1 | 5 parts by weight |
| UVI-6992 (manufactured by The Dow Chemical Company) | 6 parts by weight |
| Sensitizing dye: Compound 2 | 3 parts by weight |
| Polymerizable compounds | |
| Monomer: 3,4-epoxycyclohexylmethyl-3',4'-epoxycyclohexanecarboxylate (Celloxide 2021A: manufactured by Daicel-UCB Co., Ltd.) | 30 parts by weight |
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 part by weight |
| Radically polymerizable monomer: 1,6-hexanediol diacrylate | 10 parts by weight |

Comparative Example 1

White Ink 14

| | |
|---|---|
| White pigment dispersion 1 | 5 parts by weight |
| UVI-6992 (manufactured by The Dow Chemical Company) | 6 parts by weight |
| Sensitizing dye: Comparative Compound 1 | 3 parts by weight |
| Polymerizable compounds | |
| Monomer: 3,4-epoxycyclohexylmethyl-3',4'-epoxycyclohexanecarboxylate (Celloxide 2021A: manufactured by Daicel-UCB Co., Ltd.) | 40 parts by weight |
| Monomer: 3,7-bis(3-oxetanyl)-5-oxanonane (OXT-221: manufactured by Toagosei Co., Ltd.) | 45 parts by weight |
| Surfactant: BYK-307 (manufactured by BYK Chemie) | 1 part by weight |

Comparative Example 2

White Ink 15

White ink 15 was prepared in the same manner as for White ink 14 except that as a sensitizing dye Comparative Compound 2 was used instead of Comparative Compound 1.

Comparative Example 3

White Ink 16

White ink 16 was prepared in the same manner as for White ink 14 except that as a sensitizing dye Comparative Compound 3 was used instead of Comparative Compound 1.

Comparative Example 4

White Ink 17

White ink 17 was prepared in the same manner as for White ink 14 except that as a sensitizing dye Comparative Compound 4 was used instead of Comparative Compound 1.

Crude White inks 2 to 17 prepared as above were filtered using a filter having an absolute filtration accuracy of 2 μm to give White inks 2 to 17.

Inkjet Image Recording

White images were formed in the same manner as in the method described in Example 1 using the White inks 2 to 17 prepared as above.

Example 14

A white image was formed using White ink 1 by the same method as in Example 1 except that a UV light-emitting diode (UV-LED) was used instead of the VZero 085 metal halide lamp manufactured by Integration Technology.

In this embodiment, an NCCU033 manufactured by Nichia Corporation was used as the UV-LED. The LED emits UV light at a wavelength of 365 nm from 1 chip, and by applying a current of about 500 mA, light of about 100 mW is emitted from the chip. A plurality thereof were aligned at intervals of 7 mm to give a power of 0.3 W/cm$^2$ on the surface of a recording medium (hereinafter, also called a medium). The time from landing to irradiation and the exposure time can be varied by the transport speed of the medium and the distance between a head and the LED in the transport direction. In this embodiment, irradiation was carried out about 0.5 sec. after landing.

The exposure energy on the medium was adjustable in the range of 0.01 to 15 J/cm$^2$ by setting the distance from the medium and the transport speed.

Comparative Example 5

A white image was formed in the same manner as in Example 14 using White ink 14.

Inkjet Image Evaluation

Subsequently, with regard to each of the images thus formed, the sensitivity required for curing, thermal stability, adhesion, ink spread, plate life, and coloration were evaluated in accordance with the methods described below.

1. Curing Sensitivity Measurement

High quality paper was superimposed on a printed sample immediately after exposure, they were passed through pressure rollers (50 kg/cm$^2$), transfer of coloring material onto the high quality paper was evaluated, and the exposure energy intensity (mJ/cm$^2$) when transfer did not occur was defined as the curing sensitivity. The smaller the value, the higher the sensitivity.

2. Thermal Stability Evaluation

After storing the prepared ink at 75% RH and 60° C. for 3 days, the ink viscosity at the discharge temperature was measured, and an increase in the ink viscosity was expressed as a viscosity ratio (after storage/before storage). When the viscosity was unchanged and the ratio was close to 1.0, the storage stability was good, and if the ratio exceeded 1.5, clogging might undesirably be caused during discharge.

3. Evaluation of Adhesion to Grained Aluminum Support

With regard to the printed images formed above, a completely undamaged sample and a sample whose printed surface was crosshatched with 11 cuts in both lengthwise and widthwise directions at intervals of 1 mm in accordance with JIS K 5400 to give 100 1 mm squares were prepared, Sellotape (registered trademark) was affixed to the surface of each sample and peeled off quickly at an angle of 90 degrees, and the condition of the remaining printed image that had not been peeled off was evaluated in accordance with the criteria below.

Good: printed image was not peeled off at all in the crosshatch test.

Fair: the ink was slightly peeled off in the crosshatch test, but unless the ink surface was damaged little was peeled off.

Poor: easily peeled off by Sellotape (registered trademark) under both conditions.

4. Evaluation of Ink Spread on Grained Aluminum Support

With regard to printed images formed on a grained aluminum support, ink spread was evaluated in accordance with the criteria below.

Good: no spread between adjacent dots.
Fair: dots slightly spread.
Poor: dots spread and image obviously blurred.

5. Evaluation of Plate Life

An image printed on a grained aluminum support prepared above was used as a printing plate, printing was carried out using a Heidel KOR-D machine, and a relative comparison of the number of prints completed was used as an index for the plate life (the number obtained for Example 1 was defined as 100). The larger the number, the longer the plate life, which is preferable.

6. Evaluation of Coloration

After a white ink was printed on a PET substrate, it was superimposed on white card, and evaluated by measuring the Y density using The X-Rite 310 (manufactured by X-Rite).
Good: less than 0.15.
Poor: 0.15 or greater.

TABLE 3

| Example | Ink No. | Curing sensitivity (mJ/cm$^2$) | Thermal stability | Adhesion | Ink spread | Plate life | Coloration |
|---|---|---|---|---|---|---|---|
| Example 1 | White 1 | 50 | 1.2 | Good | Good | 100 | Good |
| Ex. 2 | White 2 | 50 | 1.2 | Good | Good | 100 | Good |
| Ex. 3 | White 3 | 60 | 1.2 | Good | Good | 95 | Good |
| Ex. 4 | White 4 | 70 | 1.2 | Good | Good | 90 | Good |
| Ex. 5 | White 5 | 80 | 1.2 | Good | Good | 85 | Good |
| Ex. 6 | White 6 | 50 | 1.2 | Good | Good | 100 | Good |
| Ex. 7 | White 7 | 55 | 1.2 | Good | Good | 95 | Good |
| Ex. 8 | White 8 | 60 | 1.2 | Good | Good | 95 | Good |
| Ex. 9 | White 9 | 40 | 1.3 | Good | Good | 110 | Good |
| Ex. 10 | White 10 | 40 | 1.2 | Good | Good | 110 | Good |
| Ex. 11 | White 11 | 50 | 1.2 | Good | Good | 100 | Good |
| Ex. 12 | White 12 | 50 | 1.2 | Good | Good | 100 | Good |
| Ex. 13 | White 13 | 40 | 1.2 | Good | Good | 110 | Good |
| Ex. 14 | White 1 | 50 | 1.2 | Good | Good | 100 | Good |
| Comp. Ex. 1 | White 14 | 500 | 1.2 | Poor | Poor | 20 | Good |
| Comp. Ex. 2 | White 15 | 90 | 1.2 | Fair | Good | 70 | Poor |
| Comp. Ex. 3 | White 16 | 500 | 1.2 | Poor | Poor | 20 | Poor |
| Comp. Ex. 4 | White 17 | 500 | 1.2 | Poor | Poor | 20 | Good |

TABLE 3-continued

| Example | Ink No. | Curing sensitivity (mJ/cm²) | Thermal stability | Adhesion | Ink spread | Plate life | Coloration |
|---|---|---|---|---|---|---|---|
| Comp. Ex. 5 | White 14 | 500 | 1.2 | Poor | Poor | 20 | Good |

It was found from the results in Table 3 that the ink composition of the present invention comprising a compound represented by Formula (I) or (II) had high sensitivity toward irradiation with radiation and good thermal stability.

Example of Radical Polymerization Type Ink Composition Preparation of Pigment Dispersion Pigment dispersions 2 of each of yellow, magenta, cyan, black, and white were prepared according to the methods below. Dispersion conditions were appropriately adjusted so that the average particle size of the pigment particles in each case was in the range of 0.2 to 0.3 μm using a known dispersing device, and subsequently they were filtered using a filter while heating.

Yellow pigment dispersion 2

| | |
|---|---|
| C.I. Pigment Yellow 13 | 20 parts by weight |
| Polymeric dispersant (Solsperse series manufactured by Zeneca) | 20 parts by weight |
| Diethylene glycol divinyl ether (manufactured by BASF) | 60 parts by weight |

Magenta pigment dispersion 2

| | |
|---|---|
| C.I. Pigment Red 57:1 | 20 parts by weight |
| Polymeric dispersant (Solsperse series manufactured by Zeneca) | 20 parts by weight |
| Diethylene glycol divinyl ether (manufactured by BASF) | 60 parts by weight |

Cyan pigment dispersion 2

| | |
|---|---|
| C.I. Pigment Blue 15:3 | 20 parts by weight |
| Polymeric dispersant (Solsperse series manufactured by Zeneca) | 20 parts by weight |
| Diethylene glycol divinyl ether (manufactured by BASF) | 60 parts by weight |

Black pigment dispersion 2

| | |
|---|---|
| C.I. Pigment Black 7 | 20 parts by weight |
| Polymeric dispersant (Solsperse series manufactured by Zeneca) | 20 parts by weight |
| Diethylene glycol divinyl ether (manufactured by BASF) | 60 parts by weight |

White pigment dispersion 2

| | |
|---|---|
| Titanium oxide (average particle size 0.15 μm, refractive index 2.52) | 25 parts by weight |
| Neutral polymeric dispersant PB822 (manufactured by Ajinomoto-Fine-Techno Co., Inc.) | 14 parts by weight |
| Diethylene glycol divinyl ether (manufactured by BASF) | 60 parts by weight |

Example 15

Formation of Image by Radical Polymerization Ink Preparation

Yellow ink 2

| | |
|---|---|
| Yellow pigment dispersion 2 | 5 parts by weight |
| UVI-6992 (manufactured by The Dow Chemical Company) | 6 parts by weight |
| Compound 2 | 3 parts by weight |
| Radically polymerizable compounds | |
| Caprolactone-modified dipentaerythritol hexaacrylate (DPCA60; polymerizable compound, manufactured by Sartomer) | 30 parts by weight |

-continued

| | |
|---|---|
| 1,6-Hexanediol diacrylate (HDDA; polymerizable compound, manufactured by Daicel-UCB Co., Ltd.) | 55 parts by weight |
| Polymerization inhibitor (Cupferron Al, manufactured by Wako Pure Chemical Industries Ltd.) | 1 part by weight |

Magenta ink 2

| | |
|---|---|
| Magenta pigment dispersion 2 | 5 parts by weight |
| UVI-6992 (manufactured by The Dow Chemical Company) | 6 parts by weight |
| Compound 2 | 3 parts by weight |
| Radically polymerizable compounds | |
| Caprolactone-modified dipentaerythritol hexaacrylate (DPCA60; polymerizable compound, manufactured by Sartomer) | 30 parts by weight |
| 1,6-Hexanediol diacrylate (HDDA; polymerizable compound, manufactured by Daicel-UCB Co., Ltd.) | 55 parts by weight |
| Polymerization inhibitor (Cupferron Al, manufactured by Wako Pure Chemical Industries Ltd.) | 1 part by weight |

Cyan ink 2

| | |
|---|---|
| Cyan pigment dispersion 2 | 5 parts by weight |
| UVI-6992 (manufactured by The Dow Chemical Company) | 6 parts by weight |
| Compound 2 | 3 parts by weight |
| Radically polymerizable compounds | |
| Caprolactone-modified dipentaerythritol hexaacrylate (DPCA60; polymerizable compound, manufactured by Sartomer) | 30 parts by weight |
| 1,6-Hexanediol diacrylate (HDDA; polymerizable compound, manufactured by Daicel-UCB Co., Ltd.) | 55 parts by weight |
| Polymerization inhibitor (Cupferron Al, manufactured by Wako Pure Chemical Industries Ltd.) | 1 part by weight |

Black ink 2

| | |
|---|---|
| Black pigment dispersion 2 | 5 parts by weight |
| UVI-6992 (manufactured by The Dow Chemical Company) | 6 parts by weight |
| Compound 2 | 3 parts by weight |
| Radically polymerizable compounds | |
| Caprolactone-modified dipentaerythritol hexaacrylate (DPCA60; polymerizable compound, manufactured by Sartomer) | 30 parts by weight |
| 1,6-Hexanediol diacrylate (HDDA; polymerizable compound, manufactured by Daicel-UCB Co., Ltd.) | 55 parts by weight |
| Polymerization inhibitor (Cupferron Al, manufactured by Wako Pure Chemical Industries Ltd.) | 1 part by weight |

White ink 18

| | |
|---|---|
| White pigment dispersion 2 | 5 parts by weight |
| UVI-6992 (manufactured by The Dow Chemical Company) | 6 parts by weight |
| Compound 2 | 3 parts by weight |
| Radically polymerizable compounds | |
| Caprolactone-modified dipentaerythritol hexaacrylate (DPCA60; polymerizable compound, manufactured by Sartomer) | 30 parts by weight |
| 1,6-Hexanediol diacrylate (HDDA; polymerizable compound, manufactured by Daicel-UCB Co., Ltd.) | 55 parts by weight |
| Polymerization inhibitor (Cupferron Al, manufactured by Wako Pure Chemical Industries Ltd.) | 1 part by weight |

Inks 2 and white ink 18 of each color prepared above were filtered using a filter having an absolute filtration accuracy of 2 μm to give Inks 2 and white ink 18 of each color.

Inkjet Image Recording

Subsequently, recording was carried out on a recording medium using a commercial inkjet recording device having a piezo system inkjet nozzle. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 70° C.±2° C. The piezo system inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 100 mW/cm$^2$, and irradiation started 0.1 sec. after the ink landed on the recording medium. Furthermore, the exposure time was made variable, and exposure energy was applied. Here, dpi referred to in the present invention denotes the number of dots per 2.54 cm.

The inks of each color prepared above were discharged at an environmental temperature of 25° C. in the order black→cyan→magenta→yellow→white, irradiation with ultraviolet rays was carried out using a VZero 085 metal halide lamp (manufactured by Integration Technology) after each color was discharged, and the total exposure energy per color was 200 mJ/cm$^2$ for all the colors. As recording media, a grained aluminum support, a transparent biaxially stretched polypropylene film whose surface had been treated so as to impart printability, a soft vinyl chloride sheet, a cast coat paper, and a commercial recycled paper were used, each color image was recorded, and an image having high resolution without dot spreading was obtained in all cases. Furthermore, for high quality paper, the ink did not penetrate to the reverse side, the ink was sufficiently cured, and there was hardly any odor due to unreacted monomer. Moreover, the ink recorded on the film had sufficient flexibility, the ink did not crack when bent, and there was no problem in an adhesion test involving peeling with Sellotape (registered trademark).

Examples 16 to 20 and Comparative Examples 6 to 10

Formation of Image by Radical Polymerization

Preparation of Ink
White inks 19 to 26 were prepared in accordance with the methods described below.

Example 16

White Ink 19

White ink 19 was prepared in the same manner as for White ink 18 except that Compound 3 was used instead of Compound 2.

Example 17

White Ink 20

White ink 20 was prepared in the same manner as for White ink 18 except that Compound 1 was used instead of Compound 2.

Example 18

White Ink 21

White ink 21 was prepared in the same manner as for White ink 18 except that Irgacure OXE-01 (manufactured by Ciba Specialty Chemicals) was used instead of UVI-6992 (manufactured by The Dow Chemical Company).

Example 19

White Ink 22

White ink 22 was prepared in the same manner as for White ink 18 except that Compound E above was used instead of UVI-6992 (manufactured by The Dow Chemical Company).

Comparative Example 6

White Ink 23

White ink 23 was prepared in the same manner as for White ink 18 except that Comparative Compound 1 was used instead of Compound 2.

Comparative Example 7

White Ink 24

White ink 24 was prepared in the same manner as for White ink 18 except that Comparative Compound 2 was used instead of Compound 2.

Comparative Example 8

White Ink 25

White ink 25 was prepared in the same manner as for White ink 18 except that Comparative Compound 3 was used instead of Compound 2.

Comparative Example 9

White Ink 26

White ink 26 was prepared in the same manner as for White ink 18 except that Comparative Compound 4 was used instead of Compound 2.

White inks 18 to 26 prepared as above were filtered using a filter having an absolute filtration accuracy of 2 µm to give corresponding inks.

Inkjet Image Recording
Images of each color were formed by the same method as in Example 15 using Yellow ink 2, Magenta ink 2, Cyan ink 2, Black ink 2, and White inks 18 to 26.

Example 20

A white image was formed using White ink 18 by the same method as in Example 1 except that a UV light-emitting diode (UV-LED) was used instead of the VZero 085 metal halide lamp manufactured by Integration Technology.

In this embodiment, an NCCU033 manufactured by Nichia Corporation was used as the UV-LED. The LED emits UV light at a wavelength of 365 nm from 1 chip, and by applying a current of about 500 mA, light of about 100 mW is emitted from the chip. A plurality thereof were aligned at intervals of 7 mm to give a power of 0.3 W/cm$^2$ on the surface of a recording medium (hereinafter, also called a medium). The time from landing to irradiation and the exposure time can be varied by the transport speed of the medium and the distance between a head and the LED in the transport direction. In this embodiment, irradiation was carried out about 0.5 sec. after landing.

The exposure energy on the medium was adjustable in the range of 0.01 to 15 J/cm$^2$ by setting the distance from the medium and the transport speed.

Comparative Example 10

A white image was formed in the same manner as in Example 20 using White ink 23.

Inkjet Image Evaluation
With regard to each of images thus formed, the sensitivity required for curing, penetration into commercial recycled paper, ink spread on a grained aluminum support, adhesion, plate life, storage stability, and coloration were evaluated in accordance with the methods described below.

1. Curing Sensitivity Measurement
High quality paper was superimposed on a printed sample immediately after exposure, they were passed through pressure rollers (50 kg/cm$^2$), transfer of coloring material onto the high quality paper was evaluated, and the exposure energy intensity (mJ/cm$^2$) when transfer did not occur was defined as the curing sensitivity. The smaller the value, the higher the sensitivity.

2. Evaluation of Penetration Into Commercial Recycled Paper
Penetration was evaluated in accordance with the criteria below with respect to an image printed on commercial recycled paper.
Good: little penetration, no odor due to residual monomer.
Fair: slight penetration, slight odor due to residual monomer.
Poor: ink obviously penetrated to the reverse side, strong odor due to residual monomer.

3. Evaluation of Adhesion to Grained Aluminum Support

With regard to the printed images formed above, a completely undamaged sample and a sample whose printed surface was crosshatched with 11 cuts in both lengthwise and widthwise directions at intervals of 1 mm in accordance with JIS K 5400 to give 100 1 mm squares were prepared, Sellotape (registered trademark) was affixed to the surface of each sample and peeled off quickly at an angle of 90 degrees, and the condition of the remaining printed image that had not been peeled off was evaluated in accordance with the criteria below.

Good: printed image was not peeled off at all in the crosshatch test.
Fair: the ink was slightly peeled off in the crosshatch test, but unless the ink surface was damaged little was peeled off.
Poor: easily peeled off by Sellotape (registered trademark) under both conditions.

4. Evaluation of Ink Spread on Grained Aluminum Support

With regard to printed images formed on a grained aluminum support, ink spread was evaluated in accordance with the criteria below.
Good: no spread between adjacent dots.
Fair: dots slightly spread.
Poor: dots spread and image obviously blurred.

5. Evaluation of Plate Life

An image printed on a grained aluminum support prepared above was used as a printing plate, printing was carried out using a Heidel KOR-D machine, and a relative comparison of the number of prints completed was used as an index for the plate life (the number obtained for Example 1 was defined as 100). The larger the number, the longer the plate life, which is preferable.

6. Storage Stability Evaluation

After storing the prepared ink at 75% RH and 60° C. for 3 days, the ink viscosity at the discharge temperature was measured, and an increase in the ink viscosity was expressed as a viscosity ratio (after storage/before storage). When the viscosity was unchanged and the ratio was close to 1.0, the storage stability was good, and if the ratio exceeded 1.5, clogging might undesirably be caused during discharge.

7. Evaluation of Coloration

After a white ink was printed on a PET substrate, it was superimposed on white card, and evaluated by measuring the Y density using The X-Rite 310 (manufactured by X-Rite).
Good: less than 0.1 5.
Poor: 0.15 or greater.

Results of these evaluations are shown in Table 4.

TABLE 4

| Example | Ink No. | Curing sensitivity (mJ/cm$^2$) | Penetration | Ink spread | Adhesion | Plate life | Storage stability | Coloration |
|---|---|---|---|---|---|---|---|---|
| Ex. 15 | White 18 | 200 | Good | Good | Good | 100 | 1.1 | Good |
| Ex. 16 | White 19 | 200 | Good | Good | Good | 100 | 1.1 | Good |
| Ex. 17 | White 20 | 200 | Good | Good | Good | 100 | 1.1 | Good |
| Ex. 18 | White 21 | 200 | Good | Good | Good | 100 | 1.1 | Good |
| Ex. 19 | White 22 | 180 | Good | Good | Good | 110 | 1.2 | Good |
| Ex. 20 | White 18 | 200 | Good | Good | Good | 100 | 1.1 | Good |
| Comp. Ex. 6 | White 23 | 1,000 | Poor | Poor | Poor | 20 | 1.1 | Good |
| Comp. Ex. 7 | White 24 | 400 | Fair | Good | Fair | 60 | 1.1 | Poor |
| Comp. Ex. 8 | White 25 | 1,000 | Poor | Poor | Poor | 20 | 1.1 | Poor |
| Comp. Ex. 9 | White 26 | 1,000 | Poor | Poor | Poor | 20 | 1.1 | Good |
| Comp. Ex. 10 | White 23 | 1,000 | Poor | Poor | Poor | 20 | 1.1 | Good |

What is claimed is:

1. An ink composition comprising:

a compound represented by Formula (I) or (II), a monomer selected from the group consisting of a cationically polymerizable compound and a radically polymerizable compound, a polymerization initiator selected from the group consisting of an acid generator and a radical polymerization initiator, and a colorant wherein the compound represented by Formula (I) or (II) is a sensitizer having no coloration,

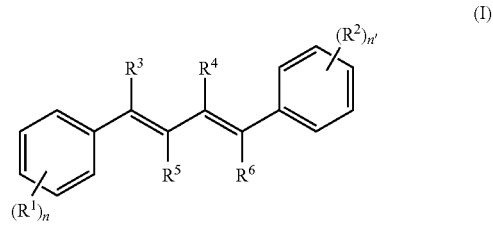

-continued

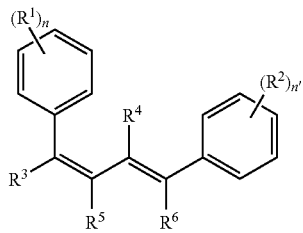

(II)

wherein $R^1$ and $R^2$ independently denote a monovalent substituent, $R^3$ to $R^6$ independently denote a hydrogen atom or a monovalent substituent, n denotes an integer of 0 to 5, and n' denotes an integer of 0 to 5; n and n' are not both 0, when n is 2 or greater a plurality of $R^1$s may be identical to or different from each other, and when n' is 2 or greater a plurality of $R^2$s may be identical to or different from each other.

2. The ink composition according to claim 1, wherein the compound represented by Formula (I) or (II) has a molar extinction coefficient ϵ at a wavelength of 365 nm of 500 $mol^{-1} \cdot L \cdot cm^{-1}$ or greater and a molar extinction coefficient ϵ at a wavelength of 380 nm of 3,000 $mol^{-1} \cdot L \cdot cm^{-1}$ or less.

3. The ink composition according to claim 1, wherein the compound represented by Formula (I) or (II) has a molar extinction coefficient ϵ at a wavelength of 365 nm of at least 1,000 $mol^{-1} \cdot L \cdot cm^{-1}$ but no greater than 50,000 $mol^{-1} \cdot L \cdot cm^{-1}$ and a molar extinction coefficient ϵ a wavelength of 380 nm of 1,000 $mol^{-1} \cdot L \cdot cm^{-1}$ or less.

4. The ink composition according to claim 1, wherein the compound represented by Formula (I) or (II) is a compound represented by Formula (III)

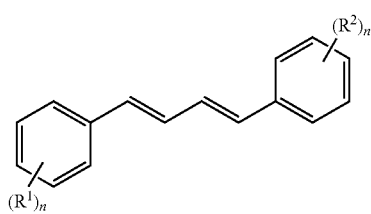

(III)

wherein $R^1$ and $R^2$ independently denote a monovalent substituent, n denotes an integer of 0 to 5, and n' denotes an integer of 1 to 5; when n is 2 or greater, a plurality of $R^1$s may be identical to or different from each other, and when n' is 2 or greater, a plurality of $R^2$s may be identical to or different from each other).

5. The ink composition according to claim 1, wherein $R^1$ and $R^2$ are groups selected from the group consisting of a halogen atom, an alkyl group, an alkoxy group, an aryloxy group, an alkylthio group, an arylthio group, and an amino group.

6. The ink composition according to claim 1, wherein the compound represented by Formula (I) and/or Formula (II) is contained at 0.1 wt % to 20 wt % relative to the total weight of the ink composition.

7. The ink composition according to claim 1, wherein the ink composition is for inkjet recording.

8. The ink composition according to claim 1, wherein the ink composition is a white ink composition, and the colorant is a white colorant.

9. The ink composition according to claim 1, wherein the monomer is a radically polymerizable compound, and the polymerization initiator is a radical polymerization initiator.

10. The ink composition according to claim 1, wherein the polymerization initiator can be activated by exposure to UV radiation having a peak wavelength at 350 to 420 nm.

11. The ink composition according to claim 1, wherein $R^1$ and $R^2$ independently denote an alkyl group or an alkoxy group.

12. An inkjet recording method comprising:
   (a') a step of discharging an ink composition onto a recording medium; and
   (b') a step of curing the ink composition by irradiating the discharged ink composition with actinic radiation, the ink composition being the ink composition according to claim 1.

13. The inkjet recording method according to claim 12, wherein the actinic radiation is UV radiation having a peak light emission wavelength in the range of 340 to 370 nm and is emitted by a light-emitting diode for emitting UV radiation whose maximum illumination intensity on the surface of a recording medium is 10 to 2,000 $mW/cm^2$.

14. A process for producing a lithographic printing plate, the process comprising:
   (a") a step of discharging the ink composition according to claim 1 onto a hydrophilic support; and
   (b") a step of curing the ink composition by irradiating the discharged ink composition with actinic radiation so as to form a hydrophobic image on the hydrophilic support by curing the ink composition.

* * * * *